US011137008B2

(12) United States Patent
Dill et al.

(10) Patent No.: US 11,137,008 B2
(45) Date of Patent: Oct. 5, 2021

(54) SELF-DRILLING ANCHOR ASSEMBLY

(71) Applicant: Illinois Tool Works Inc., Glenview, IL (US)

(72) Inventors: Michael Dill, Elk Grove Village, IL (US); Miguel E. Mendez Jaquez, Palatine, IL (US); Anthony Versino, Buffalo Grove, IL (US)

(73) Assignee: Illinois Tool Works Inc., Glenview, IL (US)

(*) Notice: Subject to any disclaimer, the term of this patent is extended or adjusted under 35 U.S.C. 154(b) by 256 days.

(21) Appl. No.: 16/243,541

(22) Filed: Jan. 9, 2019

(65) Prior Publication Data
US 2019/0219084 A1 Jul. 18, 2019

Related U.S. Application Data

(60) Provisional application No. 62/616,717, filed on Jan. 12, 2018, provisional application No. 62/685,538, (Continued)

(51) Int. Cl.
*F16B 13/00* (2006.01)
*F16B 13/06* (2006.01)

(52) U.S. Cl.
CPC .......... *F16B 13/003* (2013.01); *F16B 13/065* (2013.01)

(58) Field of Classification Search
CPC ...... F16B 13/003; F16B 13/13; F16B 13/065; F16B 13/004; F16B 13/066; F16B 13/063; B28D 1/146; E21B 10/445
See application file for complete search history.

(56) References Cited

U.S. PATENT DOCUMENTS 1,379,209 A * 5/1921 Phillips ................. B28D 1/146
411/29
2,034,494 A 3/1936 Stoll
(Continued)

FOREIGN PATENT DOCUMENTS

AU 2005204302 4/2006
DE 3020284 A1 * 12/1981 ............. B28D 1/146
(Continued)

OTHER PUBLICATIONS

International Search Report and Written Opinion from International Application No. PCT/US2019/013035, dated Mar. 22, 2019 (19 pages).

*Primary Examiner* — Victor D Batson
*Assistant Examiner* — Amit Singh Dhillon
(74) *Attorney, Agent, or Firm* — Neal, Gerber & Eisenberg LLP

(57) ABSTRACT

A self-drilling anchor assembly including a drill bit and an anchor positioned over and attached to the drill bit. In various embodiments, the drill bit includes a shank, a drill head integrally connected to one end of the shank, and a threaded tail integrally connected to an opposite end of the shank. The tail includes a mechanical engaging structure that is engageable by a tool to rotate the drill bit, and a helical thread formation to facilitate attachment of a securing device such as nut and washer to the tail of the drill bit. The anchor includes an elongated generally tubular body including an inner surface defining a longitudinally extending inner channel, and a head integrally connected to and extending from a first end of the body. The drill bit is configured to remain in the anchor and in the substrate after installation of the anchor assembly in the substrate.

15 Claims, 46 Drawing Sheets

Related U.S. Application Data filed on Jun. 15, 2018, provisional application No. 62/687,516, filed on Jun. 20, 2018.

(56) References Cited

U.S. PATENT DOCUMENTS

| | | | |
|---|---|---|---|
| 2,914,983 A | 12/1959 | Kopf et al. | |
| 3,316,796 A | 5/1967 | Young | |
| 4,026,186 A * | 5/1977 | Williams, Jr. | F16B 13/003 411/29 |
| 4,173,918 A | 11/1979 | Piersall | |
| D283,302 S | 4/1986 | Beton | |
| D285,171 S | 8/1986 | Russell | |
| 4,883,395 A | 11/1989 | Klaric | |
| D322,555 S | 12/1991 | Kokenge | |
| 5,183,357 A | 2/1993 | Palm | |
| 5,246,323 A | 9/1993 | Vernet et al. | |
| 5,816,759 A | 10/1998 | Ernst et al. | |
| 5,820,321 A | 10/1998 | Gruber | |
| D413,126 S | 8/1999 | Warren | |
| D420,013 S | 2/2000 | Warren | |
| 6,056,489 A | 5/2000 | Keller | |
| 6,065,918 A | 5/2000 | Adams | |
| 6,164,884 A | 12/2000 | Mayr | |
| 6,254,325 B1 | 7/2001 | Kun | |
| 6,270,303 B1 | 8/2001 | Gauthier et al. | |
| 6,325,580 B1 | 12/2001 | Diamond | |
| 6,712,544 B2 | 3/2004 | Krüger et al. | |
| 6,827,535 B2 | 12/2004 | Fuchs et al. | |
| 6,829,871 B1 | 12/2004 | McSherry et al. | |
| 6,935,821 B2 | 8/2005 | Bodin et al. | |
| 6,942,439 B2 | 9/2005 | Rouger | |
| D548,579 S | 8/2007 | Gaudron | |
| 7,261,505 B2 | 8/2007 | Ernst et al. | |
| 7,357,613 B2 | 4/2008 | Houck et al. | |
| D605,499 S | 12/2009 | Gaudron | |
| D610,900 S | 3/2010 | Piermayr | |
| 7,713,010 B2 | 5/2010 | Cheng | |
| 7,744,320 B2 | 6/2010 | Kobetsky et al. | |
| D628,056 S | 11/2010 | Busch | |
| D630,937 S | 1/2011 | Busch | |
| 7,896,594 B2 | 3/2011 | Nardi et al. | |
| 7,901,170 B2 | 3/2011 | Usui | |
| D647,540 S | 10/2011 | Drenth | |
| D663,195 S | 7/2012 | Bohnet | |
| D663,196 S | 7/2012 | Bohnet | |
| D663,197 S | 7/2012 | Bohnet | |
| D663,613 S | 7/2012 | Bohnet | |
| 8,444,355 B2 | 5/2013 | Gaudron et al. | |
| 8,491,244 B2 | 7/2013 | Kobetsky et al. | |
| 8,678,730 B2 | 3/2014 | Gaudron et al. | |
| 9,255,594 B2 | 2/2016 | Cabrit et al. | |
| 9,512,868 B2 | 12/2016 | Stempniewski et al. | |
| 9,541,116 B2 | 1/2017 | Cabaj et al. | |
| 9,562,558 B2 | 2/2017 | Anasis et al. | |
| 9,581,185 B2 | 2/2017 | Anasis et al. | |
| D804,940 S | 12/2017 | Spampatti | |
| 9,856,897 B2 | 1/2018 | Schaeffer | |
| D814,282 S | 4/2018 | Baiz | |
| 9,970,465 B2 | 5/2018 | Gstach et al. | |
| 9,970,467 B2 | 5/2018 | Dijkhuis et al. | |
| D820,327 S | 6/2018 | Vanlue | |
| D823,089 S | 7/2018 | Shikama | |
| 10,018,213 B2 | 7/2018 | Gstach et al. | |
| D826,299 S | 8/2018 | Bailleres | |
| D833,490 S | 11/2018 | Defougeres | |
| 10,190,617 B2 | 1/2019 | Anasis et al. | |
| D847,885 S | 5/2019 | Okida | |
| D848,619 S | 5/2019 | Liptak | |
| D857,772 S | 8/2019 | van den Boogaart | |
| D858,595 S | 9/2019 | Sharivker | |
| D860,273 S | 9/2019 | Sharivker | |
| 2002/0106256 A1 | 8/2002 | Kaibach | |
| 2003/0026673 A1 | 2/2003 | Filipp | |
| 2003/0063959 A1 | 4/2003 | Kao | |
| 2004/0096288 A1 | 5/2004 | Haug et al. | |
| 2004/0136802 A1 | 7/2004 | Lin | |
| 2004/0223832 A1 | 11/2004 | Aasgaard | |
| 2006/0133908 A1 | 6/2006 | Kunz et al. | |
| 2006/0165505 A1 | 7/2006 | Aasgaard | |
| 2007/0224015 A1 | 9/2007 | Ayrle | |
| 2008/0008553 A1 * | 1/2008 | Gillis | F16B 13/025 411/15 |
| 2010/0034611 A1 * | 2/2010 | Nardi | F16B 13/065 411/29 |
| 2010/0111639 A1 | 5/2010 | Gaudron | |
| 2010/0143067 A1 | 6/2010 | Gaudron | |
| 2011/0081217 A1 | 4/2011 | Wissling et al. | |
| 2012/0128444 A1 | 5/2012 | Podesser et al. | |
| 2012/0201619 A1 | 8/2012 | Olsson | |
| 2012/0263553 A1 | 10/2012 | Greenfield | |
| 2012/0282044 A1 | 11/2012 | Volokh | |
| 2012/0311947 A1 | 12/2012 | Van Wissen | |
| 2013/0317508 A1 | 11/2013 | Ellis | |
| 2014/0003873 A1 | 1/2014 | Han | |
| 2014/0010613 A1 | 1/2014 | Gaudron et al. | |
| 2014/0072384 A1 | 3/2014 | Wissling | |
| 2014/0154025 A1 | 6/2014 | Bergez | |
| 2014/0193220 A1 | 7/2014 | Tamura | |
| 2015/0056029 A1 | 2/2015 | Shimamoto | |
| 2015/0063935 A1 | 3/2015 | Lau | |
| 2015/0139747 A1 * | 5/2015 | Hsu | F16B 5/0642 411/43 |
| 2016/0097416 A1 | 4/2016 | Cabaj | |
| 2016/0303664 A1 | 10/2016 | Azegami | |
| 2017/0058932 A1 * | 3/2017 | Cousineau | F16M 13/027 |
| 2017/0167517 A1 | 6/2017 | Wissling | |
| 2020/0063557 A1 | 2/2020 | Pastorino | |

FOREIGN PATENT DOCUMENTS

| | | | |
|---|---|---|---|
| DE | 3538191 A1 * | 4/1987 | E21B 10/445 |
| DE | 37 39 371 | 6/1989 | |
| DE | 3809356 A1 * | 9/1989 | E21B 10/003 |
| EP | 1 072 802 | 1/2001 | |
| EP | 2 567 107 | 3/2013 | |
| GB | 2075409 A * | 11/1981 | E21B 10/445 |
| GB | 2 254 392 | 10/1992 | |
| GB | 2254392 A * | 10/1992 | F16B 13/003 |
| JP | 2000 230520 | 8/2000 | |
| WO | WO 97/49929 | 12/1997 | |
| WO | WO-9749929 A1 * | 12/1997 | F16B 13/002 |
| WO | WO 2007/104094 | 9/2007 | |
| WO | WO 2008/041836 | 4/2008 | |

* cited by examiner

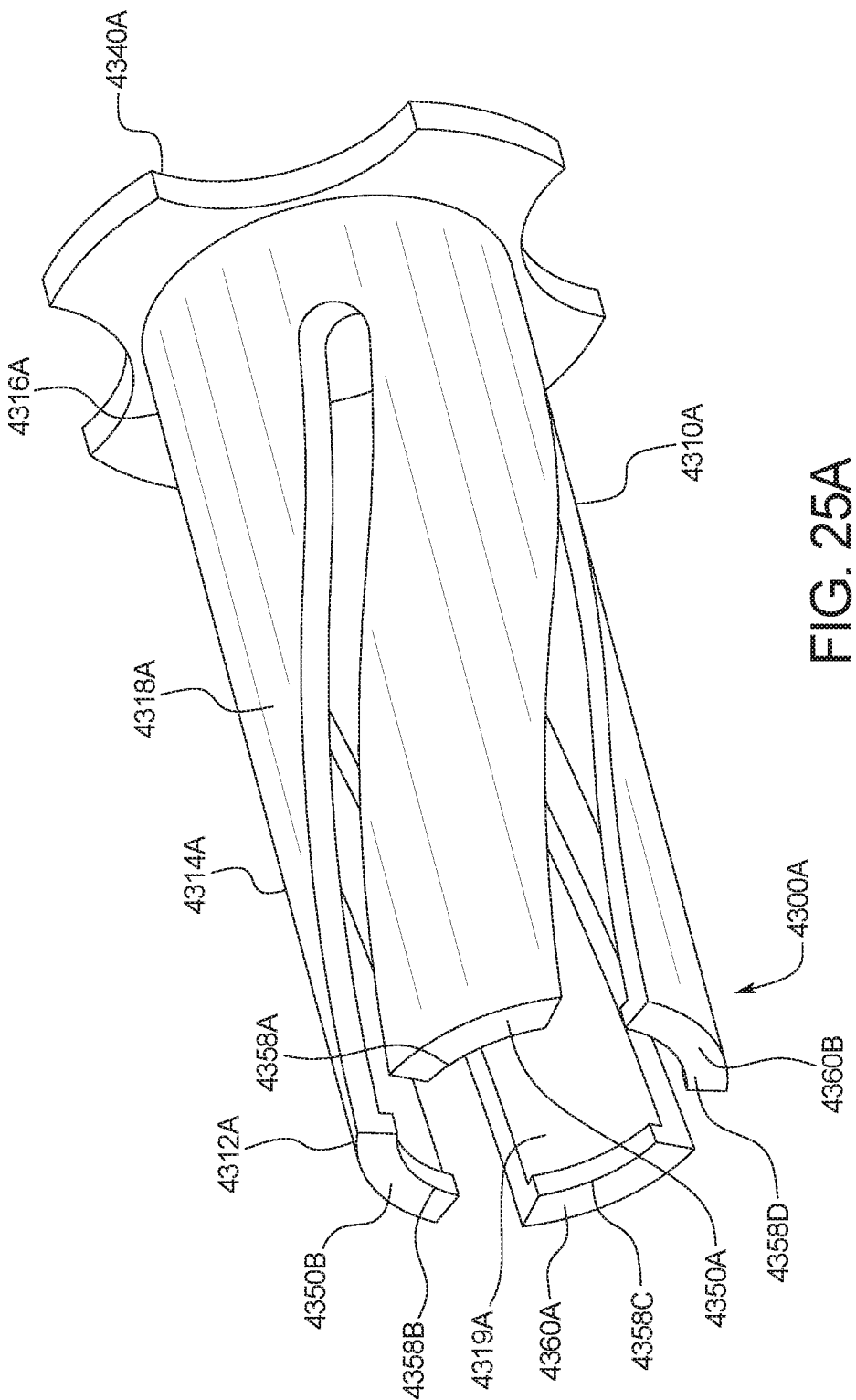

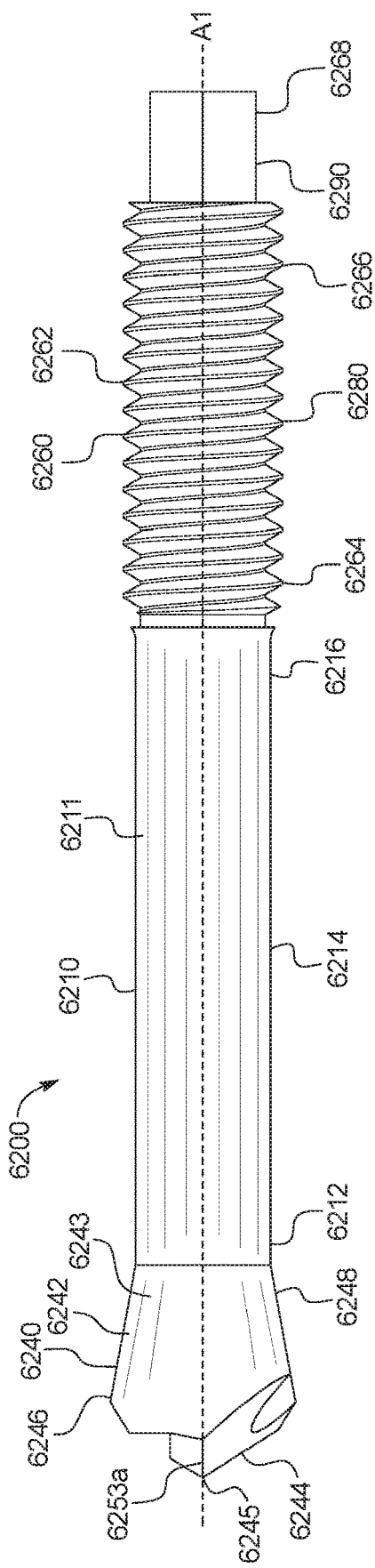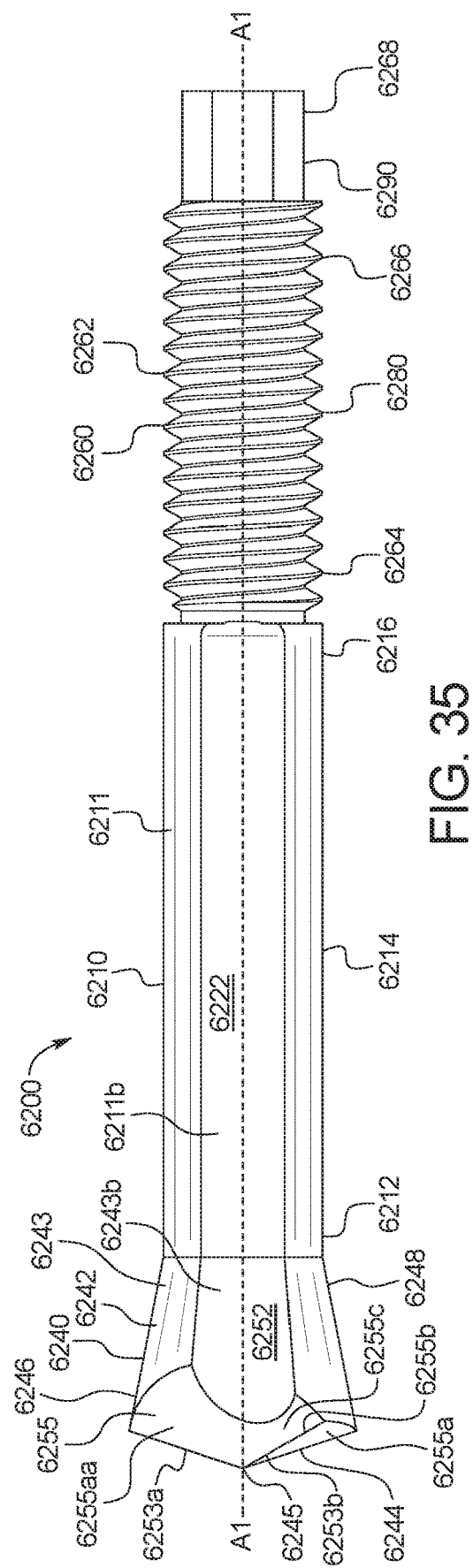
FIG. 34
FIG. 35

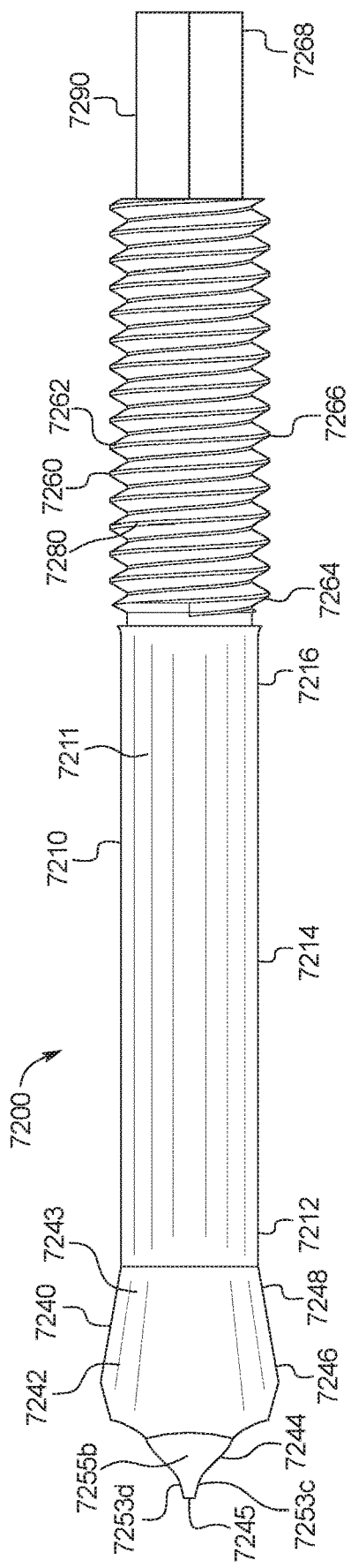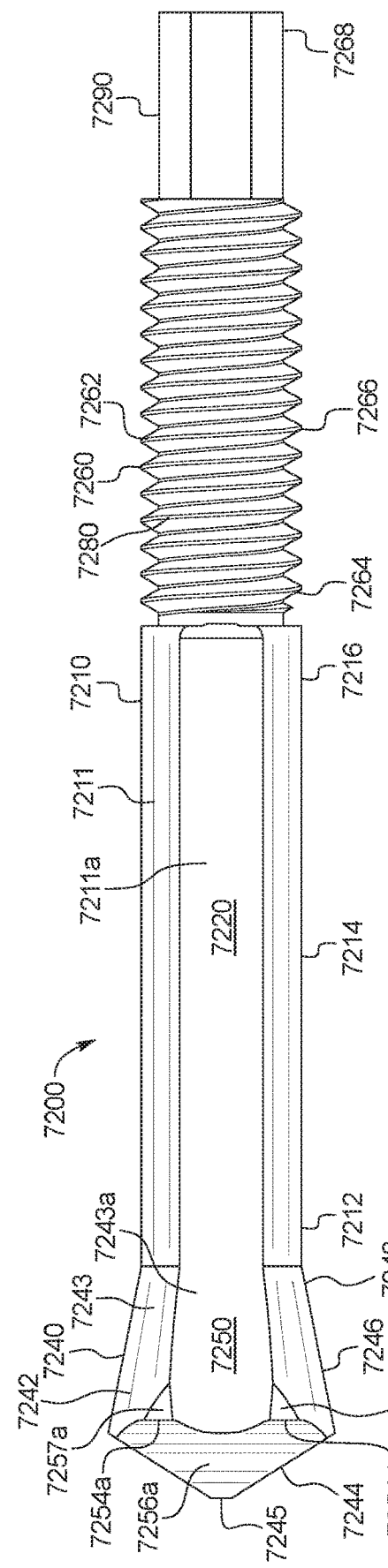
FIG. 37
FIG. 38

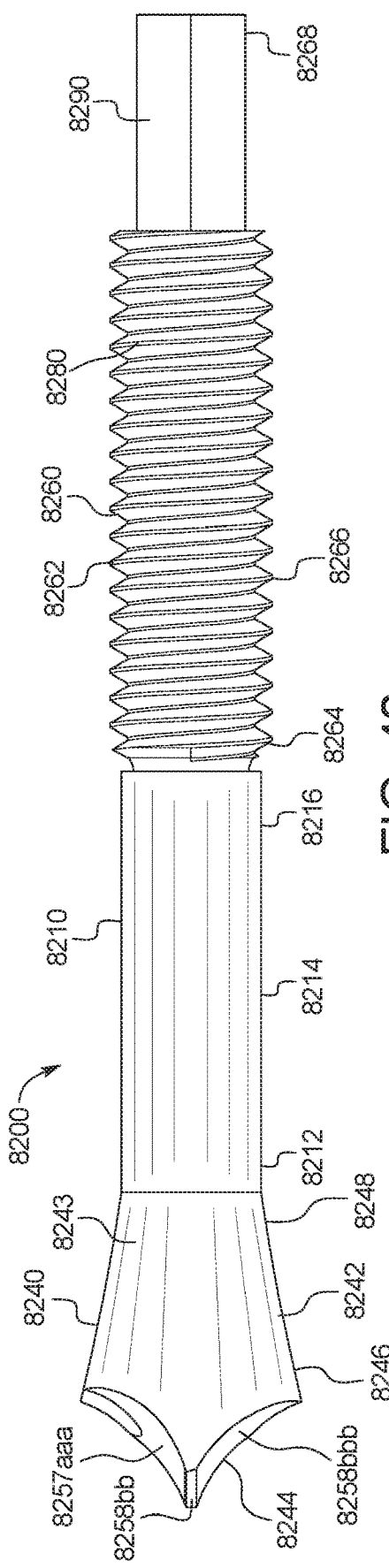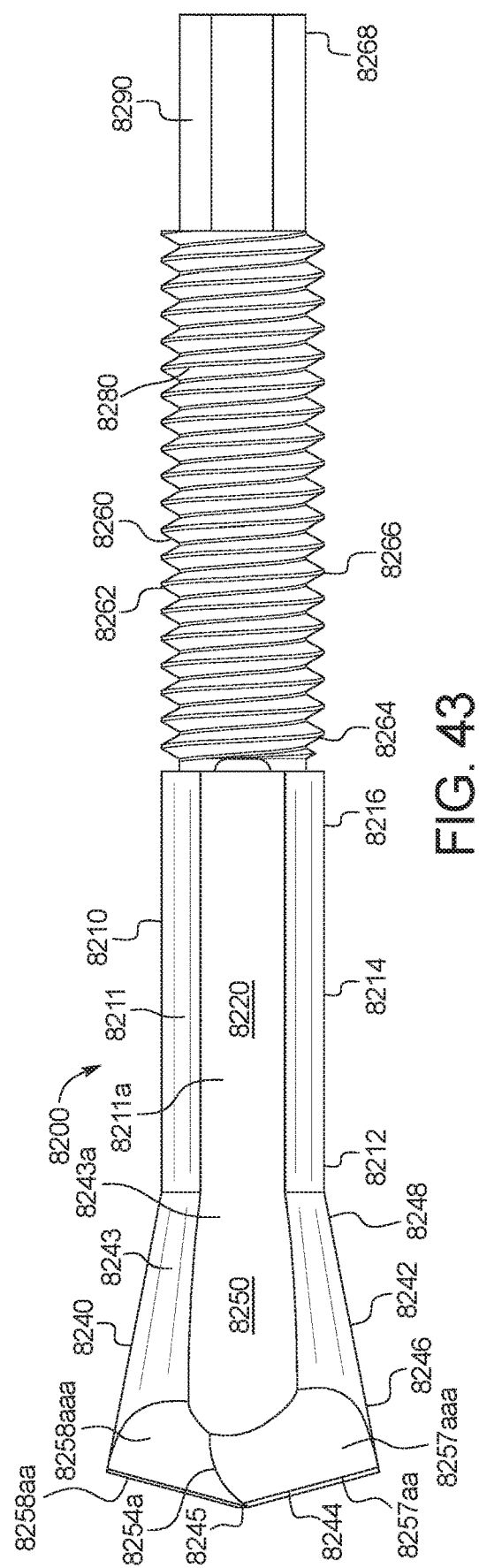

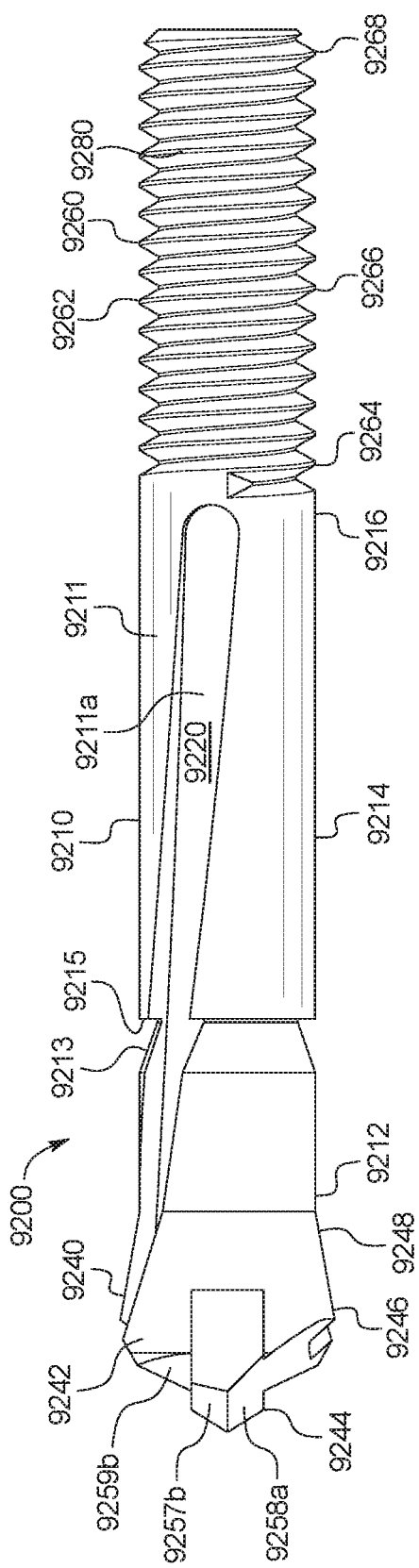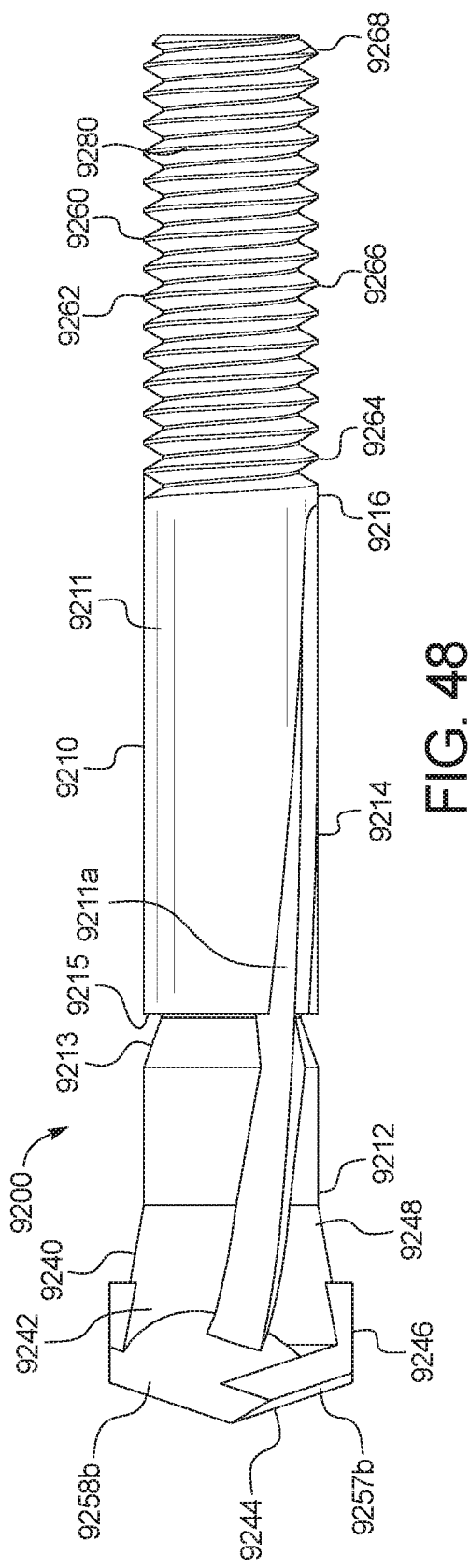
FIG. 47
FIG. 48

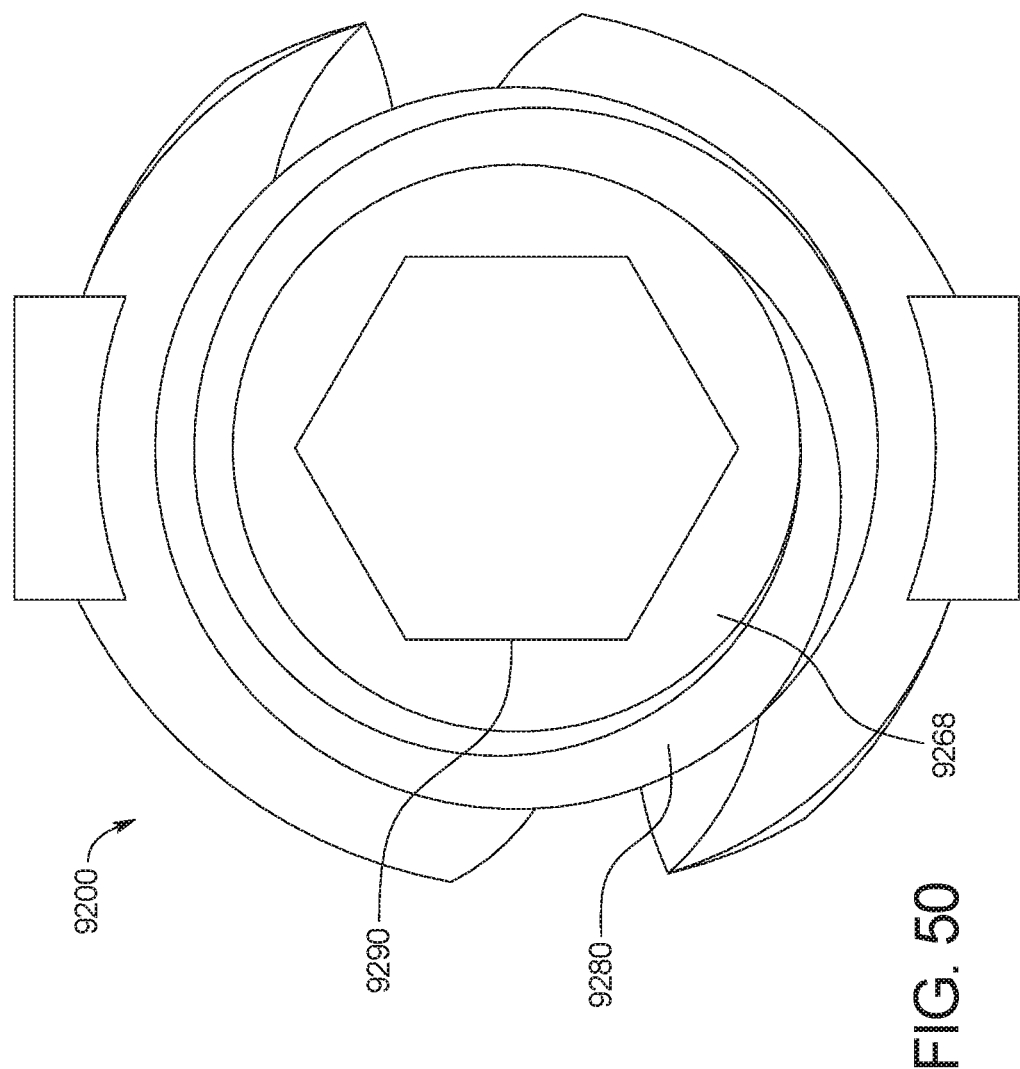

SELF-DRILLING ANCHOR ASSEMBLY

PRIORITY

This application claims priority to and the benefit of U.S. Provisional Patent Application Ser. No. 62/616,717, filed Jan. 12, 2018, and claims priority to and the benefit of U.S. Provisional Patent Application Ser. No. 62/685,538, filed Jun. 15, 2018, and claims priority to and the benefit of U.S. Provisional Patent Application Ser. No. 62/687,516, filed Jun. 20, 2018, the entire contents of each of which are incorporated herein by reference.

CROSS-REFERENCE TO RELATED APPLICATIONS

This application is related to the following commonly owned patent applications: U.S. application Ser. No. 29/676,208, entitled "ANCHOR ASSEMBLY DRILL BIT"; U.S. application Ser. No. 29/676,214, entitled "ANCHOR ASSEMBLY DRILL BIT"; U.S. application Ser. No. 29/676,217, entitled "ANCHOR ASSEMBLY DRILL BIT"; U.S. application Ser. No. 29/676,225, entitled "ANCHOR ASSEMBLY DRILL BIT"; U.S. application Ser. No. 29/676,229, entitled "ANCHOR ASSEMBLY DRILL BIT"; U.S. application Ser. No. 29/676,241, entitled "ANCHOR ASSEMBLY SLEEVE"; U.S. application Ser. No. 29/676,243, entitled "ANCHOR ASSEMBLY SLEEVE"; and U.S. application Ser. No. 29/676,246, entitled "ANCHOR ASSEMBLY SLEEVE."

BACKGROUND

Masonry structures are widely used throughout the construction industry. One type of masonry structure is a concrete structure (such as a concrete wall, a concrete floor, or a concrete ceiling). Such concrete structures are typically constructed from fluid concrete poured into a mold or other suitable formwork. After being pouring, the concrete cures and hardens to form the concrete structure. After a masonry structure such as a concrete structure is formed, known anchor assemblies are often used to attach fixtures to the concrete structure. Certain issues exist with various known anchor assemblies used to attach fixtures to masonry structures such as concrete structures.

Generally, to attach a fixture to a concrete structure, an installer must first drill a hole in the concrete structure using a suitable drill with a suitable drill bit. The installer then needs to remove the drill bit from the drilled hole, put down the drill with the drill bit in a suitable location, and then pick up the anchor assembly and the appropriate anchor driving tool and drive the anchor into the drilled hole. This can be a relatively time consuming process.

It should also be appreciated that such drill bits that are repeatedly used to drill holes in masonry structures such as concrete walls are typically made from an relatively strong material (such as carbon steel with a carbide blade tip brazed to it) so that they do not wear out or become dull too quickly. Such drill bits are relatively expensive.

SUMMARY

Various embodiments of the present disclosure provide a self-drilling anchor assembly and a method of installing the self-drilling anchor assembly in a substrate (such as masonry structure). The self-drilling anchor assembly of the present disclosure is quick and easy to install. The self-drilling anchor assembly and the methods of the present disclosure address and overcome the above described issues, and specifically reduce the time necessary to install an anchor assembly in a substrate (such as a masonry structure).

In various example embodiments, the present disclosure provides a self-drilling anchor assembly including a drill bit and an anchor positioned over and attached to the drill bit. In various embodiments, the drill bit includes: (a) a shank, (b) a drill head integrally connected to one end of the shank, and (c) a threaded tail integrally connected to an opposite end of the shank. The tail includes a mechanical engaging structure that is engageable by a tool to rotate the drill bit, and a helical thread formation to facilitate attachment of a securing device (such as a nut and a washer) to the tail of the drill bit. The anchor includes: (i) an elongated generally tubular body including an inner surface defining a longitudinally extending inner channel, and (ii) a head integrally connected to and extending from a rear end of the tubular body and including an inner surface that defines a longitudinally extending inner channel that is aligned with the longitudinally extending inner channel of the body. The tubular body includes a plurality of independently movable or pivotable gripping arms and a plurality of inwardly extending drill bit attachment members or tabs. The head also includes outwardly or transversely extending flanges.

Various embodiments of the present disclosure also provide a method of installing the anchor assembly.

Additional features and advantages of the present disclosure are described in, and will be apparent from, the following Detailed Description and the Figures.

BRIEF DESCRIPTION OF THE FIGURES

FIG. 25A is a perspective view of an alternative embodiment of the anchor of the self-drilling anchor assembly.

FIG. 34 is a bottom view of the drill bit of FIG. 30.

FIG. 35 is a second side view of the drill bit of FIG. 30.

FIG. 37 is a first side view of the drill bit of FIG. 36, the second side being a mirror image thereof.

FIG. 38 is a top view of the drill bit of FIG. 36, the bottom view being a mirror image thereof.

FIG. 42 is a first side view of the drill bit of FIG. 41, the second side being a mirror image thereof.

FIG. 43 is a top view of the drill bit of FIG. 41, the bottom view being a mirror image thereof.

FIG. 47 is a first side view of the drill bit of FIG. 46, the second side being a mirror image thereof.

FIG. 48 is a top view of the drill bit of FIG. 46, the bottom view being a mirror image thereof.

FIG. 50 is a rear end view of the drill bit of FIG. 46.

DETAILED DESCRIPTION OF EXAMPLE EMBODIMENTS

Figure 1:
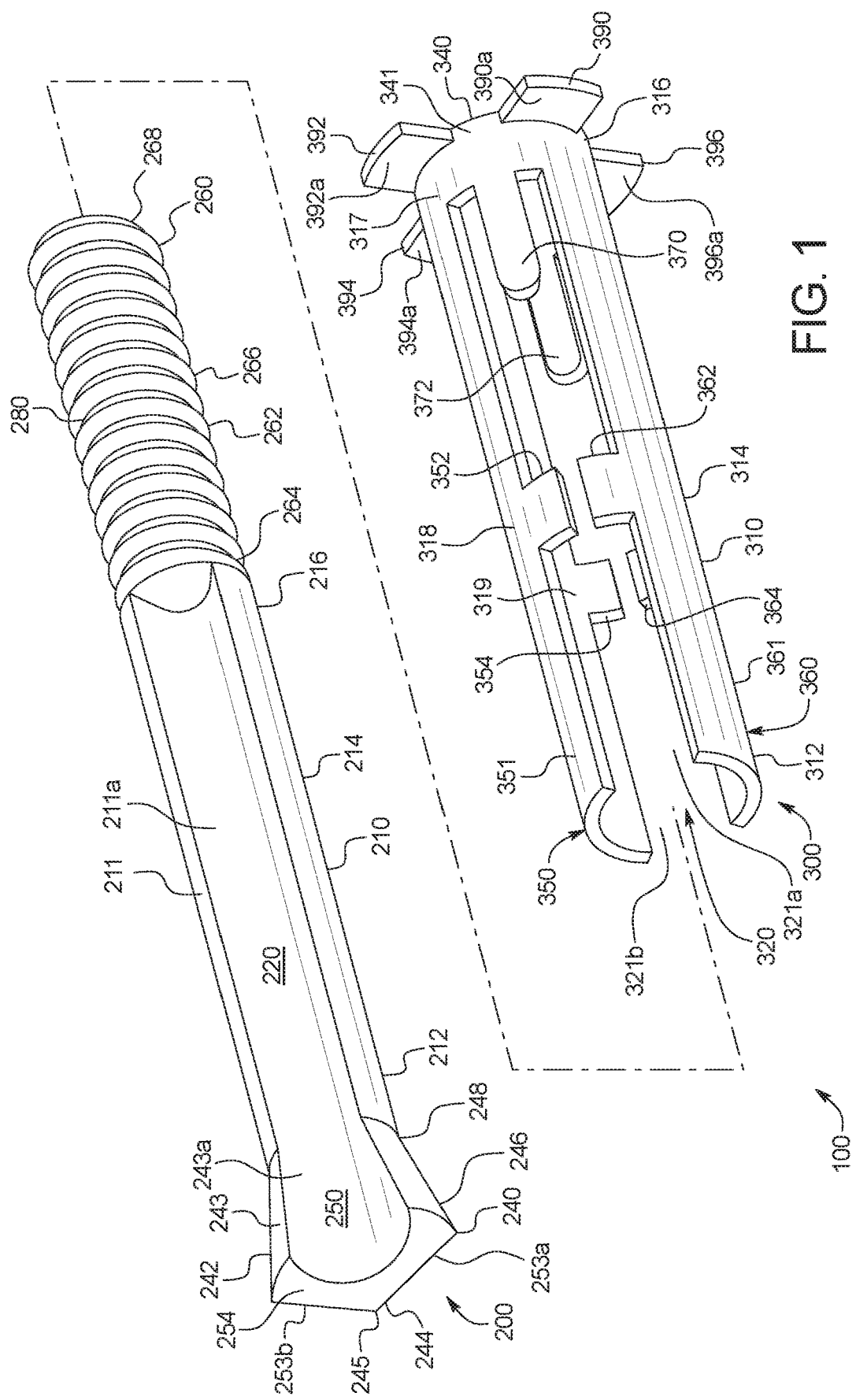
FIG. 1 is an exploded perspective view of a self-drilling anchor assembly of one example embodiment of the present disclosure, and illustrating the anchor and the drill bit of the self-drilling anchor assembly prior to assembly.

The present disclosure provides a self-drilling anchor assembly and a method of installing the self-drilling anchor assembly.

In certain embodiments of the present disclosure, the self-drilling anchor assembly includes: (a) a drill bit; and (b) an anchor positionable on or over and attached to the drill bit such that the when the drill bit rotates, the anchor rotates with the drill bit. In certain such embodiments of the present disclosure, the anchor is attached to the drill bit both axially and laterally (or transversely) by one or more attachment portions, tabs, or other such members. In certain other such embodiments of the present disclosure, the anchor is attached to the drill bit laterally (or transversely) by one or more attachment portions, tabs, or other such members.

In other certain embodiments of the present disclosure, the self-drilling anchor assembly includes: (a) a drill bit; and (b) an anchor positionable on or over and attached to the drill bit such that when the drill bit rotates, the anchor does not rotate with the drill bit (or can independently rotate). In certain such embodiments of the present disclosure, the anchor is attached to the drill bit axially (but not laterally or transversely) by one or more attachment portions, tabs, or other such members. In certain such embodiments, the attachment of the anchor to the drill bit causes the anchor to move axially with the drill bit such as when the drill bit drills a hole and moves into a substrate, the anchor moves into the hole with the drill bit. Certain embodiments of the present disclosure thus take into account that during the drilling process, the anchor will likely come in contact with the wall of the hole being created by the drill bit. This may cause the anchor to bind in the hole from friction and effectively stop rotating while the drill bit is still spinning (and drilling). The axially attachment enables the anchor to remain attached to the drill bit in such instances and enables advancement of the drill bit and anchor into the hole even when the anchor stops rotating.

It should further be appreciated that the various embodiments of the present disclosure include or define one or more flutes, openings, or other debris expelling mechanisms that enable, facilitate, or allow the expelling of debris as the drill bit drills the hole in the substrate. These flutes, openings, or other debris expelling mechanisms are configured in the drill bit and/or the anchor to act individually and/or to co-act to enable, facilitate, or allow the expelling of debris as the drill bit drills the hole in the substrate (when both the drill bit and the anchor are rotating or when just the drill bit is rotating). As discussed below, the quantity, shape, and sizes of each of these one or more flutes, openings, and other debris expelling mechanisms may vary in accordance with the present disclosure.

Referring now to FIGS. 1 to 13, one example embodiment of a self-drilling anchor assembly of the present disclosure is generally illustrated. The self-drilling anchor assembly of this illustrated example embodiment is generally indicated by numeral 100. The self-drilling anchor assembly 100 generally includes: (a) a drill bit 200; and (b) an anchor 300 positionable on or over and attached to the drill bit 200.

Figure 2:
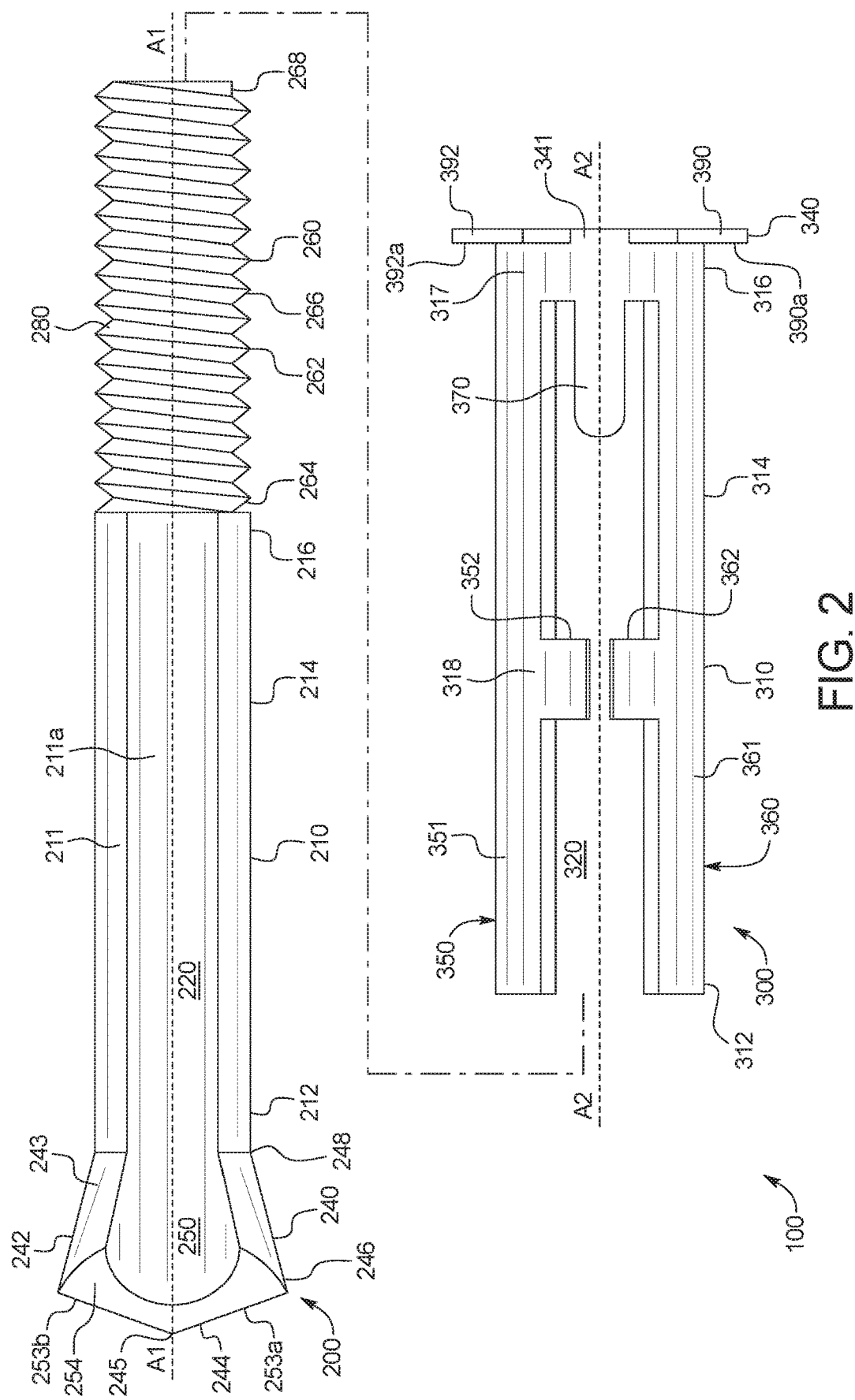
FIG. 2 is an exploded side view of the self-drilling anchor assembly of FIG. 1, and illustrating the anchor and the drill bit of the self-drilling anchor assembly prior to assembly.
Figure 3:
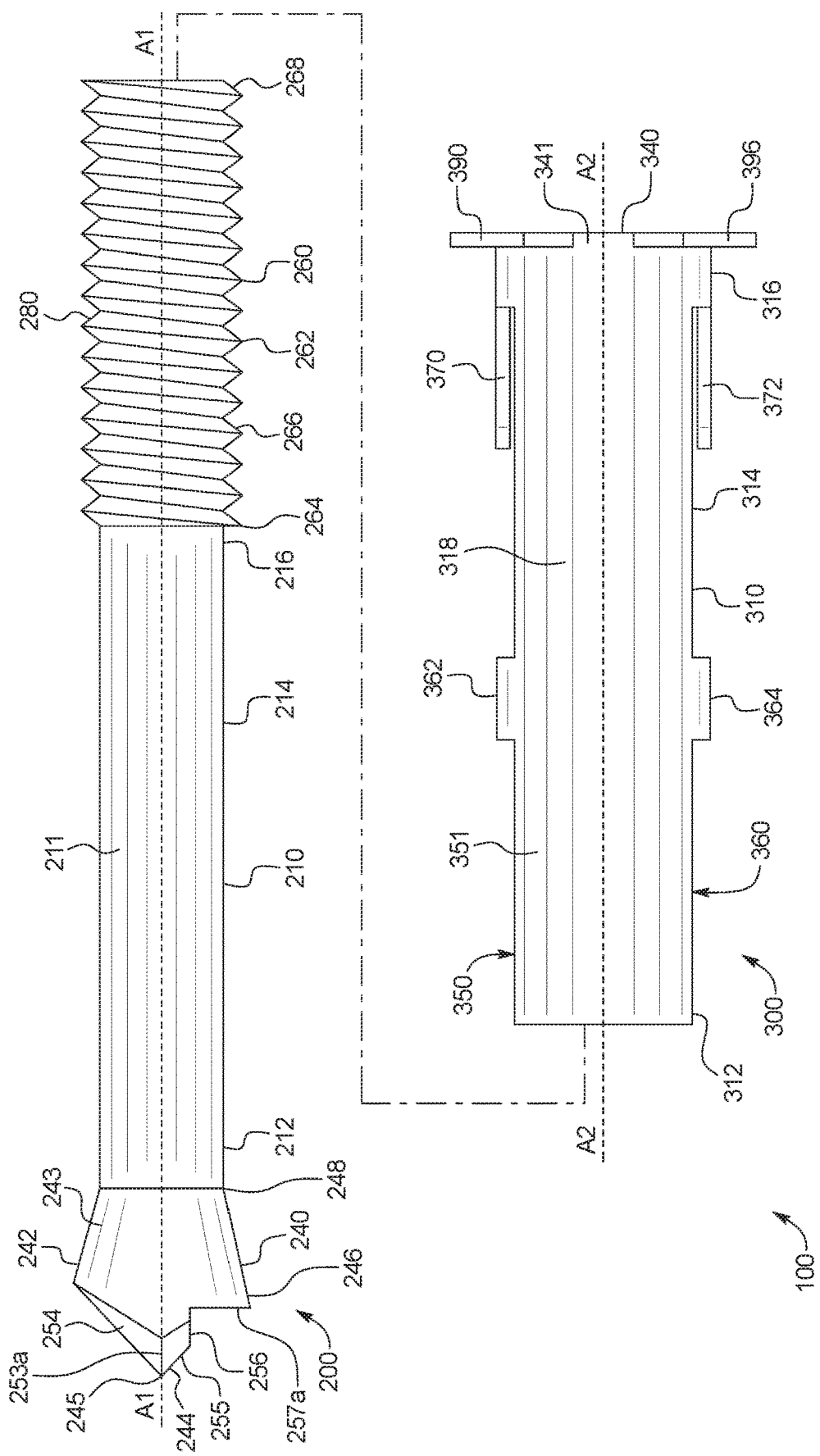
FIG. 3 is an exploded top view of the self-drilling anchor assembly of FIG. 1, and illustrating the anchor and the drill bit of the self-drilling anchor assembly prior to assembly.
Figure 11:
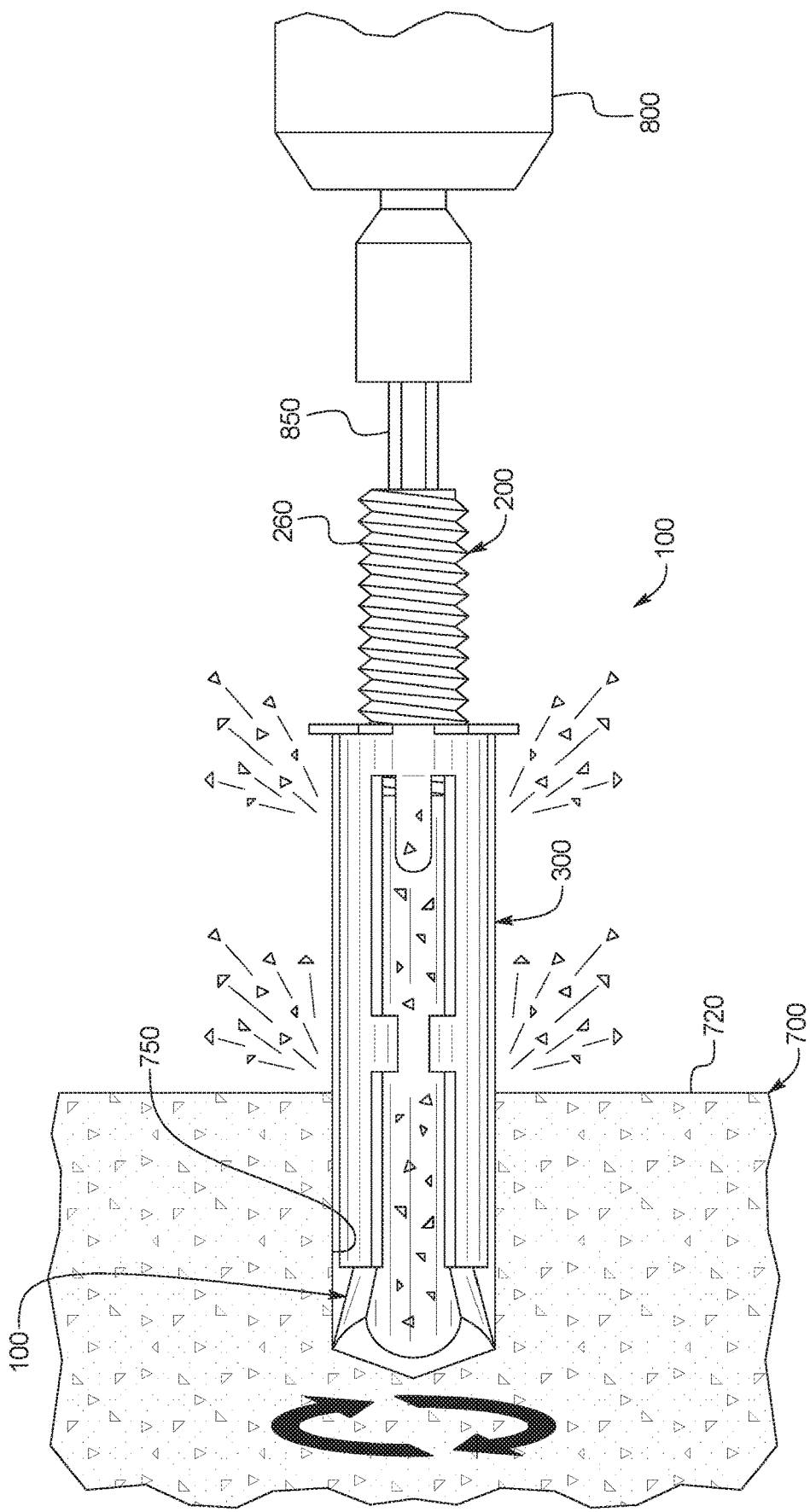
FIG. 11 is a side view of a drill (shown in fragmentary) rotating the self-drilling anchor assembly of FIG. 1 to form a hole in an example concrete wall substrate (shown in cross-section).
Figure 12:
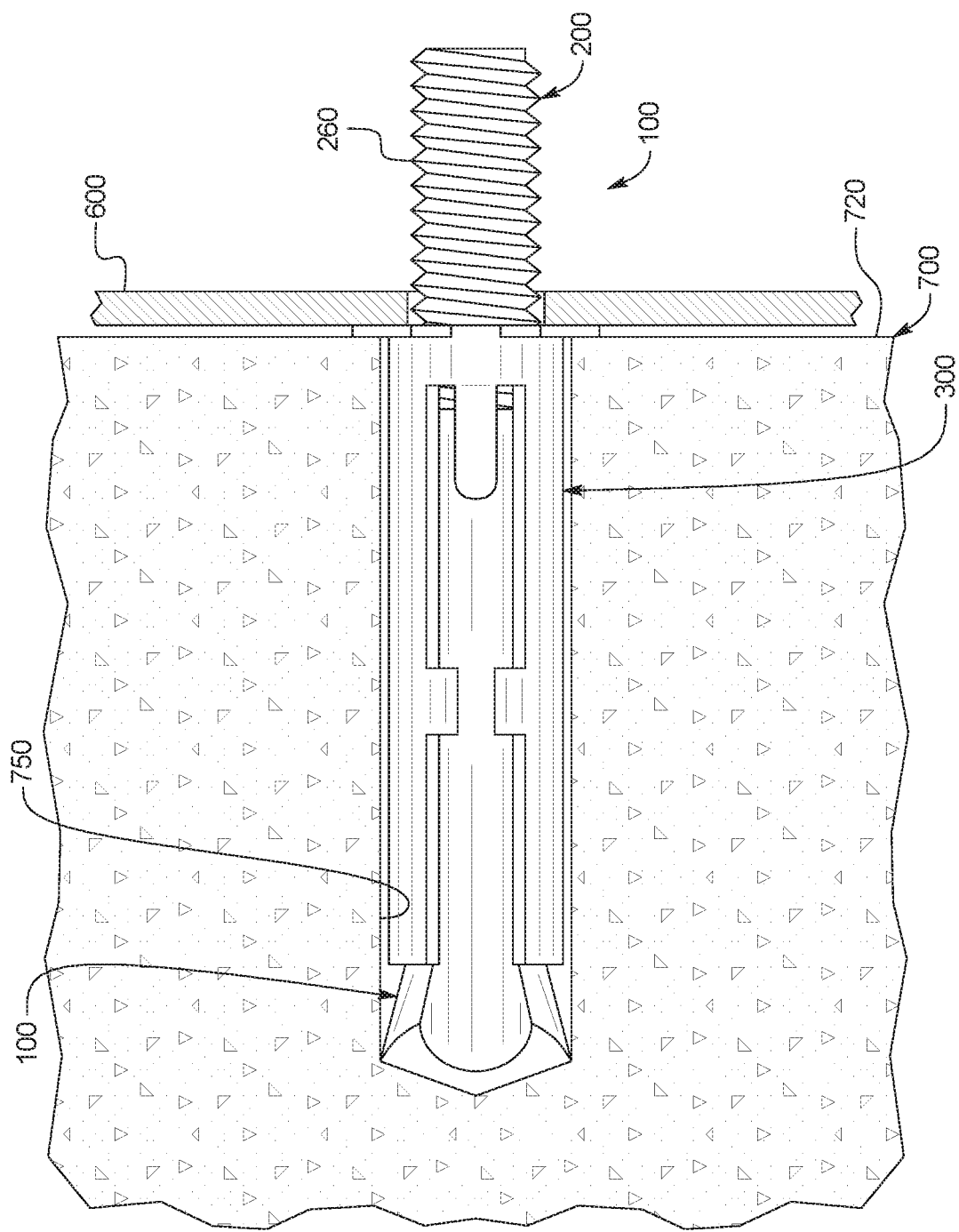
FIG. 12 is a side view of the self-drilling anchor assembly of FIG. 1 positioned in the hole formed in the example concrete wall substrate (shown in cross-section), and with a fixture mounted on the tail of the drill bit.
Figure 13:
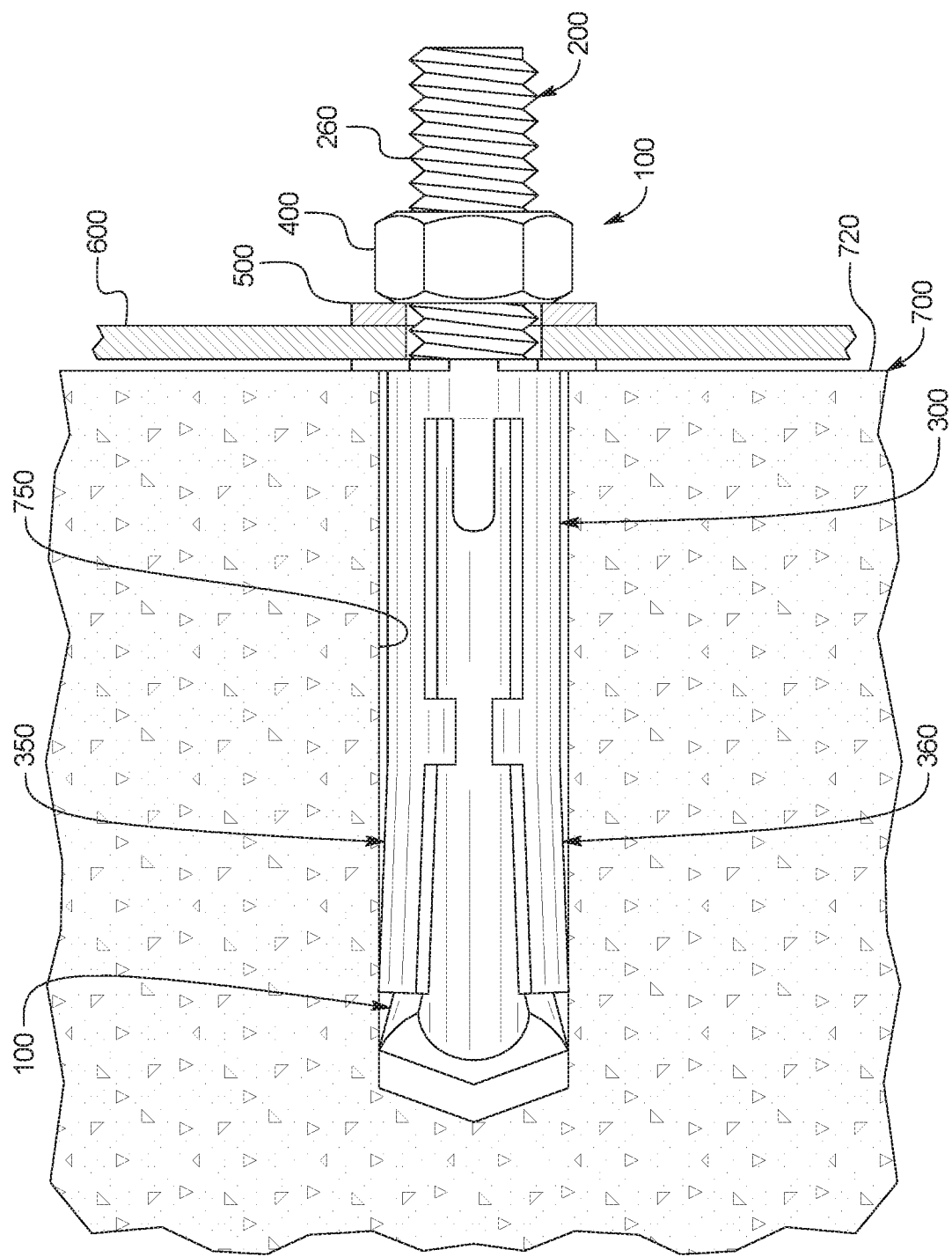
FIG. 13 is a side view of the self-drilling anchor assembly in the hole formed in the example concrete wall substrate (shown in cross-section), and with a washer and nut attached to the tail of the drill bit and securing the fixture to the concrete wall substrate (shown in cross-section).

FIGS. 1, 2, and 3 show the self-drilling anchor assembly 100 and specifically the drill bit 200 and the anchor 300 before assembly. FIGS. 4 to 10 show the self-drilling anchor assembly 100 and specifically the drill bit 200 and the anchor 300 after assembly wherein: (a) the anchor is positioned on or over and attached to the drill bit 200; and (b) the drill bit 200 is partially positioned in and extends at both front and rear ends from the anchor 300. FIGS. 11, 12, and 13 show the assembled self-drilling anchor assembly 100 being used to drill a hole in a substrate and to attach a fixture to the substrate as further described below.

More specifically, as best shown in FIGS. 1, 2, and 3, the drill bit 200 includes: (a) a generally cylindrical solid shank 210 having a front end 212, an intermediate or center portion 214, and a rear end 216; (b) a drill head 240 integrally connected to and extending from the front end 212 of the shank 210; and (c) an exterior threaded tail 260 integrally connected to and extending from the rear end 216 of the shank 210. The drill bit 200 and specifically the shank 210, the drill head 240, and the tail 260 have a generally central longitudinal axis labeled A1. The drill bit 200 is configured to remain in the substrate and assist in maintaining the anchor 300 in the substrate as further explained below.

Figure 9:
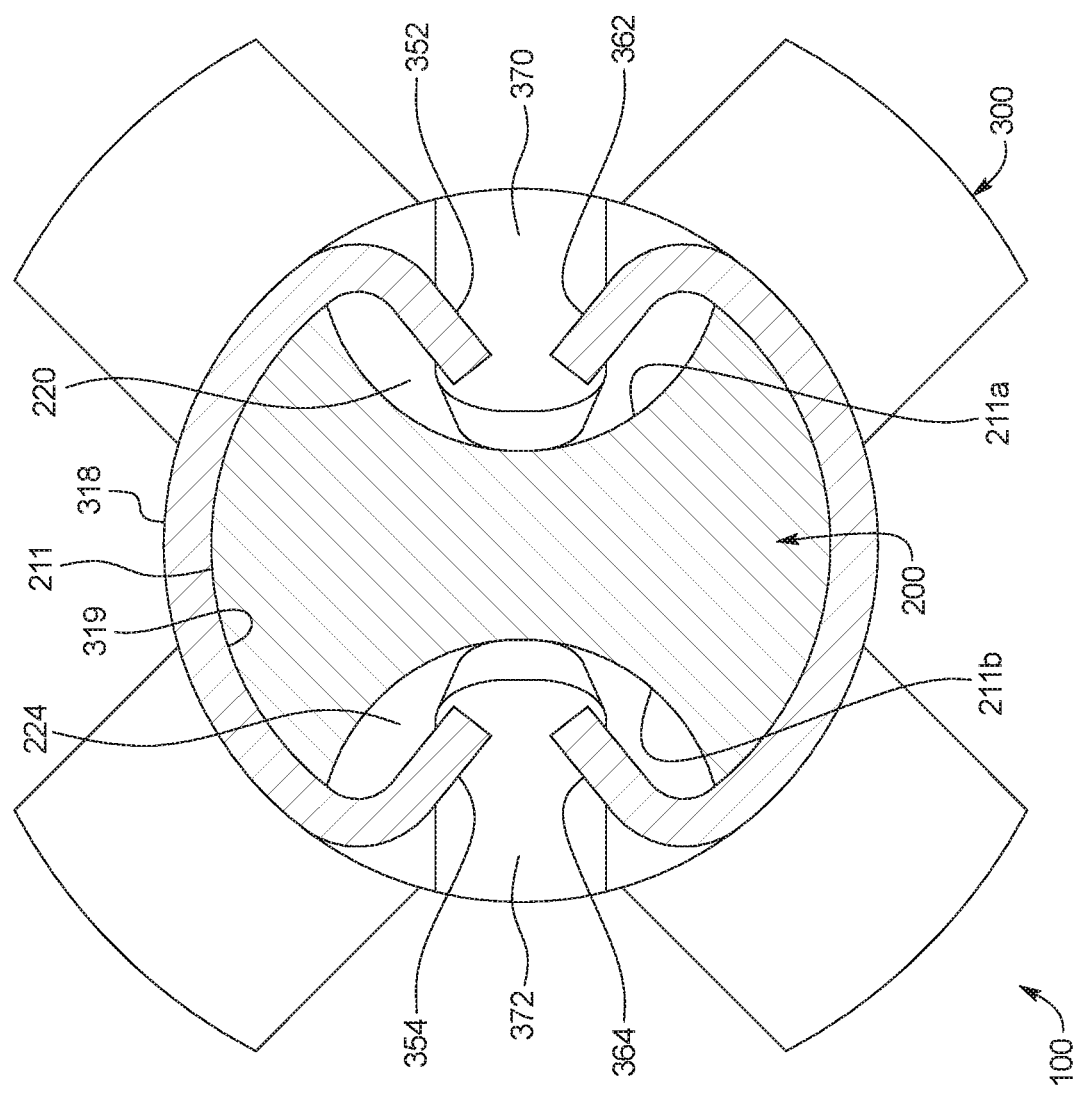
FIG. 9 is a cross-sectional view of the self-drilling anchor assembly of FIG. 1, illustrating the anchor and the drill bit of the self-drilling anchor assembly after assembly, and taken substantially through line 9-9 of FIG. 5.

As best shown in FIGS. 1, 2, and 9, the shank 210 includes an outer surface 211 that includes two recessed sections 211a and 211b that respectively define two opposing longitudinally extending flutes 220 and 224 that each extend longitudinally along the entire length of the shank 210. The flutes 220 and 224 each have a generally semi-cylindrical cross section (at each point along the longitudinal length) and are configured to direct debris such as loose material of the substrate that is broken away by the drill head 240 from the drill head 240 toward the rear end 216 of the shank 210 and out of the hole being formed in the substrate as generally illustrated in FIG. 11. It should be appreciated that the shank 210 may be alternatively configured (in shape and/or size) in accordance with the present disclosure.

As best shown in FIGS. 1, 2, and 3, the drill head 240 includes a solid body 242 having a tip end 244, an intermediate or center portion 246, and a rear end 248. The rear end 248 is integrally connected to and extends from the front end 212 of the shank 210. The intermediate or center portion 246 has a generally wider outer diameter than the tip end 244 and the rear end 248.

Figure 8:
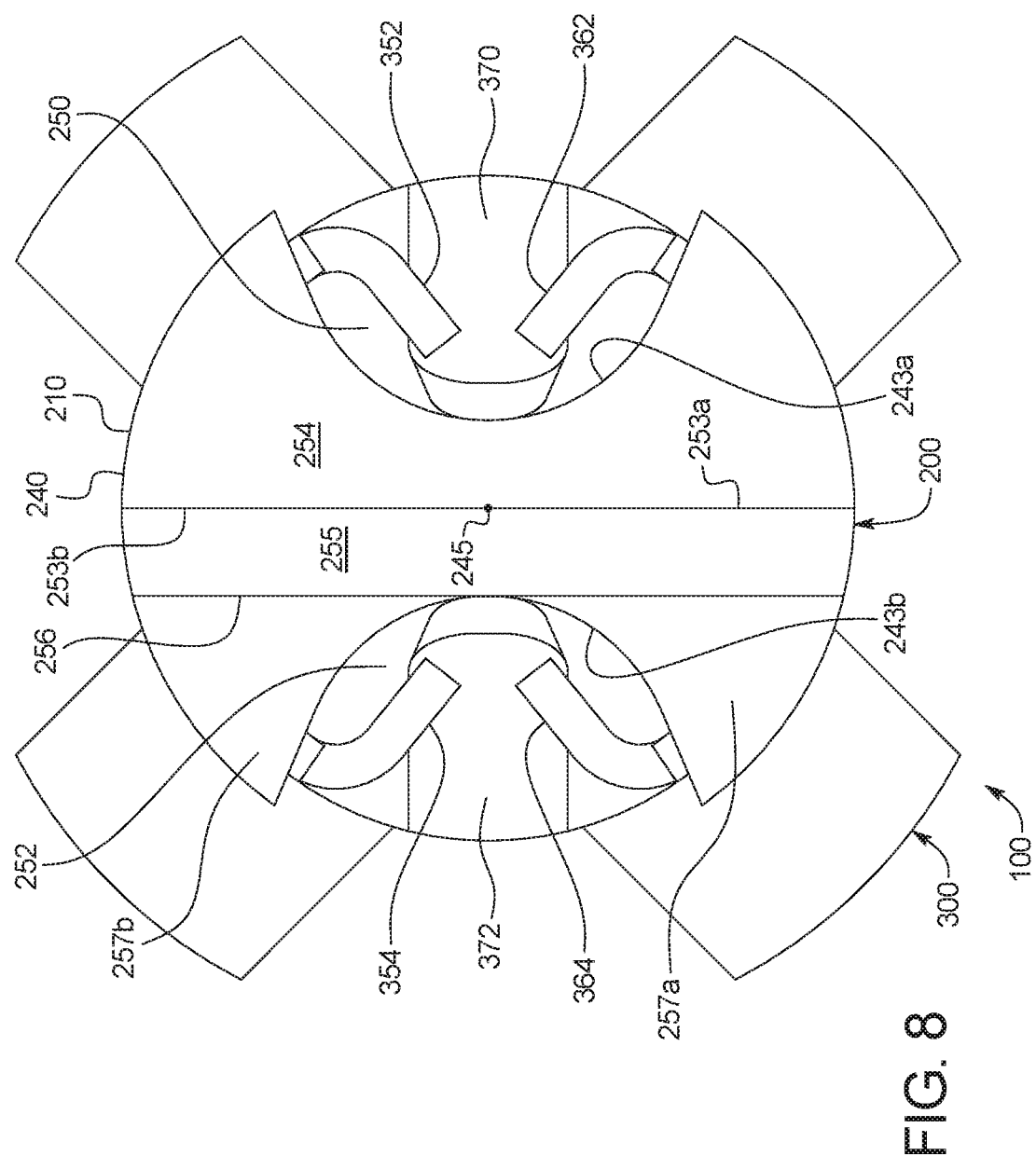
FIG. 8 is a front end view of the self-drilling anchor assembly of FIG. 1, and illustrating the anchor and the drill bit of the self-drilling anchor assembly after assembly.

As best shown in FIGS. 1, 2, and 8, the body 242 includes an outer surface 243 that includes two recessed sections 243a and 243b that respectively define two opposing longitudinally extending flutes 250 and 252 that each extend longitudinally along a portion of the body 242 toward the shank 210. The flutes 250 and 252 each have a semi-cylindrical cross section and are configured to direct loose material of the substrate (that is broken away by the tip end 244) toward the front end 212 of the shank 210 and out of the hole being formed in the substrate as generally illustrated in FIG. 11. The flutes 250 and 252 are respectively aligned with and are configured to communicate loose material to the flutes 220 and 224 defined by the shank 210. Each of the flutes 250 and 252 are relatively wider toward the tip end 244 and are narrower at or taper to the rear end 248 of the body 242. At the rear end 248, each of the flutes 250 and 252 has the same or substantially the same cross-sectional area as the respective flutes 220 and 224 defined by the shank 210 as best shown by FIGS. 1 and 2.

The tip end 244 has a pointed drill tip 245 that is positioned at or along the central longitudinal axis A1. The tip end 244 includes two front outwardly and rearwardly extending angled cutting edges 253a and 253b that extend from the tip 245. The tip end 244 includes a first side portion that includes a cutting surface 254 that extends rearwardly and outwardly from the cutting edges 253a and 253b to the section 243a of the surface 243 of the drill head 240 that defines the flute 250. The tip end 244 includes a second side portion that includes a first cutting surface 255 that extends rearwardly and outwardly from the cutting edges 253a and 253b to a second cutting surface 256 that in turn extends rearwardly to two spaced apart cutting surfaces 257a and 257b that in turn extend outwardly to the section 243b of the surface 243 of the drill head 240 that defines the flute 252.

It should be appreciated that the drill head of any of the various embodiments may be alternatively configured (in shape, surfaces, angles, and/or size) in accordance with the present disclosure.

The threaded tail 260 includes a generally cylindrical body 262 having a front end 264, an intermediate or center portion 266, and a rear end 268. The front end 264 is integrally connected to and extends from the rear end 216 of the shank 210. The threaded tail 260 includes an outer outwardly extending helical thread formation 280 to facilitate attachment of a securing device such as a nut 400 and a washer 500 to the threaded tail 260 of the drill bit 200 (as generally shown in FIG. 13 and as further discussed below). The external helical thread formation 280 of the tail has a plurality of spaced apart thread sections (not labeled) that have or form outer edges or crests (not labeled) and valleys (not labeled) between the crests. The outer diameter of the helical thread formation (sometimes called the crest diameter) is greater than the outer diameter of the shank body 210 in this illustrated example embodiment to facilitate attachment of the anchor 300 to the drill bit 200 as further discussed below.

Figure 7:
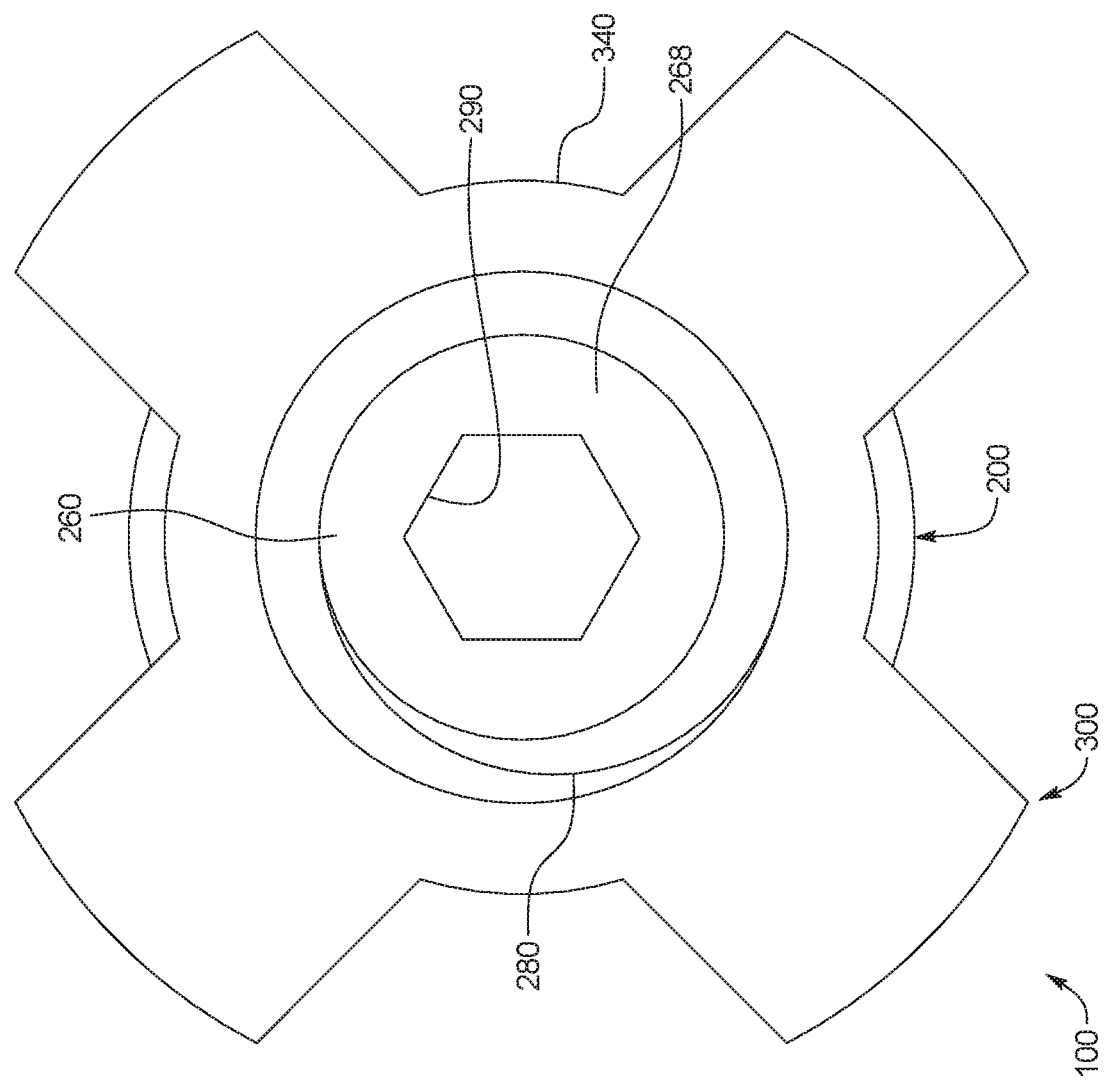
FIG. 7 is a rear end view of the self-drilling anchor assembly of FIG. 1, and illustrating the anchor and the drill bit of the self-drilling anchor assembly after assembly.
Figure 10:
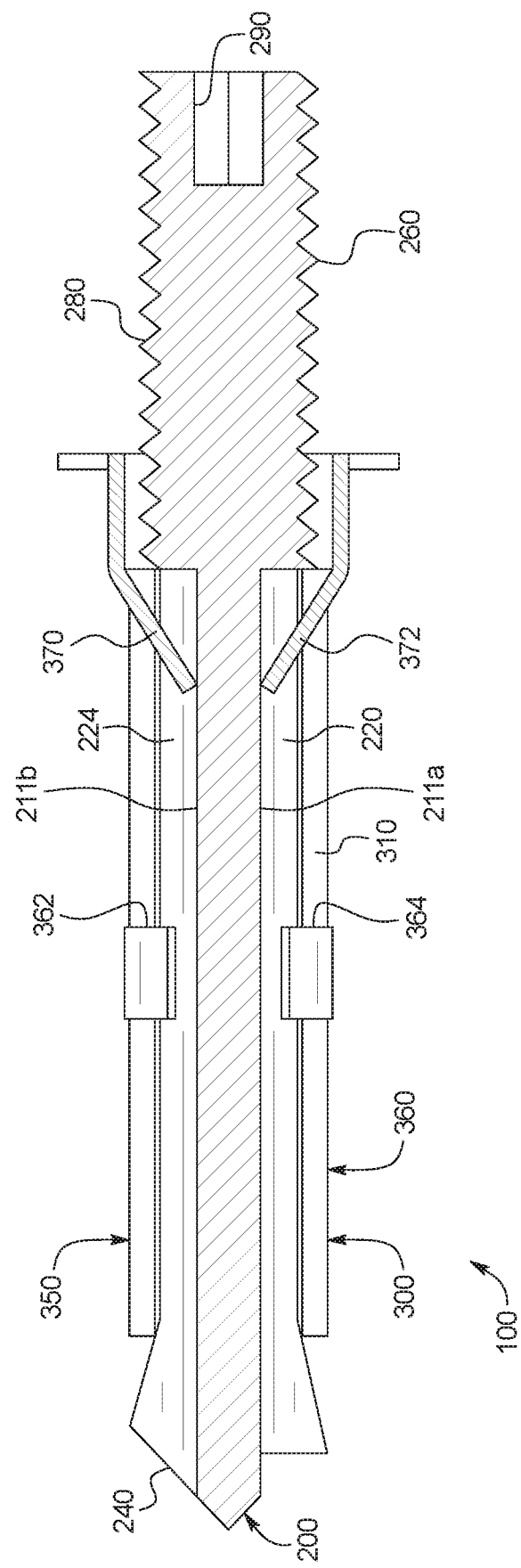
FIG. 10 is a cross-sectional view of the self-drilling anchor assembly of FIG. 1, illustrating the anchor and the drill bit of the self-drilling anchor assembly after assembly, and taken substantially through line 10-10 of FIG. 5.

The threaded tail 260 includes an interior mechanical engaging structure 290 (as best seen in FIGS. 7 and 10) that is accessible from the rear end 268 of the body 262. The mechanical engaging structure 290 is engageable by a suitable tool to rotate the drill bit 200 (as generally shown in FIG. 11 and as further discussed below). In this illustrated example embodiment of the present disclosure, the mechanical engaging structure 290 includes a plurality of internal walls (not labeled) having a plurality of first surfaces (not labeled) that define a hexagonal shaped slot or receiving formation configured to receive a hex head of or attached to a rotating tool such that the hex head can engage these respective first surfaces that define the hexagonal shaped slot. It should be appreciated that in other embodiments of the present disclosure, other mechanical engaging structures may be employed as the mechanical engaging structure of the tail in accordance with the present disclosure.

It should be appreciated that in this embodiment and other embodiments disclosed herein the tail may be alternatively configured (in shape and/or size) in accordance with the present disclosure. For example, it should also be appreciated that in other example embodiments of the present disclosure, the threads are on an inside surface of the tail of the drill bit and the mechanical engaging structure is on the outside surface of the tail of the drill bit. It should be further appreciated that in various alternative embodiments, the thread formations may be left-handed (instead of right-handed as generally shown).

In this illustrated example embodiment, the drill bit 200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

The anchor 300 includes: (i) an elongated generally tubular body 310 having an a front end 312, an intermediate or center portion 314, a rear end 316, an outer surface 318, and an inner surface 319; and (ii) a head 340 integrally connected to and extending from the rear end 316 of the tubular body 310.

The outer surface 318 of the body 310 has an outer diameter (not labeled); and (b) the inner surface 319 of the body 310 has an inner diameter (not labeled). The inner surface 319 of the tubular body 310 defines a longitudinally extending inner channel 320 configured to receive the drill bit 200 as generally shown in FIGS. 4 to 10, and thus has a larger inner diameter than the outer diameter of the shank 210 of the drill bit 200. The inner surface 319 of the tubular body 310 also has a larger inner diameter than the outer diameter of the tail 260 of the drill bit 200. However, the inner surface 319 of the tubular body 310 has a smaller inner diameter than the outer diameter of the rear end 248 of the drill head 240 of the drill bit 200. The body 310 has a generally central longitudinal axis labeled A2 that is aligned with or that extends along the same central longitudinal axis AI of the drill bit 200 when the drill bit 200 is positioned in the anchor 300.

The front end 312, the intermediate or center portion 314, and the rear end 316 of the body 310 of the anchor 300 define, form, or include two independently movable or pivotable longitudinally extending opposing gripping arms 350 and 360. The gripping arm 350 includes a longitudinally extending curved wall 351 and two drill bit attachment members or tabs 352 and 354 integrally connected to and circumferentially extending from opposite sides of the curved wall 351. Likewise, the gripping arm 360 includes a longitudinally extending curved wall 361 and two drill bit attachment members or tabs 362 and 364 integrally connected to and circumferentially extending from opposite sides of the curved wall 361. It should be appreciated that the quantity of these attachment members or tabs may vary in accordance with the present disclosure.

The rear end 316 of the body 310 of the anchor 300 includes a cylindrical wall 317 that defines a longitudinally extending inner cylindrical channel (not labeled) that is aligned with and in communication with the longitudinally extending inner channel 320 of the body 310. The rear end 316 of the body 310 of the anchor 300 includes two opposing drill bit attachment members or tabs 370 and 372 integrally connected to and longitudinally extending from opposite sides of the wall 317. It should be appreciated that the quantity of these attachment members or tabs may vary in accordance with the present disclosure.

The front end 312, the intermediate or center portion 314, and the rear end 316 of the body 310 (or of the gripping arms 350 and 360) also define two spaced apart opposing longitudinally extending openings 321a and 321b (labeled in FIG. 1) that are generally configured to respectively align with the flutes 220 and 250 and 224 and 252 to enable the materials of the substrate removed by the drill head 240 to move from these flutes through the anchor 300 and out of the hole being drilled in the substrate as generally shown in FIG. 11. The gripping arms in this illustrated example embodiment are identical or substantially identical. It should be appreciated that in other embodiments of the present disclosure, the gripping arms do not need to be identical or substantially identical and that the quantity of gripping arms may vary.

The head 340 of the anchor 300 includes a cylindrical wall 341 that includes an inner surface (not shown) that defines a longitudinally extending inner channel (not shown) that is aligned with and in communication with the longitudinally extending inner channel of the rear end 316 of the body 310 of the anchor 300 and that is aligned with and in communication with the longitudinally extending inner channel 320 of the body 310. The head 340 also includes flanges 390, 392, 394, and 396 that are integrally connected to and extend outwardly or transversely from the cylindrical wall 341. The flanges 390, 392, 394, and 396 of the head 340 of the anchor 300 have flat or generally flat inner engagement surfaces 390a, 392a, 394a, and 396a. These engagement surfaces 390a, 392a, 394a, and 396a are configured to engage an outer surface of a substrate such as outer surface 720 of substrate 700 as generally shown in FIGS. 12 and 13. It should be appreciated that the head of the anchor may be alternatively configured in accordance with the present disclosure.

In this illustrated example embodiment, the anchor 300 is made from Carbon steel, and plated and/or coated to resist corrosion. However, it should be appreciated that the anchor can be made from other suitable materials and in other suitable manners.

As mentioned above, FIGS. 1, 2, and 3 show the self-drilling anchor assembly 100 before assembly and FIGS. 4 to 10 show the self-drilling anchor assembly after assembly. To assemble the self-drilling anchor assembly 100, the drill bit 200 and specifically the tail 260 of the drill bit 200 is inserted into the front end 312 of the body 310 of the anchor 300 and moved through the anchor 300 until the tail 260 extends out of the rear end 316 of the anchor 300, and the rear end 248 of the head 240 engages or is adjacent to the front end 312 of the body 310 of the anchor 300. At this point in the assembly process, the attachment members or tabs 352 and 354 are pushed or bent inwardly into the flute 220 such that they are closer to or such that they engage the recessed section 211a that defines the flute 220 (as shown in FIGS. 4, 5, 8, 9, and 10). Likewise, at this point in the assembly process, the attachment members or tabs 362 and 364 are pushed or bent inwardly into the flute 224 such that they are closer to or such that they engage the recessed section 211b that defines the flute 224 (as shown in FIGS. 4, 5, 8, 9, and 10). At this point in the assembly process, the attachment member or tab 370 is pushed or bent inwardly into the flute 220 such that it closer to or such that it engages the recessed section 211a that defines the flute 220. Likewise, at this point in the assembly process, the attachment member or tab 372 is pushed or bent inwardly into the flute 224 such that it closer to or such that it engages the recessed section 211b that defines the flute 224.

Figure 4:
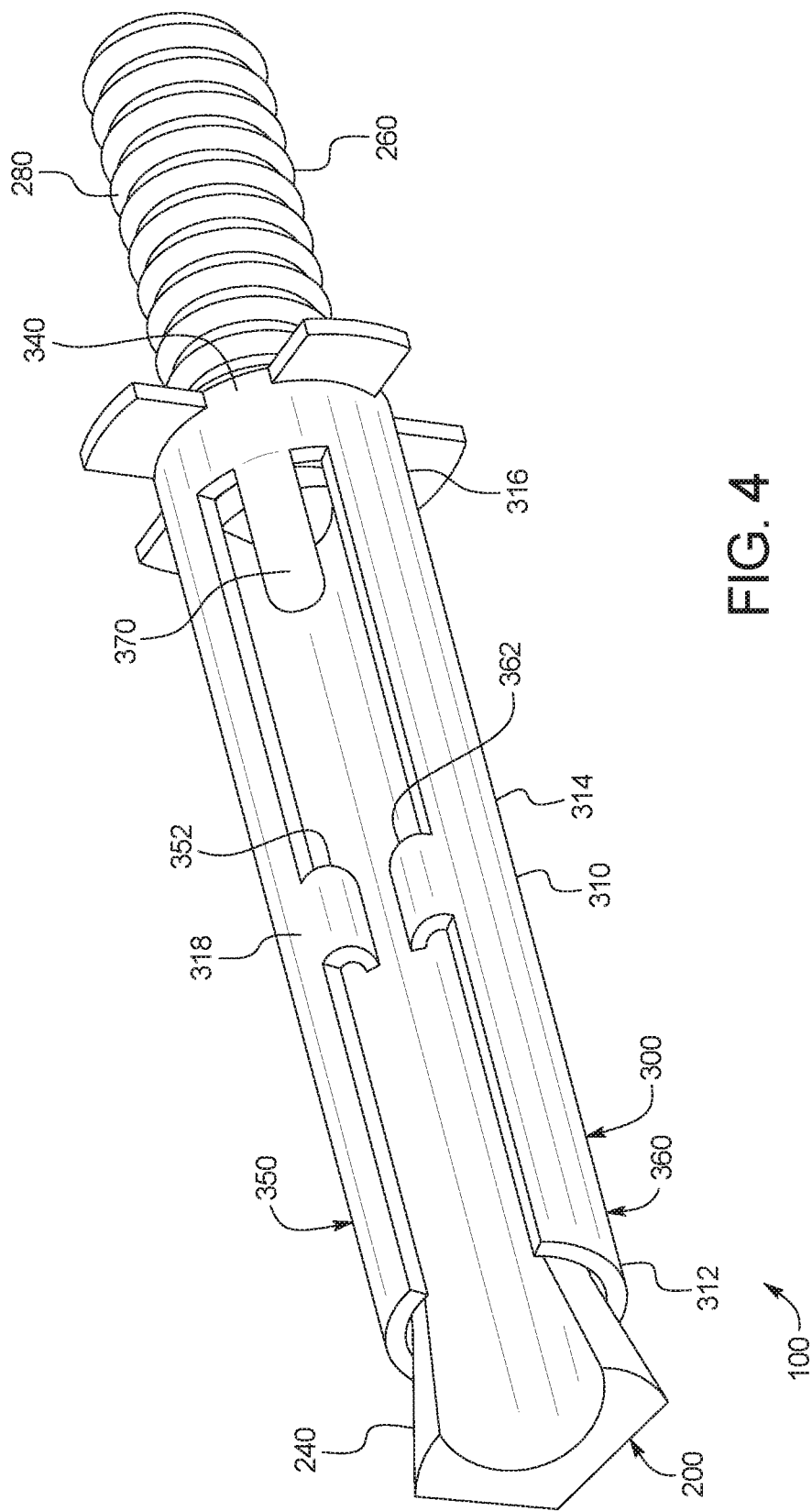
FIG. 4 is a perspective view of the self-drilling anchor assembly of FIG. 1, and illustrating the anchor and the drill bit of the self-drilling anchor assembly after assembly.
Figure 5:
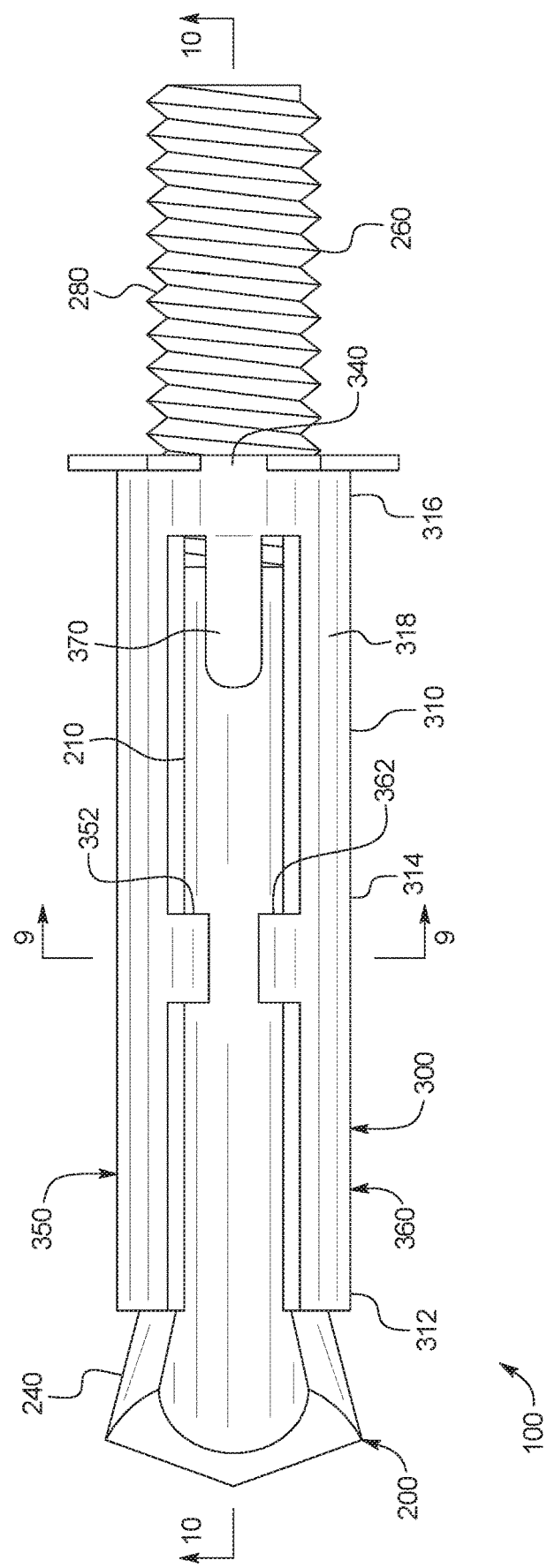
FIG. 5 is a side view of the self-drilling anchor assembly of FIG. 1, and illustrating the anchor and the drill bit of the self-drilling anchor assembly after assembly.
Figure 6:
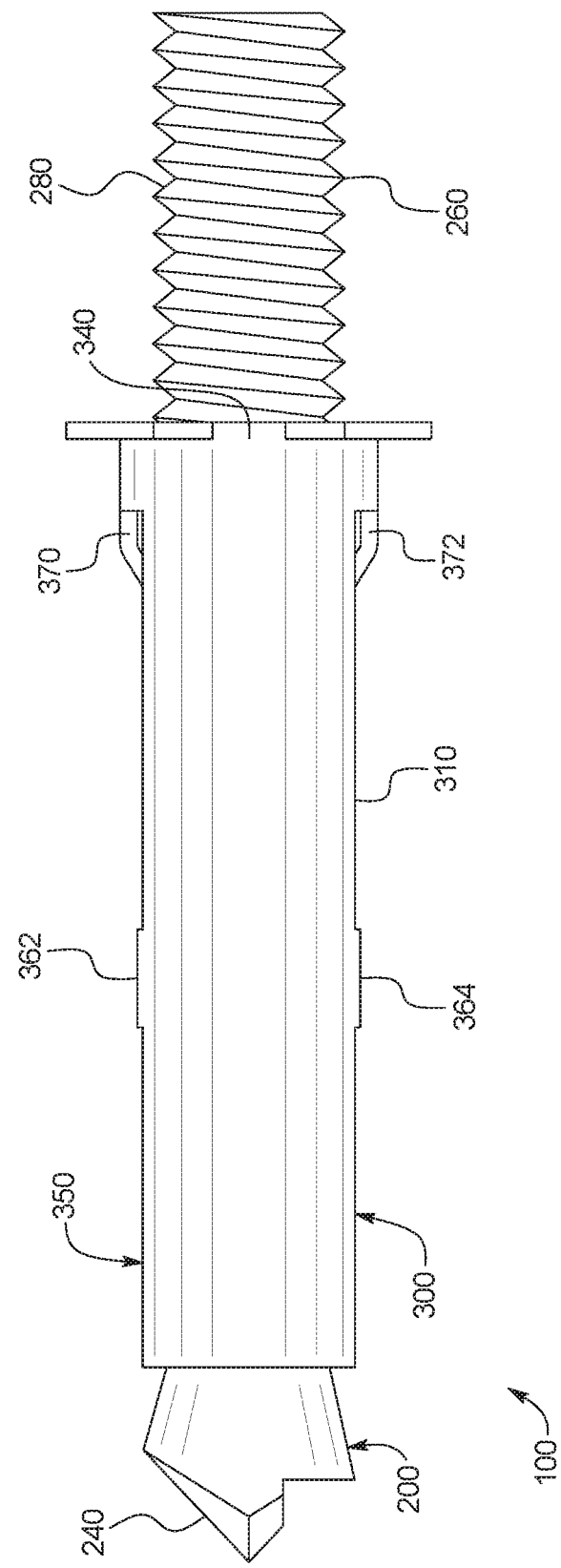
FIG. 6 is a top view of the self-drilling anchor assembly of FIG. 1, and illustrating the anchor and the drill bit of the self-drilling anchor assembly after assembly.

The attachment members or tabs 352, 354, 362, 364, 370, and 372 co-act to maintain the anchor 300 in the desired position around the drill bit 200. The attachment members or tabs 352, 354, 362, 364, 370, and 372 co-act to cause the anchor 300 to rotate with the drill bit 200 when the drill bit 200 is rotated. The attachment members or tabs 370 and 372 co-act to prevent the drill bit 200 from exiting the anchor 310 because they are configured to engage the front end 264 of the body 262 of the tail 260. The attachment members or tabs 370 and 372 also co-act with the respective flutes 220 and 224 to direct loose material out of the flutes and through the respective openings 321a and 321b in the anchor 300 and out of the hole being drilled in the substrate. In this regard, it should be appreciated that the after assembly the attachment members or tabs 370 and 372 are respectively positioned at downwardly extending angles as best shown in FIGS. 4, 6, and 10. It should also be appreciated that the attachment members or tabs 352, 354, 362, 364, 370, and 372 co-act to facilitate certain amounts of desired movement between the drill bit 200 and the anchor 300. It should further be appreciated that the attachment members or tabs can be alternatively configured, alternatively positioned, and that quantity of attachments members or tabs can vary in accordance with the present disclosure.

One example method of the present disclosure of using the above described example anchor assembly 100 to attach a fixture to a substrate is generally illustrated in FIGS. 11, 12, and 13. This example uses a metal member 600 as the fixture and a concrete wall 700 as the substrate; although it should be appreciated that the methods of the present disclosure are not limited to such example fixtures and such example substrates.

Generally, as generally shown in FIG. 11, to attach the metal member 600 to the concrete wall 700 using an anchor assembly of the present disclosure such as example anchor assembly 100, the installer positions the assembled anchor assembly 100 against the concrete wall 700 at the desired positioned of the anchor assembly 100 and uses a drill 800 and engaging structure 850 to rotate the drill bit 200 to drill a hole 750 in the concrete wall 700. Specifically, the installer removably positions the engaging structure 850 in the mechanical engaging structure 290.

As generally shown in FIG. 11, as the drill bit 200 drills the hole 750, the entire anchor assembly 100 extends into the hole 750 in the concrete wall 700. As generally shown in FIG. 11, as the drill bit 200 drills the hole 750, the loose material of the substrate exits the hole 750 by moving from the flutes 250 and 252 defined by the drill head 240 to the flutes 220 and 224 defined by the shank 210 and through the openings 321a and 321b defined by the body 310 of the anchor 300.

When the anchor assembly 100 reaches the fully driven in position shown in FIG. 12, the inner surfaces 390a, 392a, 394a, and 396a of the respective flanges 390, 392, 394, and 396 of the head 340 of the anchor 300 engage the outer surface 720 of the concrete wall 700. At this point, the installer has removed the engaging structure 850 from the mechanical engaging structure 290. At this point, a designated amount or length of the threaded tail 260 of the drill bit 200 partially extends outwardly from the concrete wall 700 as shown in FIG. 12. At this point, the fixture 600 can be placed on the tail 260 of the drill bit.

The washer 500 and the nut 400 are then place on the tail 260 of the drill bit 200. As the nut 400 is tightened, the tightening of the nut 400 starts to draw the drill bit 200 out of the hole 750. As this happens, as shown in FIG. 13, the drill head 240 causes the gripping arms 350 and 360 to expand or move outwardly and engage the inner surfaces that define the hole 750 to cause the anchor 300 to frictionally engage the substrate 700 to secure the anchor assembly 100 in the substrate 700. More specifically, the angled surfaces of the intermediate portion 246 of the drill head 240 of the drill bit 200 engage the inner surface 319 of the body 310 or of the gripping arms 350 and 360 and causes the outer surface 318 of the body 310 or of the gripping arms 350 and 360 to engage the inner surfaces that define the hole 750 to cause the anchor 300 to frictionally engage the substrate 700 to secure the anchor assembly 100 in the substrate 700.

It should be appreciated from the above, that the drill bit 200 remains as part of the anchor assembly 100 in the substrate 700. It should further be appreciated as mentioned above, that the drill bit 200 will thus be typically only used one time and can be made from a relatively inexpensive material because wearing or dulling of the cutting tip and edges of the drill bit will not be a problem.

It should be appreciated from the above that the anchor assembly and the method of installing the anchor assembly of the present disclosure saves the installer a significant amount of time because it combines the two steps of drilling the hole and inserting the anchor.

It should be appreciated from the above the present disclosure includes or provides the combination of the drill bit and the anchor (i.e., the anchor assembly), the drill bit itself, and the anchor itself.

The present disclosure further provides a self-drilling anchor assembly and a method of installing the self-drilling anchor assembly.

Figure 14:
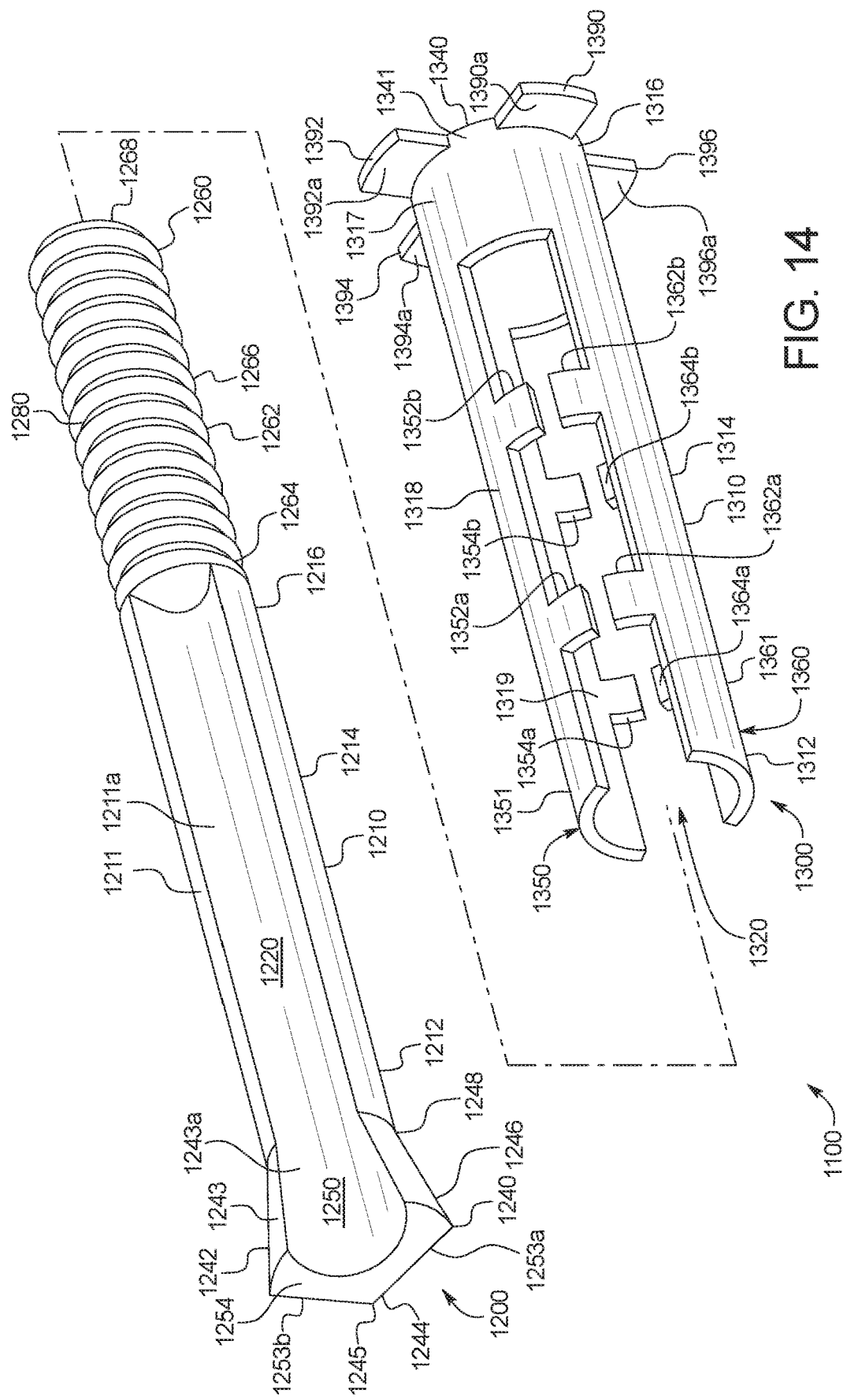
FIG. 14 is an exploded perspective view of a self-drilling anchor assembly of another example embodiment of the present disclosure, and illustrating the anchor and the drill bit of the self-drilling anchor assembly prior to assembly.
Figure 15:
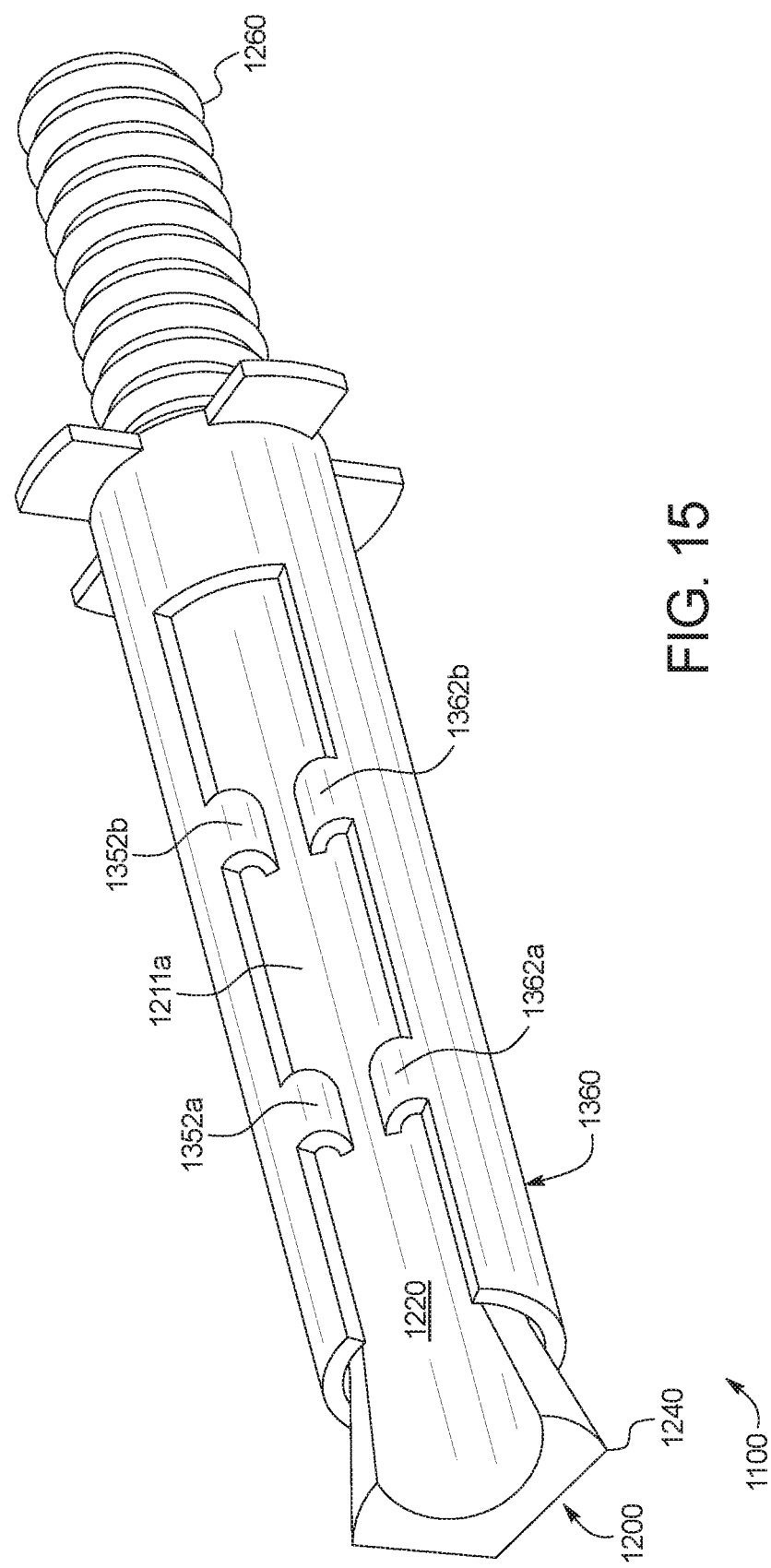
FIG. 15 is a perspective view of the self-drilling anchor assembly of FIG. 14, and illustrating the anchor and the drill bit of the self-drilling anchor assembly after assembly.

Referring now to FIGS. 14 and 15, another example embodiment of a self-drilling anchor assembly of the present disclosure is generally illustrated. The self-drilling anchor assembly of this illustrated example embodiment is generally indicated by numeral 1100. The self-drilling anchor assembly 1100 generally includes: (a) a drill bit 1200; and (b) an anchor 1300 positionable on or over and attached to the drill bit 1200. FIG. 14 shows the self-drilling anchor assembly 1100 and specifically the drill bit 1200 and the anchor 1300 before assembly. FIG. 15 shows the self-drilling anchor assembly 1100 and specifically the drill bit 1200 and the anchor 1300 after assembly wherein: (a) the anchor 1300 is positioned on or over and attached to the drill bit 1200; and (b) the drill bit 1200 is partially positioned in and extends at both front and rear ends from the anchor 1300.

In this example embodiment, the drill bit 1200 is identical or substantially identical to the drill bit 200 (described above), and will thus only be generally described. The drill bit 1200 includes: (a) a generally cylindrical solid shank 1210 having a front end 1212, an intermediate or center portion 1214, and a rear end 1216; (b) a drill head 1240 integrally connected to and extending from the front end 1212 of the shank 1210; and (c) an exterior threaded tail 1260 integrally connected to and extending from the rear end 1216 of the shank 1210. The shank 1210 has an outer surface 1211 that includes two recessed sections (including a first recessed section 1211a and a second recessed section (not shown or labeled in FIG. 14 or 15)) that respectively define two opposing longitudinally extending flutes (including a first flute 1220 and a second flute (not shown or labeled in FIG. 14 or 15)) that each extend longitudinally along the entire length of the shank 1210.

The drill head 1240 includes a solid body 1242 having a tip end 1244, an intermediate or center portion 1246, and a rear end 1248. The rear end 1248 is integrally connected to and extends from the front end 1212 of the shank 1210. The intermediate or center portion 1246 has a generally wider outer diameter than the tip end 1244 and the rear end 1248. The body 1242 has an outer surface 1243 that includes two recessed sections (including a first recessed section 1243a and a second recessed section (not shown or labeled in FIG. 14 or 15)) that respectively define two opposing longitudinally extending flutes (including a first flute 1250 and a second flute (not shown or labeled in FIG. 14 or 15)) that each extend longitudinally along a portion of the body 1242 toward the shank 1210. Each of the flutes are relatively wider toward the tip end 1244 and are narrower at or taper to the rear end 1248 of the body 1242. At the rear end 1248, each of the flutes has the same or substantially the same cross-sectional area as the respective flutes defined by the shank 1210. The tip end 1244 has a pointed drill tip 1245 that is positioned at or along the central longitudinal axis. The tip end 1244 includes two front outwardly and rearwardly extending angled cutting edges 1253a and 1253b that extend from the tip 1245. The tip end 1244 includes a first side portion that includes a cutting surface 1254 that extends rearwardly and outwardly from the cutting edges 1253a and 1253b to the section 1243a of the surface 1243 of the drill head 1240 that defines the flute 1250. The tip end 1244 includes a second side portion (not shown or labeled in FIG. 14 or 15) that includes a first cutting surface (not shown or labeled in FIG. 14 or 15) that extends rearwardly and outwardly from the cutting edges 1253a and 1253b to a second cutting surface (not shown or labeled in FIG. 14 or 15) that in turn extends rearwardly to two spaced apart cutting surfaces (not shown or labeled in FIG. 14 or 15).

The threaded tail 1260 includes a generally cylindrical body 1262 having a front end 1264, an intermediate or center portion 1266, and a rear end 1268. The front end 1264 is integrally connected to and extends from the rear end 1216 of the shank 1210. The threaded tail 1260 includes an outer outwardly extending helical thread formation 1280 to facilitate attachment of a securing device such as a nut (not shown or labeled in FIG. 14 or 15) and a washer (not shown or labeled in FIG. 14 or 15) to the threaded tail 1260 of the drill bit 1200. The threaded tail 1260 includes an interior mechanical engaging structure (not shown or labeled in FIG. 14 or 15) that is accessible from the rear end 1268 of the body 1262. The mechanical engaging structure is engageable by a suitable tool to rotate the drill bit 1200.

In this illustrated example embodiment, the drill bit 1200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate.

The anchor 1300 is somewhat similar to the anchor 300 (described above), but includes certain alternatively configured parts. The anchor 1300 includes: (i) an elongated generally tubular body 1310 having an a front end 1312, an intermediate or center portion 1314, a rear end 1316, an outer surface 1318, and an inner surface 1319; and (ii) a head 1340 integrally connected to and extending from the rear end 1316 of the tubular body 1310.

The outer surface 1318 of the body 1310 has an outer diameter (not labeled); and (b) the inner surface 1319 of the body 1310 has an inner diameter (not labeled). The inner surface 1319 of the tubular body 1310 defines a longitudinally extending inner channel 1320 configured to receive the drill bit 1200 and thus has a larger inner diameter than the outer diameter of the shank 1210 of the drill bit 1200. The inner surface 1319 of the tubular body 1310 also has a larger inner diameter than the outer diameter of the tail 1260 of the drill bit 1200. However, the inner surface 1319 of the tubular body 1310 has a smaller inner diameter than the outer diameter of the rear end 1248 of the drill head 1240 of the drill bit 1200. The body 1310 has a generally central longitudinal axis that is aligned with or that extends along the same central longitudinal axis of the drill bit 1200 when the drill bit 1200 is positioned in the anchor 1300.

The front end 1312, the intermediate or center portion 1314, and the rear end 1316 of the body 1310 of the anchor 1300 define, form, or include two independently movable or pivotable longitudinally extending opposing gripping arms 1350 and 1360. The gripping arm 1350 includes a longitudinally extending curved wall 1351 and four drill bit attachment members or tabs 1352a, 1352b, 1354a, and 1354b integrally connected to and circumferentially extending from opposite sides of the curved wall 1351. Likewise, the gripping arm 1360 includes a longitudinally extending curved wall 1361 and four drill bit attachment members or tabs 1362a, 1362b, 1364a, and 1364b integrally connected to and circumferentially extending from opposite sides of the curved wall 1361. It should be appreciated that the quantity of these attachment members or tabs may vary in accordance with the present disclosure.

The rear end 1316 of the body 1310 of the anchor 1300 includes a cylindrical wall 1317 that defines a longitudinally extending inner cylindrical channel (not labeled) that is aligned with and in communication with the longitudinally extending inner channel 1320 of the body 1310.

The front end 1312, the intermediate or center portion 1314, and the rear end 1316 of the body 1310 (or of the gripping arms 1350 and 1360) also define two spaced apart opposing longitudinally extending openings (not labeled in FIG. 14 or 15) that are generally configured to respectively align with the flutes of the drill bit 1200 to enable the materials of the substrate removed by the drill head 1240 to move from these flutes through the anchor 1300 and out of the hole being drilled in the substrate. The gripping arms 1350 and 1360 in this illustrated example embodiment are identical or substantially identical. It should be appreciated that in other embodiments of the present disclosure, the gripping arms do not need to be identical or substantially identical and that the quantity of gripping arms may vary.

The head 1340 of the anchor 1300 includes a cylindrical wall 1341 that includes an inner surface (not labeled in FIG. 14 or 15) that defines a longitudinally extending inner channel (not labeled in FIG. 14 or 15) that is aligned with and in communication with the longitudinally extending inner channel of the rear end 1316 of the body 1310 of the anchor 1300 and that is aligned with and in communication with the longitudinally extending inner channel 1320 of the body 1310. The head 1340 also includes flanges 1390, 1392, 1394, and 1396 that are integrally connected to and extend outwardly or transversely from the cylindrical wall 1341. The flanges 1390, 1392, 1394, and 1396 of the head 1340 of the anchor 1300 have flat or generally flat inner engagement surfaces 1390a, 1392a, 1394a, and 1396a. These engagement surfaces 1390a, 1392a, 1394a, and 1396a are configured to engage an outer surface of a substrate. It should be appreciated that the head of the anchor may be alternatively configured in accordance with the present disclosure.

In this illustrated example embodiment, the anchor 1300 is made from Carbon steel, and plated and/or coated to resist corrosion. However, it should be appreciated that the anchor can be made from other suitable materials and in other suitable manners.

To assemble the self-drilling anchor assembly 1100, the drill bit 1200 and specifically the tail 1260 of the drill bit 1200 is inserted into the front end 1312 of the body 1310 of the anchor 1300 and moved through the anchor 1300 until the tail 1260 extends out of the rear end 1316 of the anchor 1300, and the rear end 1248 of the head 1240 engages or is adjacent to the front end 1312 of the body 1310 of the anchor 1300. At this point in the assembly process, the attachment members or tabs 1352a, 1352b, 1354a, and 1354b are pushed or bent inwardly into the respective flutes such that they are closer to or such that they engage the recessed sections that define the respective flutes (such as shown in FIG. 15). Likewise, at this point in the assembly process, the attachment members or tabs 1362a, 1362b, 1364a and 1364b are pushed or bent inwardly into the respective flutes such that they are closer to or such that they engage the recessed sections that define the respective flutes.

The attachment members or tabs 1352a, 1352b, 1354a, 1354b, 1362a, 1362b, 1364a, and 1364b co-act to maintain the anchor 1300 in the desired position around the drill bit 1200. The attachment members or tabs 1352a, 1352b, 1354a, 1354b, 1362a, 1362b, 1364a, and 1364b co-act to cause the anchor 1300 to rotate with the drill bit 1200 when the drill bit 1200 is rotated. It should be appreciated that the attachment members or tabs 1352a, 1352b, 1354a, 1354b, 1362a, 1362b, 1364a, and 1364b co-act to facilitate certain amounts of desired movement between the drill bit 1200 and the anchor 1300. It should further be appreciated that the attachment members or tabs can be alternatively configured, alternatively positioned, and that quantity of attachments members or tabs can vary in accordance with the present disclosure.

The method of using the above described example anchor assembly 1100 is the same or substantially the same as the above described method generally shown in FIGS. 11, 12, and 13, and thus will not be further described herein.

It should be appreciated from the above, that the drill bit 1200 remains as part of the anchor assembly 1100 in the substrate. It should further be appreciated as mentioned above, that the drill bit 1200 will thus be typically only used one time and can be made from a relatively inexpensive material because wearing or dulling of the cutting tip and edges of the drill bit will not be a problem.

Figure 16:
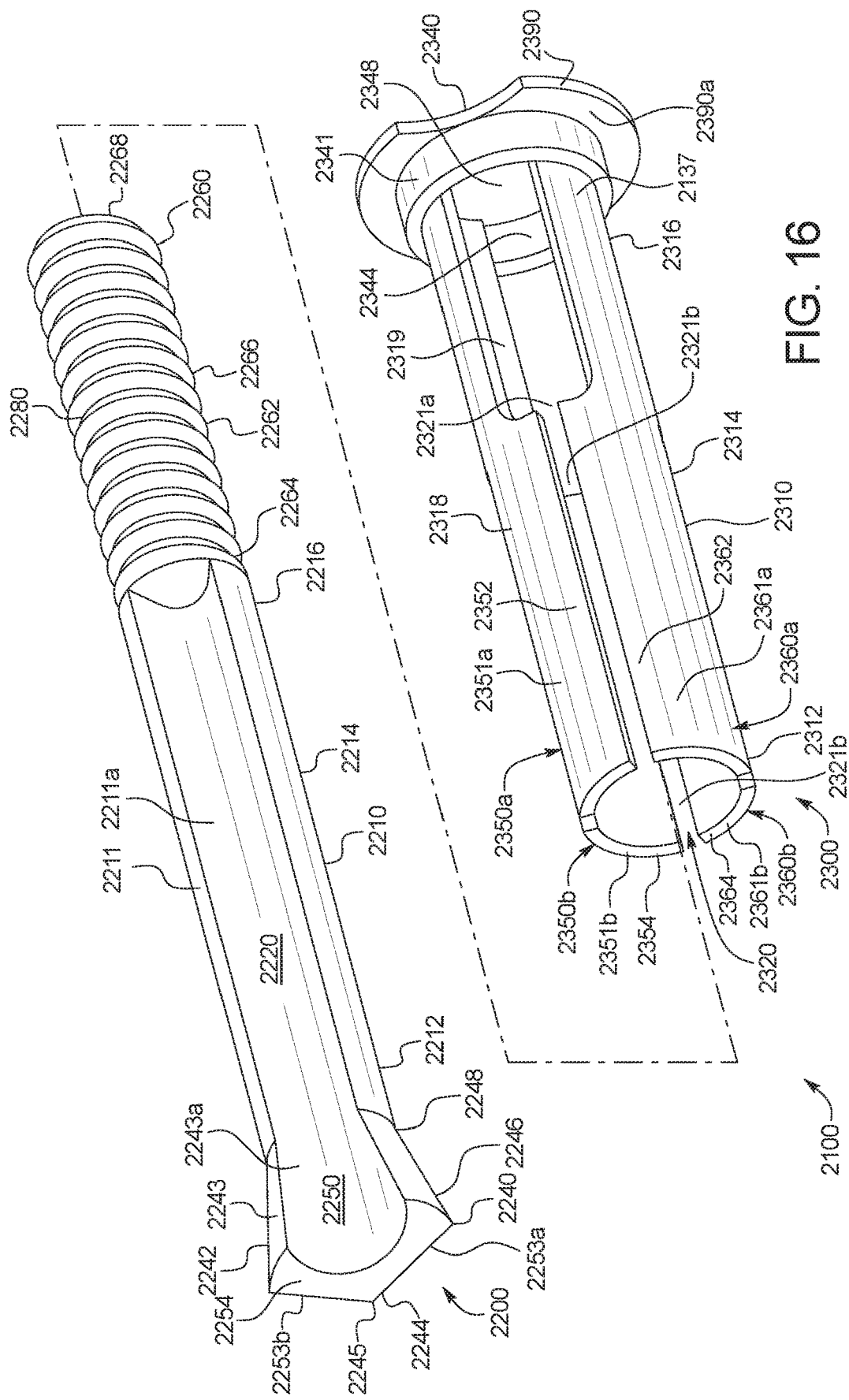
FIG. 16 is an exploded perspective view of a self-drilling anchor assembly of another example embodiment of the present disclosure, and illustrating the anchor and the drill bit of the self-drilling anchor assembly prior to assembly.
Figure 17:
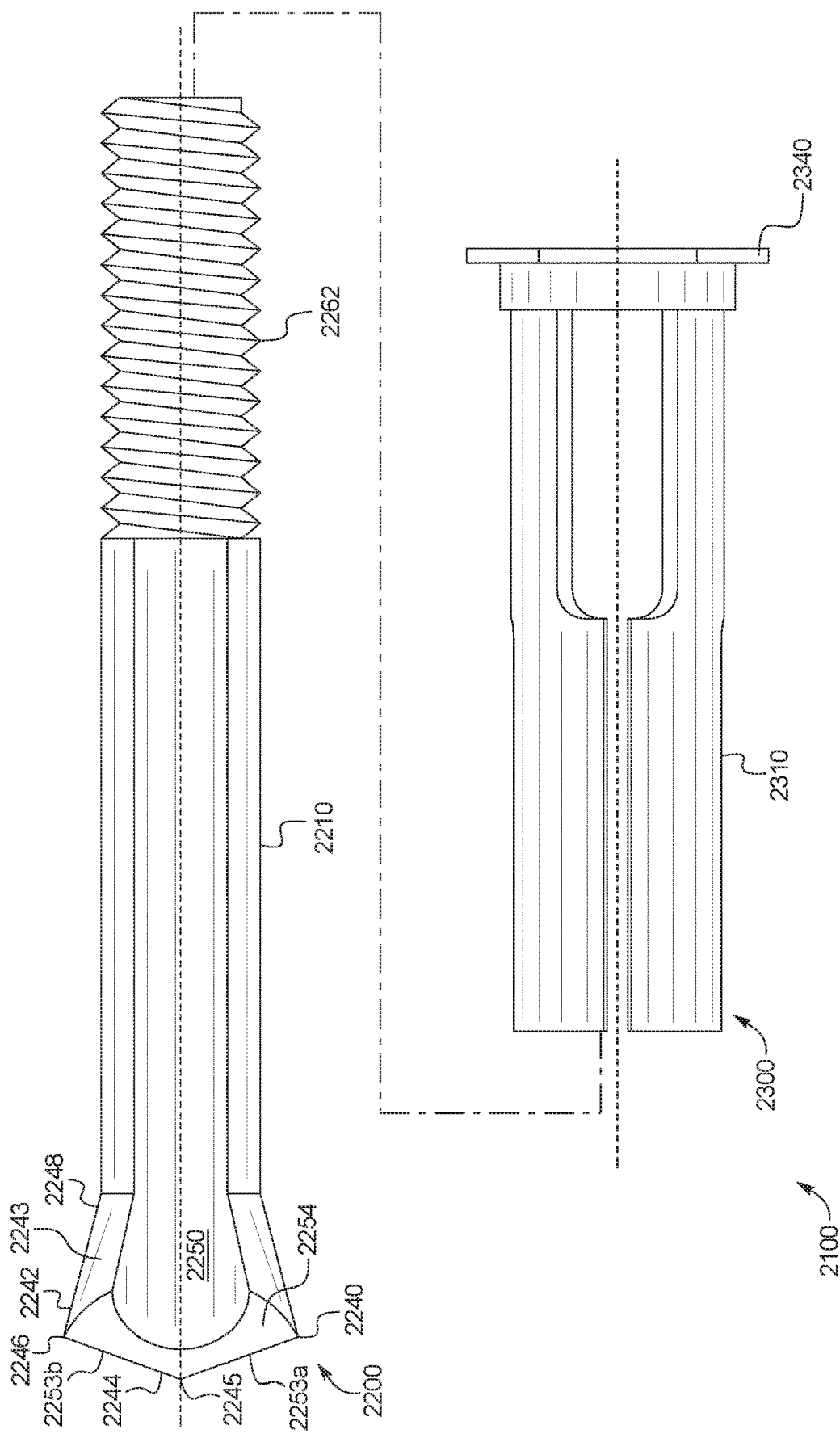
FIG. 17 is an exploded side view of the self-drilling anchor assembly of FIG. 16, and illustrating the anchor and the drill bit of the self-drilling anchor assembly prior to assembly.
Figure 18:
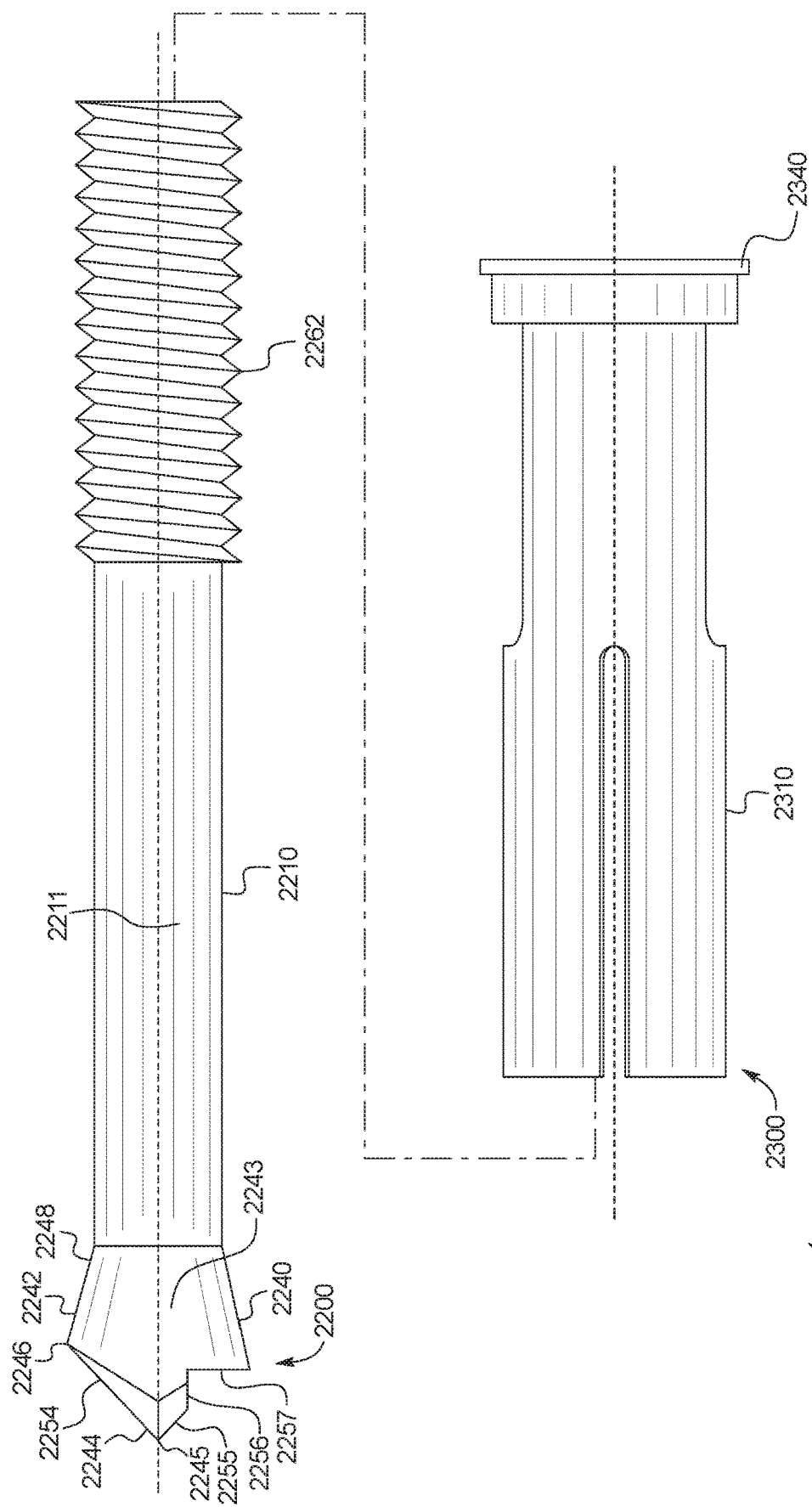
FIG. 18 is an exploded top view of the self-drilling anchor assembly of FIG. 16, and illustrating the anchor and the drill bit of the self-drilling anchor assembly prior to assembly.
Figure 19:
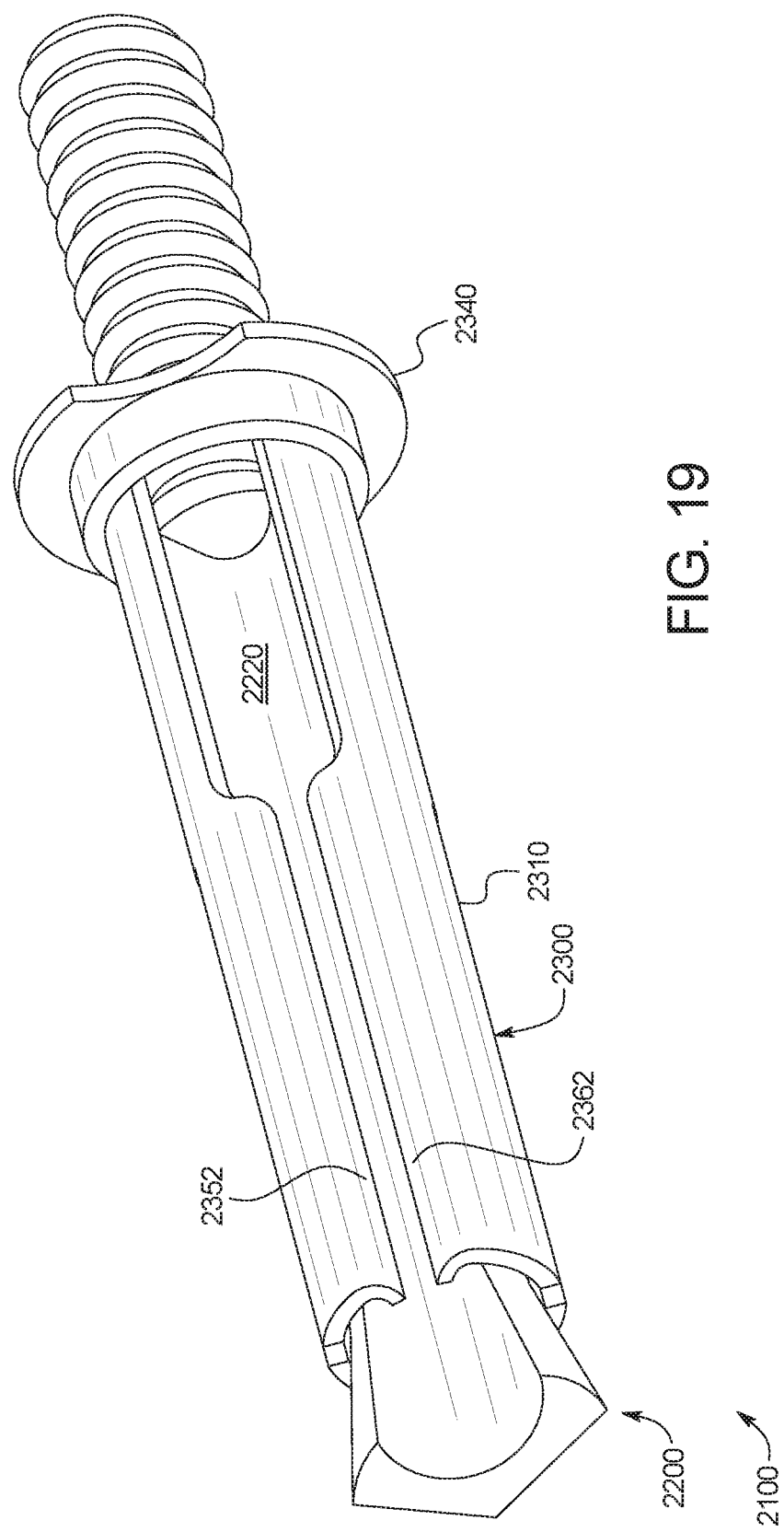
FIG. 19 is a perspective view of the self-drilling anchor assembly of FIG. 16, and illustrating the anchor and the drill bit of the self-drilling anchor assembly after assembly.

Referring now to FIGS. 16, 17, 18, and 19, another example embodiment of a self-drilling anchor assembly of the present disclosure is generally illustrated. The self-drilling anchor assembly of this illustrated example embodiment is generally indicated by numeral 2100. The self-drilling anchor assembly 2100 generally includes: (a) a drill bit 2200; and (b) an anchor 2300 positionable on or over and attached to the drill bit 2200. FIGS. 16, 17, and 18 show the self-drilling anchor assembly 2100 and specifically the drill bit 2200 and the anchor 2300 before assembly. FIG. 19 shows the self-drilling anchor assembly 2100 and specifically the drill bit 2200 and the anchor 2300 after assembly wherein: (a) the anchor 2300 is positioned on or over and attached to the drill bit 2200; and (b) the drill bit 2200 is partially positioned in and extends at both front and rear ends from the anchor 2300.

In this example embodiment, the drill bit 2200 is identical or substantially identical to the drill bit 200 (described above), and will thus only be generally described. The drill bit 2200 includes: (a) a generally cylindrical solid shank 2210 having a front end 2212, an intermediate or center portion 2214, and a rear end 2216; (b) a drill head 2240 integrally connected to and extending from the front end 2212 of the shank 2210; and (c) an exterior threaded tail 2260 integrally connected to and extending from the rear end 2216 of the shank 2210. The shank 2210 has an outer surface 2211 that includes two recessed sections (including a first recessed section 2211a and a second recessed section (not shown or labeled in FIG. 16, 17, 18, or 19)) that respectively define two opposing longitudinally extending flutes (including a first flute 2220 and a second flute (not shown or labeled in FIG. 16, 17, 18, or 19)) that each extend longitudinally along the entire length of the shank 2210.

The drill head 2240 includes a solid body 2242 having a tip end 2244, an intermediate or center portion 2246, and a rear end 2248. The rear end 2248 is integrally connected to and extends from the front end 2212 of the shank 2210. The intermediate or center portion 2246 has a generally wider outer diameter than the tip end 2244 and the rear end 2248. The body 2242 has an outer surface 2243 that includes two recessed sections (including a first recessed section 2243a and a second recessed section (not shown or labeled in FIG. 16, 17, 18, or 19)) that respectively define two opposing longitudinally extending flutes (including a first flute 2250 and a second flute (not shown or labeled in FIG. 16, 17, 18, or 19)) that each extend longitudinally along a portion of the body 2242 toward the shank 2210. Each of the flutes are relatively wider toward the tip end 2244 and are narrower at or taper to the rear end 2248 of the body 2242. At the rear end 2248, each of the flutes has the same or substantially the same cross-sectional area as the respective flutes defined by the shank 2210. The tip end 2244 has a pointed drill tip 2245 that is positioned at or along the central longitudinal axis. The tip end 2244 includes two front outwardly and rearwardly extending angled cutting edges 2253a and 2253b that extend from the tip 2245. The tip end 2244 includes a first side portion that includes a cutting surface 2254 that extends rearwardly and outwardly from the cutting edges 2253a and 2253b to the section 2243a of the surface 2243 of the drill head 2240 that defines the flute 2250. The tip end 2244 includes a second side portion that includes a first cutting surface 2255 that extends rearwardly and outwardly from the cutting edges 2253a and 2253b to a second cutting surface 2256 that in turn extends rearwardly to two spaced apart cutting surfaces (including cutting surface 2257).

The threaded tail 2260 includes a generally cylindrical body 2262 having a front end 2264, an intermediate or center portion 2266, and a rear end 2268. The front end 2264 is integrally connected to and extends from the rear end 2216 of the shank 2210. The threaded tail 2260 includes an outer outwardly extending helical thread formation 2280 to facilitate attachment of a securing device such as a nut (not shown or labeled in FIG. 16, 17, 18, or 19) and a washer (not shown or labeled in FIG. 16, 17, 18, or 19) to the threaded tail 2260 of the drill bit 2200. The threaded tail 2260 includes an interior mechanical engaging structure (not shown or labeled in FIG. 16, 17, 18, or 19) that is accessible from the rear end 2268 of the body 2262. The mechanical engaging structure is engageable by a suitable tool to rotate the drill bit 2200.

In this illustrated example embodiment, the drill bit 2200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

The anchor 2300 includes: (i) an elongated generally tubular body 2310 having a front end 2312, an intermediate or center portion 2314, a rear end 2316, an outer surface 2318, and an inner surface 2319; and (ii) a head 2340 integrally connected to and extending from the rear end 2316 of the tubular body 2310.

The outer surface 2318 of the body 2310 has an outer diameter (not labeled); and (b) the inner surface 2319 of the body 2310 has an inner diameter (not labeled). The inner surface 2319 of the tubular body 2310 defines a longitudinally extending inner channel 2320 configured to receive the drill bit 2200, and thus has a larger inner diameter than the outer diameter of the shank 2210 of the drill bit 2200. The inner surface 2319 of the tubular body 2310 also has a larger inner diameter than the outer diameter of the tail 2260 of the drill bit 2200. However, the inner surface 2319 of the tubular body 2310 has a smaller inner diameter than the outer diameter of the rear end 2248 of the drill head 2240 of the drill bit 2200. The body 2310 has a generally central longitudinal axis that is aligned with or that extends along the same central longitudinal axis of the drill bit 2200 when the drill bit 2200 is positioned in the anchor 2300.

The front end 2312 and the intermediate or center portion 2314 of the body 2310 of the anchor 2300 define, form, or include four somewhat independently movable or pivotable longitudinally extending opposing gripping arms 2350a, 2350b, and 2360a, and 2360b. Gripping arm 2350a includes a longitudinally extending curved wall 2351a and an elongated drill bit attachment member or tab 2352 integrally connected to and circumferentially extending from one side of the curved wall 2351a. Gripping arm 2350b includes a longitudinally extending curved wall 2351b and an elongated drill bit attachment member or tab 2354 integrally connected to and circumferentially extending from one side of the curved wall 2351b. Gripping arms 2350a and 2350b extend from a first part of the intermediate or center portion 2314 and end portion 2316 of the body 2310 of the anchor 2300. Gripping arm 2360a includes a longitudinally extending curved wall 2361a and an elongated drill bit attachment member or tab 2362 integrally connected to and circumferentially extending from one side of the curved wall 2361a. Gripping arm 2360b includes a longitudinally extending curved wall 2361b and an elongated drill bit attachment member or tab 2364 integrally connected to and circumferentially extending from one side of the curved wall 2361b. Gripping arms 2360a and 2360b extend from a second part of the intermediate or center portion 2314 and end portion 2316 of the body 2310 of the anchor 2300. It should be appreciated that the quantity of these attachment members or tabs may vary in accordance with the present disclosure.

The rear end 2316 of the body 2310 of the anchor 2300 includes a partially cylindrical wall 2317 that defines a longitudinally extending inner cylindrical channel (not labeled) that is aligned with and in communication with the longitudinally extending inner channel 2320 of the body 2310.

The front end 2312, the intermediate or center portion 2314, and the rear end 2316 of the body 2310 (or of the gripping arms 2350a, 2350b, 2360a, and 2360b) also define two spaced apart opposing longitudinally extending openings 2321a and 2321b (labeled in FIG. 16) that are generally configured to respectively align with the flutes of the drill 2200 to enable the materials of the substrate removed by the drill head 2240 to move from these flutes through the anchor 2300 and out of the hole being drilled in the substrate. It should be appreciated that in other embodiments of the present disclosure, the gripping arms and the quantity of gripping arms may vary.

The head 2340 of the anchor 2300 includes a cylindrical wall 2341 that includes an inner surface 2344 that defines a longitudinally extending inner channel 2348 that is aligned with and in communication with the longitudinally extending inner channel of the rear end 2316 of the body 2310 of the anchor 2300 and that is aligned with and in communication with the longitudinally extending inner channel 2320 of the body 2310. The head 2340 also includes an outwardly extending annular flange 2390 that is integrally connected to and extends outwardly or transversely from the cylindrical wall 2341. The annular flange 2390 of the head 2340 of the anchor 2300 has a flat or generally flat inner engagement surface 2390a. This engagement surface 2390a is configured to engage an outer surface of a substrate such as outer surface of substrate. It should be appreciated that the head of the anchor may be alternatively configured in accordance with the present disclosure.

In this illustrated example embodiment, the anchor 2300 is made from Carbon steel, and plated and/or coated to resist corrosion. However, it should be appreciated that the anchor can be made from other suitable materials and in other suitable manners. In this illustrated example embodiment, the head 2340 of the anchor 2300 and particularly the cylindrical wall 2341 can be suitably attached (such as by welding) to the rear end 2316 of the body 2310 of the anchor 2300 during the manufacturing process for the anchor 2300.

To assemble the self-drilling anchor assembly 2100, the drill bit 2200 and specifically the tail 2260 of the drill bit 2200 is inserted into the front end 2312 of the body 2310 of the anchor 2300 and moved through the anchor 2300 until the tail 2260 extends out of the rear end of the anchor 2300, and the rear end 2248 of the head 2240 engages or is adjacent to the front end 2312 of the body 2310 of the anchor 2300. At this point in the assembly process, the elongated attachment members or tabs 2352 and 2362 are pushed or bent inwardly into the flute 2220 such that they are closer to or such that they engage the recessed section 2211a that defines the flute 2220. Likewise, at this point in the assembly process, the elongated attachment members or tabs 2354 and 2364 are pushed or bent inwardly into the opposite flute (not labeled) of the drill bit 2200 such that they are closer to or such that they engage the recessed section that defines that flute.

The attachment members or tabs 2352, 2354, 2362 and 2364 co-act to maintain the anchor 2300 in the desired position around the drill bit 2200. The attachment members or tabs 2352, 2354, 2362 and 2364 co-act to cause the anchor 2300 to rotate with the drill bit 2200 when the drill bit 2200 is rotated. It should be appreciated that the attachment members or tabs 2352, 2354, 2362 and 2364 co-act to facilitate certain amounts of desired movement between the drill bit 2200 and the anchor 2300. It should further be appreciated that the attachment members or tabs can be alternatively configured, alternatively positioned, and that quantity of attachments members or tabs can vary in accordance with the present disclosure.

It should be appreciated from the above, that the drill bit 2200 remains as part of the anchor assembly 2100 in the substrate. It should further be appreciated as mentioned above, that the drill bit 2200 will thus be typically only used one time and can be made from a relatively inexpensive material because wearing or dulling of the cutting tip and edges of the drill bit will not be a problem.

Figure 20:
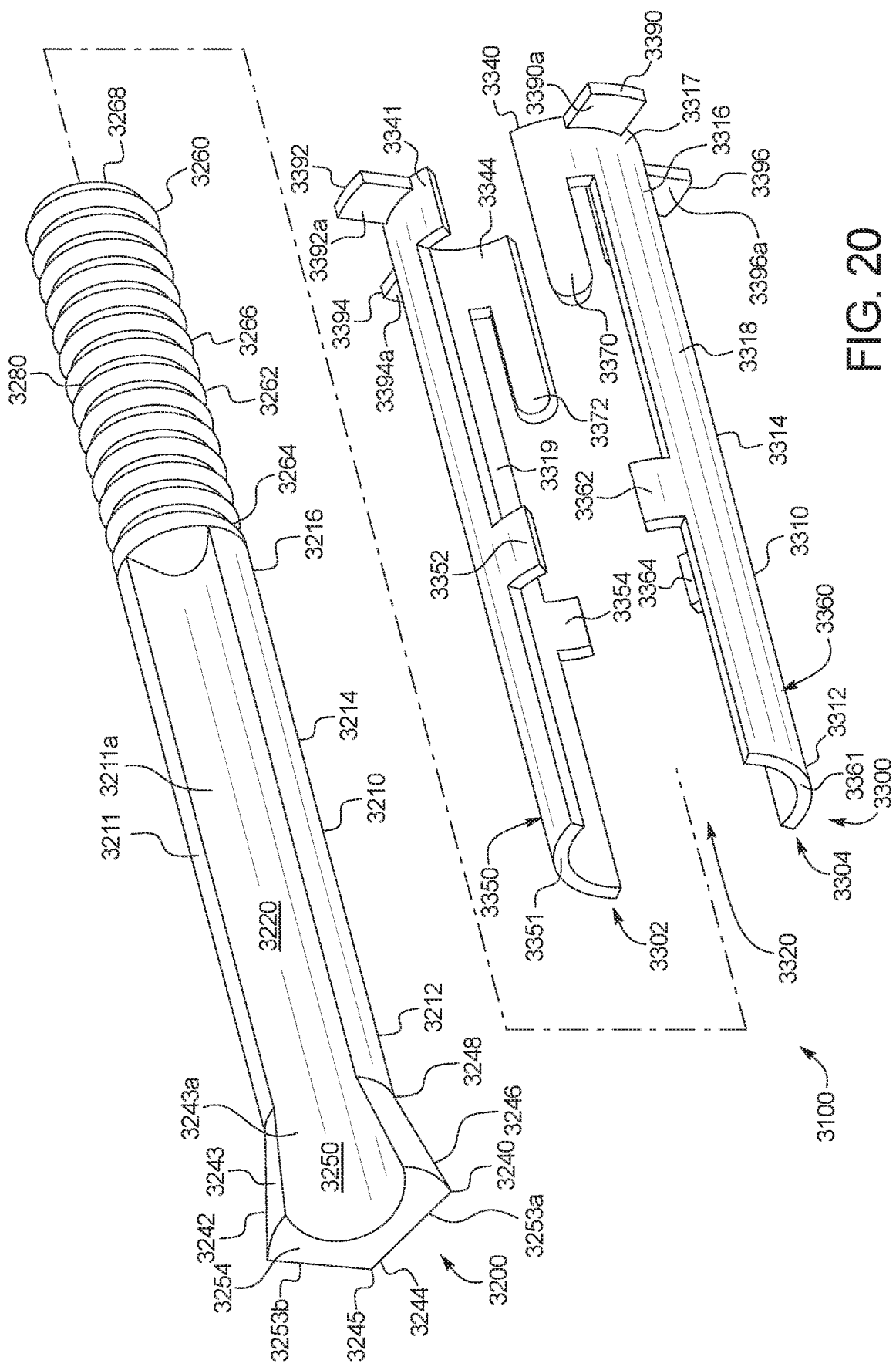
FIG. 20 is an exploded perspective view of a self-drilling anchor assembly of another example embodiment of the present disclosure, and illustrating the anchor and the drill bit of the self-drilling anchor assembly prior to assembly.
Figure 21:
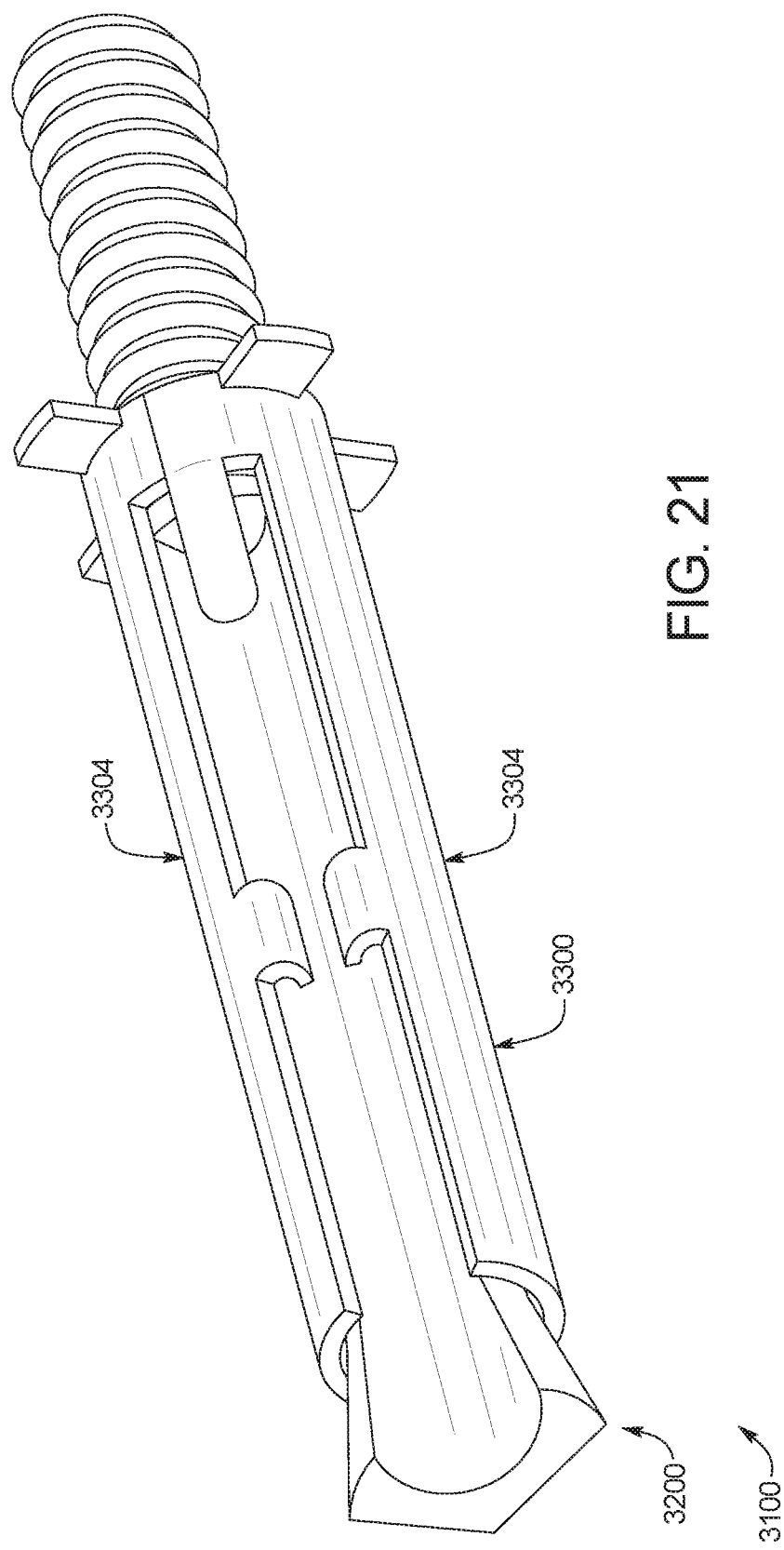
FIG. 21 is a perspective view of the self-drilling anchor assembly of FIG. 20, and illustrating the anchor and the drill bit of the self-drilling anchor assembly after assembly.

Referring now to FIGS. 20 and 21, another example embodiment of a self-drilling anchor assembly of the present disclosure is generally illustrated. The self-drilling anchor assembly of this illustrated example embodiment is generally indicated by numeral 3100. The self-drilling anchor assembly 3100 generally includes: (a) a drill bit 3200; and (b) a two piece anchor 3300 positionable on or over and attached to the drill bit 3200. FIG. 20 shows the self-drilling anchor assembly 3100 and specifically the drill bit 3200 and the anchor 3300 before assembly. FIG. 21 shows the self-drilling anchor assembly 3100 and specifically the drill bit 3200 and the anchor 3300 after assembly wherein: (a) the anchor 3300 is positioned on or over and attached to the drill bit 3200; and (b) the drill bit 3200 is partially positioned in and extends at both front and rear ends from the anchor 3300.

In this example embodiment, the drill bit 3200 is identical or substantially identical to the drill bit 200 (described above), and will thus only be generally described. The drill bit 3200 includes: (a) a generally cylindrical solid shank 3210 having a front end 3212, an intermediate or center portion 3214, and a rear end 3216; (b) a drill head 3240 integrally connected to and extending from the front end 3212 of the shank 3210; and (c) an exterior threaded tail 3260 integrally connected to and extending from the rear end 3216 of the shank 3210. The shank 3210 has an outer surface 3211 that includes two recessed sections (including a first recessed section 3211a and a second recessed section (not shown or labeled in FIG. 20 or 21)) that respectively define two opposing longitudinally extending flutes (including a first flute 3220 and a second flute (not shown or labeled in FIG. 20 or 21)) that each extend longitudinally along the entire length of the shank 3210.

The drill head 3240 includes a solid body 3242 having a tip end 3244, an intermediate or center portion 3246, and a rear end 3248. The rear end 3248 is integrally connected to and extends from the front end 3212 of the shank 3210. The intermediate or center portion 3246 has a generally wider outer diameter than the tip end 3244 and the rear end 3248. The body 3242 has an outer surface 3243 that includes two recessed sections (including a first recessed section 3243a and a second recessed section (not shown or labeled in FIG. 20 or 21)) that respectively define two opposing longitudinally extending flutes (including a first flute 3250 and a second flute (not shown or labeled in FIG. 20 or 21)) that each extend longitudinally along a portion of the body 3242 toward the shank 3210. Each of the flutes are relatively wider toward the tip end 3244 and are narrower at or taper to the rear end 3248 of the body 3242. At the rear end 3248, each of the flutes has the same or substantially the same cross-sectional area as the respective flutes defined by the shank 3210. The tip end 3244 has a pointed drill tip 3245 that is positioned at or along the central longitudinal axis. The tip end 3244 includes two front outwardly and rearwardly extending angled cutting edges 3253a and 3253b that extend from the tip 3245. The tip end 3244 includes a first side portion that includes a cutting surface 3254 that extends rearwardly and outwardly from the cutting edges 3253a and 3253b to the section 3243a of the surface 3243 of the drill head 3240 that defines the flute 3250. The tip end 3244 includes a second side portion (not shown or labeled in FIG. 20 or 21) that includes a first cutting surface (not shown or labeled in FIG. 20 or 21) that extends rearwardly and outwardly from the cutting edges 3253a and 3253b to a second cutting surface (not shown or labeled in FIG. 20 or 21) that in turn extends rearwardly to two spaced apart cutting surfaces (not shown or labeled in FIG. 20 or 21) that extend outwardly.

The threaded tail 3260 includes a generally cylindrical body 3262 having a front end 3264, an intermediate or center portion 3266, and a rear end 3268. The front end 3264 is integrally connected to and extends from the rear end 3216 of the shank 3210. The threaded tail 3260 includes an outer outwardly extending helical thread formation 3280 to facilitate attachment of a securing device such as a nut (not shown in FIG. 20 or 21) and a washer (not shown in FIG. 20 or 21) to the threaded tail 3260 of the drill bit 3200. The threaded tail 3260 includes an interior mechanical engaging structure (not shown in FIG. 20 or 21) that is accessible from the rear end 3268 of the body 3262. The mechanical engaging structure is engageable by a suitable tool to rotate the drill bit 3200.

In this illustrated example embodiment, the drill bit 3200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

The anchor 3300 is somewhat similar to the anchor 300 (described above), but it is formed from multiple portions, and particularly two halves. In various embodiments, the anchor 3300 is formed in this manner for ease of manufacturing purposes and for ease of assembly purposes. In particular, each half can be manufactured separately using a stamping and bending process. Additionally, during assembly, the opposing sides do not need to be placed over the threaded end of the drill bit 3200 and thus avoids damage to the threads of the drill bit 3200. The anchor 3300 includes an elongated first portion 3302 and an elongated second portion 3304 that together form a generally tubular body 3310 having a front end 3312, an intermediate or center portion 3314, a rear end 3316, an outer surface 3318, and an inner surface 3319. The elongated first portion 3302 and the elongated second portion 3304 also together form a head 3340 connected to and extending from the rear end 3316 of the tubular body 3310.

When assembled, the outer surface 3318 of the body 3310 has an outer diameter (not labeled) and the inner surface 3319 of the body 3310 has an inner diameter (not labeled). When assembled, the inner surface 3319 of the tubular body 3310 defines a longitudinally extending inner channel 3320 configured to receive the drill bit 3200, and thus has a larger inner diameter than the outer diameter of the shank 3210 of the drill bit 3200. When assembled, the inner surface 3319 of the tubular body 3310 also has a larger inner diameter than the outer diameter of the tail 3260 of the drill bit 3200. However, when assembled, the inner surface 3319 of the tubular body 3310 has a smaller inner diameter than the outer diameter of the rear end 3248 of the drill head 3240 of the drill bit 3200. When assembled, the body 3310 has a generally central longitudinal axis that is aligned with or that extends along the same central longitudinal axis of the drill bit 3200 when the drill bit 3200 is positioned in the anchor 3300.

The front end 3312, the intermediate or center portion 3314, and the rear end 3316 of the body 3310 of the anchor 3300 define, form, or include two independently movable or pivotable longitudinally extending opposing gripping arms 3350 and 3360. The first portion 3302 includes gripping arm 3350 and the second portion 3304 includes gripping arm 3360. The gripping arm 3350 includes a longitudinally extending curved wall 3351 and two drill bit attachment members or tabs 3352 and 3354 integrally connected to and circumferentially extending from opposite sides of the curved wall 3351. Likewise, the gripping arm 3360 includes a longitudinally extending curved wall 3361 and two drill bit attachment members or tabs 3362 and 3364 integrally connected to and circumferentially extending from opposite sides of the curved wall 3361. It should be appreciated that the quantity of these attachment members or tabs may vary in accordance with the present disclosure.

When assembled, the rear end 3316 of the body 3310 of the anchor 3300 includes a cylindrical wall 3317 that defines a longitudinally extending inner cylindrical channel (not labeled) that is aligned with and in communication with the longitudinally extending inner channel 3320 of the body 3310. The rear end 3316 of the body 3310 of the anchor 3300 includes two opposing drill bit attachment members or tabs 3370 and 3372 connected to and longitudinally extending from opposite sides of the cylindrical wall 3317. The first portion 3302 includes drill bit attachment member or tab 3372 and the second portion 3304 includes drill bit attachment member or tab 3370. It should be appreciated that the quantity of these attachment members or tabs may vary in accordance with the present disclosure.

The front end 3312, the intermediate or center portion 3314, and the rear end 3316 of the body 3310 (or of the gripping arms 3350 and 3360) also define two spaced apart opposing longitudinally extending openings (best seen in FIG. 21 but not labeled) that are generally configured to respectively align with the flutes 3220 and 3250 and the flutes 3224 and 3252 (not shown) to enable the materials of the substrate removed by the drill head 3240 to move from these flutes through the anchor 3300 and out of the hole being drilled in the substrate. The gripping arms in this illustrated example embodiment are identical or substantially identical. It should be appreciated that in other embodiments of the present disclosure, the gripping arms do not need to be identical or substantially identical and that the quantity of gripping arms may vary.

When assembled, the head 3340 of the anchor 3300 includes a cylindrical wall 3341 that includes an inner surface 3344 that defines a longitudinally extending inner channel (not labeled) that is aligned with and in communication with the longitudinally extending inner channel of the rear end 3316 of the body 3310 of the anchor 3300 and that is aligned with and in communication with the longitudinally extending inner channel 3320 of the body 3310. The head 3340 also includes outwardly extending flanges 3390, 3392, 3394, and 3396 that are connected to and extend outwardly or transversely from the cylindrical wall 3341. The first portion 3302 includes flanges 3392 and 3394 and the second portion 3304 includes flanges 3390 and 3396. The flanges 3390, 3392, 3394, and 3396 of the head 3340 of the anchor 3300 have flat or generally flat inner engagement surfaces 3390a, 3392a, 3394a, and 3396a. These engagement surfaces 3390a, 3392a, 3394a, and 3396a are configured to engage an outer surface of a substrate. It should be appreciated that the head of the anchor may be alternatively configured in accordance with the present disclosure.

In this illustrated example embodiment, the anchor 3300 is made from Carbon steel, and plated and/or coated to resist corrosion. However, it should be appreciated that the anchor can be made from other suitable materials and in other suitable manners.

To assemble the self-drilling anchor assembly 3100, the first portion 3302 and the second portion 3304 of the anchor are positioned on opposing sides around and over the central portion or shank 3210 of the drill bit 3200 such that the tail 3260 extends out of the rear end of the anchor 3300, and the rear end 3248 of the head 3240 engages or is adjacent to the front end 3312 of the anchor 3300. At this point in the assembly process, the attachment members or tabs 3352 and 3362 are pushed or bent inwardly into the flute 3220 such that they are closer to or such that they engage the recessed section 3211a that defines the flute 3220. Likewise, at this point in the assembly process, the attachment members or tabs 3354 and 3364 are pushed or bent inwardly into the flute 3224 (not shown) such that they are closer to or such that they engage the recessed section that defines the flute 3224. At this point in the assembly process, the attachment member or tab 3370 is pushed or bent inwardly into the flute 3220 such that it closer to or such that it engages the recessed section 3211a that defines the flute 3220. Likewise, at this point in the assembly process, the attachment member or tab 3372 is pushed or bent inwardly into the flute 3224 such that it closer to or such that it engages the recessed section that defines the flute 3224. It should be appreciated that this assembly process does not require assembly over the threaded portion of the drill bit 3200 and thus reduces the likelihood of any damage to the threads during the assembly process.

The attachment members or tabs 3352, 3354, 3362, 3364, 3370, and 3372 co-act to maintain the anchor 3300 in the desired position around the drill bit 3200. The attachment members or tabs 3352, 3354, 3362, 3364, 33370, and 3372 co-act to cause the anchor 3300 to rotate with the drill bit 200 when the drill bit 3200 is rotated. The attachment members or tabs 3370 and 3372 co-act to prevent the drill bit 3200 from exiting the anchor 3300 because they are configured to engage the front end 3264 of the body 3262 of the tail 3260. The attachment members or tabs 3370 and 3372 also co-act with the respective flutes 3220 and 3224 to direct loose material out of the flutes and through the respective openings in the anchor 3300 and out of the hole being drilled in the substrate. In this regard, it should be appreciated that, after assembly, the attachment members or tabs 3370 and 3372 are respectively positioned at downwardly extending angles. It should be appreciated that the attachment members or tabs 3352, 3354, 3362, 3364, 3370, and 3372 co-act to facilitate certain amounts of desired movement between the drill bit 3200 and the anchor 3300. It should further be appreciated that the attachment members or tabs can be alternatively configured, alternatively positioned, and that quantity of attachments members or tabs can vary in accordance with the present disclosure.

Figure 22:
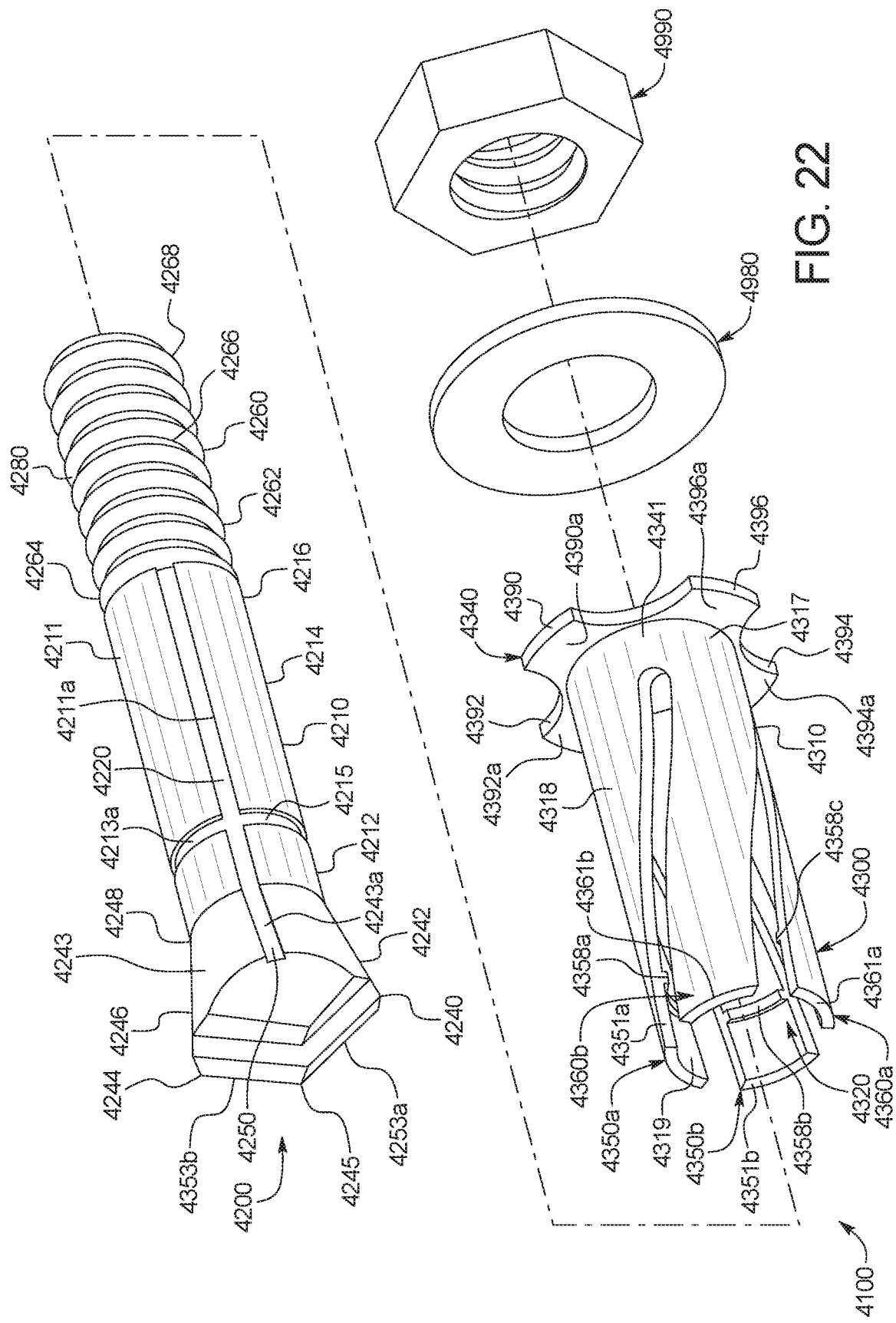
FIG. 22 is an exploded perspective view of a self-drilling anchor assembly of another example embodiment of the present disclosure, and illustrating the anchor and the drill bit of the self-drilling anchor assembly prior to assembly.
Figure 23:
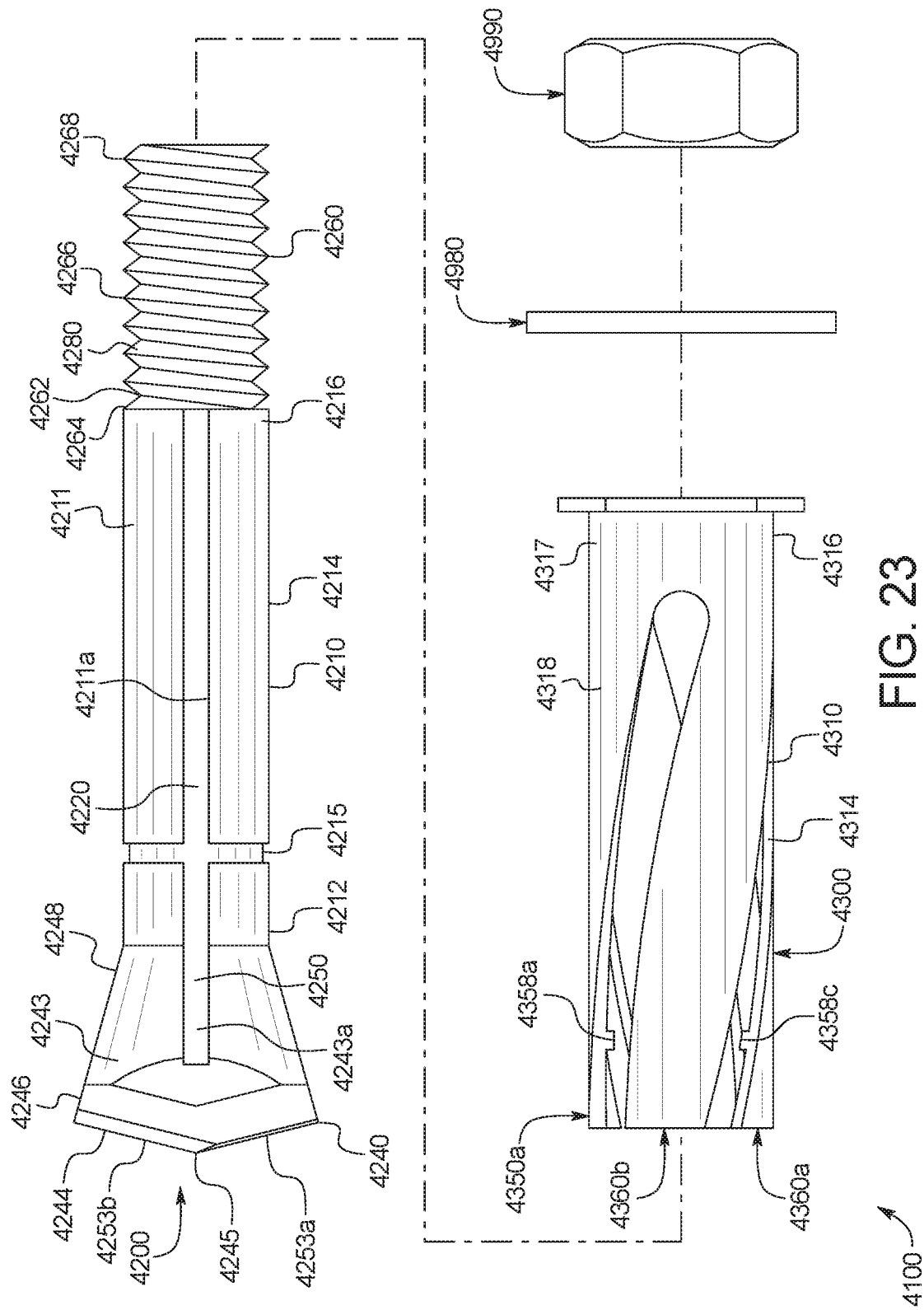
FIG. 23 is an exploded side view of the self-drilling anchor assembly of FIG. 22, and illustrating the anchor and the drill bit of the self-drilling anchor assembly prior to assembly.
Figure 24:
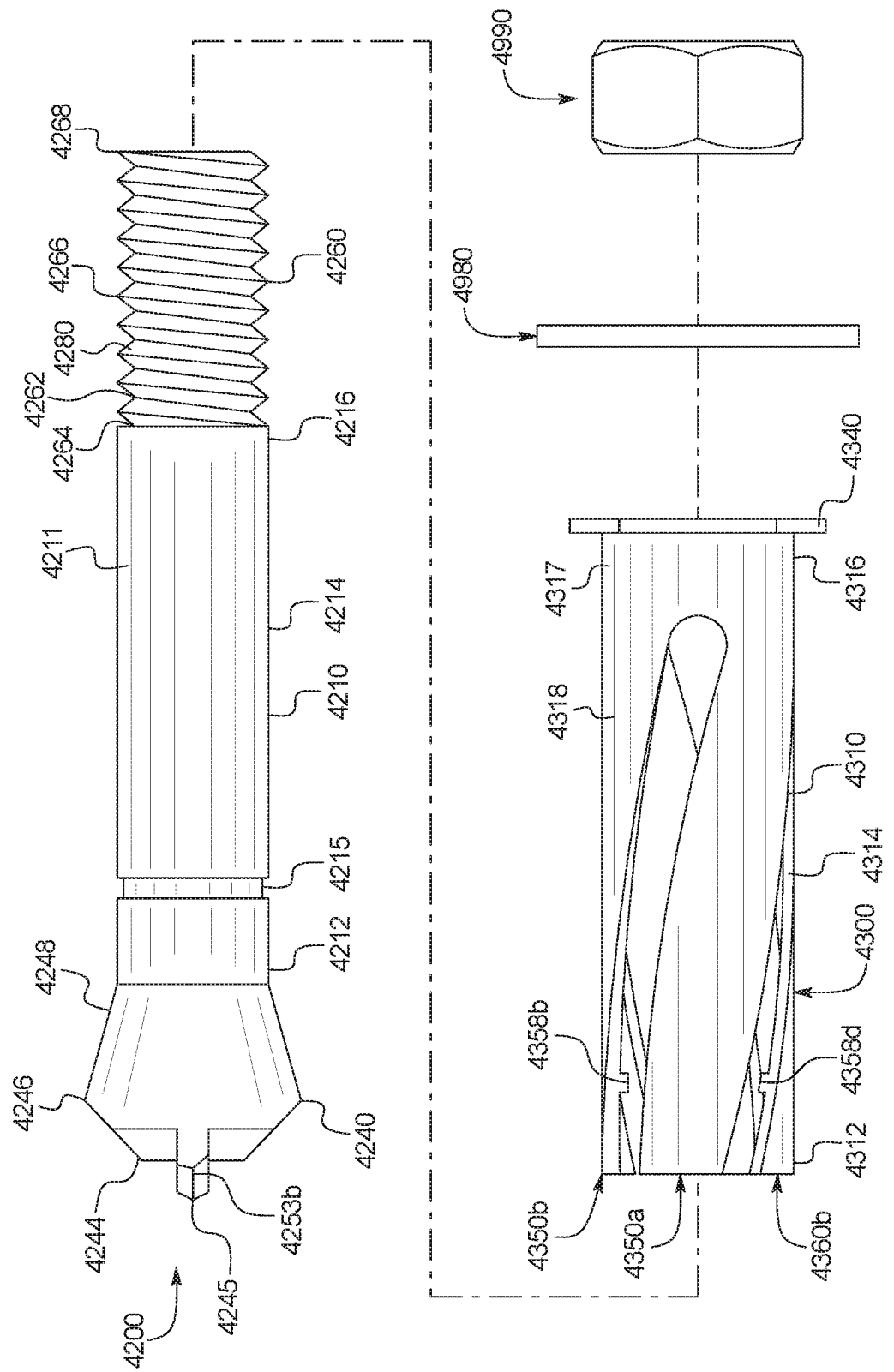
FIG. 24 is an exploded top view of the self-drilling anchor assembly of FIG. 22, and illustrating the anchor and the drill bit of the self-drilling anchor assembly prior to assembly.

Referring now to FIGS. 22, 23, 24, and 25, another example embodiment of a self-drilling anchor assembly of the present disclosure is generally illustrated. The self-drilling anchor assembly of this illustrated example embodiment is generally indicated by numeral 4100. The self-drilling anchor assembly 4100 generally includes: (a) a drill bit 4200; and (b) an anchor 4300 positionable on or over and attached to the drill bit 4200. FIGS. 22, 23, and 24 show the self-drilling anchor assembly 4100 and specifically the drill bit 4200 and the anchor 4300 before assembly. FIG. 24 shows the self-drilling anchor assembly 4100 and specifically the drill bit 4200 and the anchor 4300 after assembly wherein: (a) the anchor 4300 is positioned on or over and attached to the drill bit 4200; and (b) the drill bit 4200 is partially positioned in and extends at both front and rear ends from the anchor 4300. In this example embodiment of the present disclosure, the anchor 4300 is axially attached to the drill bit 4200 such that when the drill bit 4200 rotates, the anchor 4300 does not rotate with the drill bit (or can independently rotate). The attachment of the anchor 4300 to the drill bit 4200 causes the anchor 4300 to move axially with the drill bit 4200 such as when the drill bit 4200 drills a hole and moves into a substrate, the anchor 4300 moves into the hole with the drill bit.

More specifically, this alternative example drill bit 4200 includes: (a) a generally cylindrical solid shank 4210 having a front end 4212, an intermediate or center portion 4214, and a rear end 4216; (b) a drill head 4240 integrally connected to and extending from the front end 4212 of the shank 4210; and (c) an exterior threaded tail 4260 integrally connected to and extending from the rear end 4216 of the shank 4210. The drill bit 4200 and specifically the shank 4210, the drill head 4240, and the tail 4260 have a generally central longitudinal axis. The drill bit 4200 is configured to remain in the substrate and assist in maintaining the anchor 4300 in the substrate.

The shank 4210 includes an outer surface 4211 that includes two recessed longitudinally extending sections (including section 4211a) that respectively define two opposing longitudinally extending flutes (including flute 4220) that each extend longitudinally along the entire length of the shank 4210. The flutes each have a generally rectangular cross section (at each point along the longitudinal length) and are configured to direct loose material of the substrate that is broken away by the drill head 4240 from the drill head 4240 toward the rear end 4216 of the shank 4210 and out of the hole being formed in the substrate. The shank 4210 further includes a recessed circumferentially extending section 4213a that defines an annular locking recess or groove 4215 configured to receive inwardly extending drill bit attachment portions 4358a, 4358b, and 4358c, and 4358d that form an inwardly extending drill bit attachment ring 4358 of the anchor 4300. It should be appreciated that the shank 4210 may be alternatively configured (in shape and/or size) in accordance with the present disclosure.

The drill head 4240 includes a solid body 4242 having a tip end 4244, an intermediate or center portion 4246, and a rear end 4248. The rear end 4248 is integrally connected to and extends from the front end 4212 of the shank 4210. The intermediate or center portion 4246 has a generally wider outer diameter than the tip end 4244 and the rear end 4248.

The body 4242 includes an outer surface 4243 that includes two recessed sections (including section 4243a) that respectively define two opposing longitudinally extending flutes (including flute 4250) each extending longitudinally along a portion of the body 4242 toward the shank 4210. The flutes each have a rectangular cross section and are configured to direct loose material of the substrate (that is broken away by the tip end 4244) toward the front end 4212 of the shank 4210 and out of the hole being formed in the substrate. The flutes are respectively aligned with and are configured to communicate loose material to the flutes defined by the shank 4210. The flutes are each of the same or substantially the same cross-sectional area as the respective flutes defined by the shank 4210.

The tip end 4244 has a pointed drill tip 4245 that is positioned at or along the central longitudinal axis. The tip end 4244 includes two front outwardly and rearwardly extending angled cutting edges 4253a and 4253b that extend from the tip 4245. The tip end 4244 includes first side portions (not labeled) that each extend rearwardly and outwardly from the cutting edges 4253a and 4253b. The tip end 4244 also includes second side portions (not labeled) that each extend rearwardly and outwardly from the cutting edges 4253a and 4253b. The tip end 4244 further includes four rear outwardly and rearwardly extending angled additional cutting edges (not labeled). The tip end 4244 includes a first side portion (not labeled) that extends rearwardly and outwardly from the additional cutting edges. The tip end 4244 includes a second side portion (not labeled) that extends rearwardly and outwardly from the additional cutting edges. It should be appreciated from this example embodiment that the drill head may be alternatively configured (in shape and/or size) in accordance with the present disclosure.

The threaded tail 4260 includes a generally cylindrical body 4262 having a front end 4264, an intermediate or center portion 4266, and a rear end 4268. The front end 4264 is integrally connected to and extends from the rear end 4216 of the shank 4210. The threaded tail 4260 includes an outer outwardly extending helical thread formation 4280 to facilitate attachment of a securing device such as a nut 4990 and a washer 4980 to the threaded tail 4260 of the drill bit 4200. The external helical thread formation 4280 of the tail 4260 has a plurality of spaced apart thread sections (not labeled) that have or form outer edges or crests (not labeled) and valleys (not labeled) between the crests. The outer diameter of the helical thread formation (sometimes called the crest diameter) is greater than the outer diameter of the shank body 4210 in this illustrated example embodiment to facilitate attachment of the anchor 4300 to the drill bit 4200.

The threaded tail 4260 includes an interior mechanical engaging structure (not shown or labeled) that is accessible from the rear end 4268 of the body 4262. The mechanical engaging structure is engageable by a suitable tool to rotate the drill bit 4200. It should be appreciated that in other embodiments of the present disclosure, other mechanical engaging structures may be employed as the mechanical engaging structure of the tail in accordance with the present disclosure.

In this illustrated example embodiment, the drill bit 4200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

The anchor 4300 includes: (i) an elongated generally tubular body 4310 having an a front end 4312, an intermediate or center portion 4314, and a rear end 4316, an outer surface 4318, and an inner surface 4319; and (ii) a head 4340 integrally connected to and extending from the rear end 4316 of the tubular body 4310.

The outer surface 4318 of the body 4310 has an outer diameter (not labeled); and the inner surface 4319 of the body 4310 has an inner diameter (not labeled). The inner surface 4319 of the tubular body 4310 defines a longitudinally extending inner channel 4320 configured to receive the drill bit 4200, and thus has a larger inner diameter than the outer diameter of the shank 4210 of the drill bit 4200. The inner surface 4319 of the tubular body 4310 also has a larger inner diameter than the outer diameter of the tail 4260 of the drill bit 4200. The body 4310 has a generally central longitudinal axis that is aligned with or that extends along the same central longitudinal axis of the drill bit 4200 when the drill bit 4200 is positioned in the anchor 4300.

The front end 4312, the intermediate or center portion 4314, and the rear end 4316 of the body 4300 of the anchor 4300 define, form, or include four independently movable or pivotable longitudinally extending angled and curved gripping arms 4350a, 4350b, 4360a, and 4360b. Gripping arm 4350a includes a longitudinally extending curved wall 4351a and a drill bit attachment portion 4358a integrally connected to and extending inwardly from the curved wall 4351a. Gripping arm 4350b includes a longitudinally extending curved wall 4351b and a drill bit attachment portion 4358b integrally connected to and extending inwardly from the curved wall 4351b. Gripping arm 4360a includes a longitudinally extending curved wall 4361a and a drill bit attachment portion 4358c integrally connected to and extending inwardly from the curved wall 4361a. Gripping arm 4360b includes a longitudinally extending curved wall 4361b and a drill bit attachment portion 4358d integrally connected to and extending inwardly from the curved wall 4361b. The gripping arms 4350a, 4350b, 4360a, and 4360b are curved or extend in a diagonal direction such that the openings or flutes formed between the gripping arms 4350a, 4350b, 4360a, and 4360b are curved or extend in a diagonal direction. The gripping arms in this illustrated example embodiment are identical or substantially identical. It should be appreciated that in other embodiments of the present disclosure, the gripping arms do not need to be identical or substantially identical and that the quantity of gripping arms may vary. It should also be appreciated that the attachment portions can co-act to form an engagement ring that extends into the annular groove in the drill bit such that the anchor remains attached to the drill bit even when the anchor is not rotating such as due to binding with the walls of the hole.

The rear end 4316 of the body 4310 of the anchor 4300 includes a cylindrical wall 4317 that defines a longitudinally extending inner cylindrical channel (not labeled) that is aligned with and in communication with the longitudinally extending inner channel 4320 of the body 4310.

The head 4340 of the anchor 4300 includes a cylindrical wall 4341 that includes an inner surface (not labeled) that defines a longitudinally extending inner channel (not labeled) that is aligned with and in communication with the longitudinally extending inner channel of the rear end 4316 of the body 4310 of the anchor 4300 and that is aligned with and in communication with the longitudinally extending inner channel 4320 of the body 4310. The head 4340 also includes flanges 4390, 4392, 4394, and 4396 that are integrally connected to and extend outwardly or transversely from the cylindrical wall 4341. The flanges 4390, 4392, 4394, and 4396 of the head 4340 of the anchor 4300 have flat or generally flat inner engagement surfaces 4390a, 4392a, 4394a, and 4396a. These engagement surfaces 4390a, 4392a, 4394a, and 4396a are configured to engage an outer surface of a substrate. It should be appreciated that the head of the anchor may be alternatively configured in accordance with the present disclosure.

In this illustrated example embodiment, the anchor 4300 is made from Carbon steel, and plated and/or coated to resist corrosion. However, it should be appreciated that the anchor can be made from other suitable materials and in other suitable manners.

Figure 25:
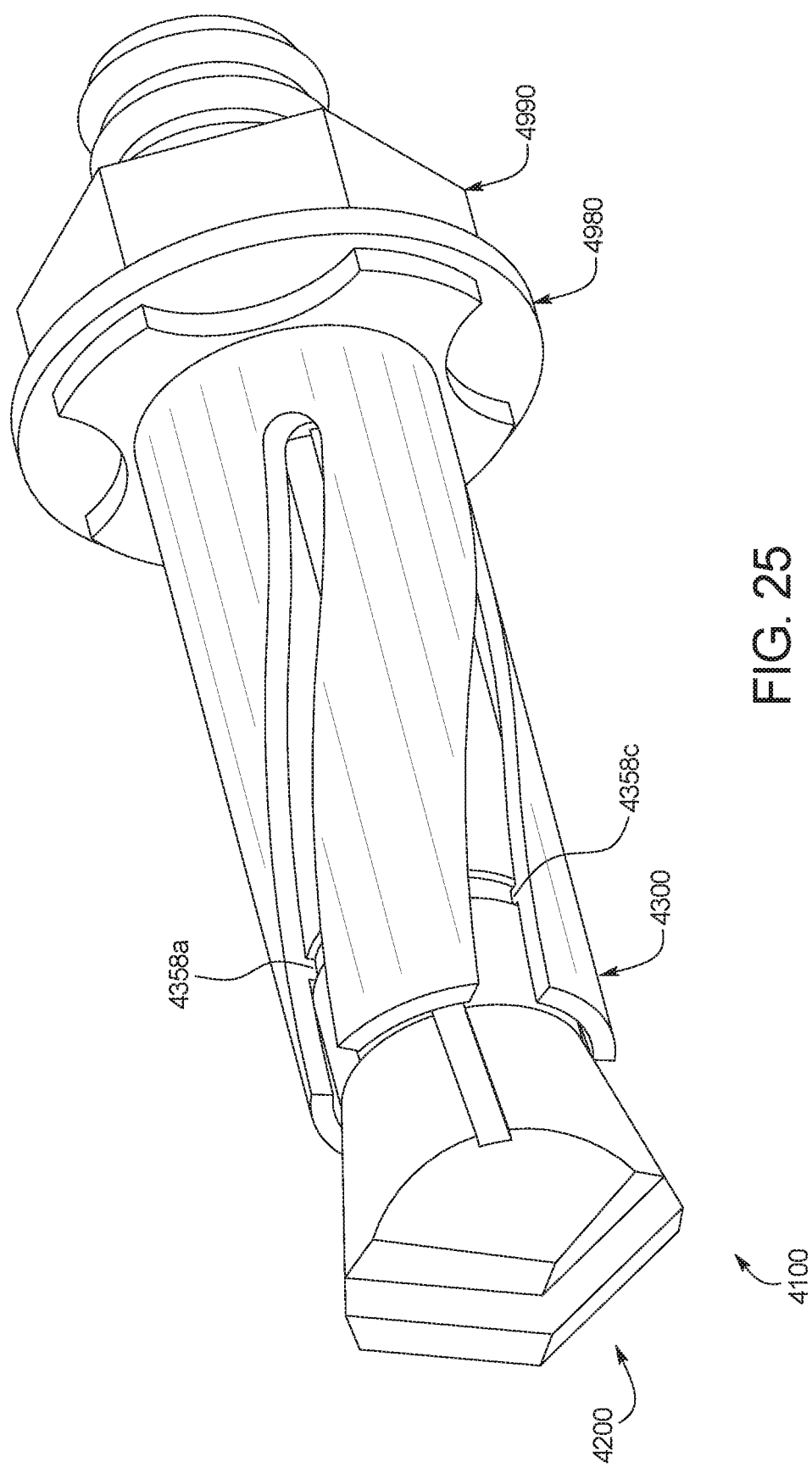
FIG. 25 is a perspective view of the self-drilling anchor assembly of FIG. 22, and illustrating the anchor and the drill bit of the self-drilling anchor assembly after assembly.

To assemble the self-drilling anchor assembly 4100, the drill bit 4200 and specifically the tail 4260 of the drill bit 4200 is inserted into the front end 4312 of the body 4310 of the anchor 4300 and moved through the anchor 4300 until the tail 4260 extends out of the rear end of the anchor 4300, and the rear end 4248 of the head 4240 engages or is adjacent to the front end 4312 of the body 4310 of the anchor 4300. At this point in the assembly process, the drill bit attachment portions 4358a, 4358b, 4358c, and 4358d extend into the annular locking recess as shown in FIG. 25. The drill bit attachment portions 4358a, 4358b, 4358c, and 4358d (that form the drill bit attachment ring) co-act to maintain the anchor 4300 in the desired position around the drill bit 4200. The attachment portions 4358a, 4358b, 4358c, and 4358d (that form the drill bit attachment ring) co-act to allow the anchor 4300 to rotate with the drill bit 4200 when the drill bit 4200 is rotated. It should further be appreciated that the attachment (that form the drill bit attachment ring) can be alternatively configured, alternatively positioned, and that quantity of attachments portions can vary in accordance with the present disclosure.

It should be appreciated from the above, that the drill bit 4200 remains as part of the anchor assembly 4100 in the substrate. It should further be appreciated as mentioned above, that the drill bit will thus be typically only used one time and can be made from a relatively inexpensive material because wearing or dulling of the cutting tip and edges of the drill bit will not be a problem.

FIG. 25A shows an alternative embodiment of the anchor 4300 of the self-drilling anchor assembly 4100. Like anchor 4300, this alternative anchor 4300A includes: (i) an elongated generally tubular body 4310A having an a front end 4312A, an intermediate or center portion 4314A, and a rear end 4316A, an outer surface 4318A, and an inner surface 4319A; and (ii) a head 4340A integrally connected to and extending from the rear end 4316A of the tubular body 4310A.

The front end 4312A, the intermediate or center portion 4314A, and the rear end 4316A of the body of the anchor 4300A define, form, or include four independently movable or pivotable longitudinally extending angled and curved gripping arms 4350A, 4350B, 4360A, and 4360B. The gripping arms 4350A, 4350B, 4360A, and 4360B are curved or extend in a diagonal direction such that the openings or flutes formed between the gripping arms 4350A, 4350B, 4360A, and 4360B are curved or extend in a diagonal direction. Gripping arm 4350A includes a longitudinally extending curved wall and a drill bit attachment portion 4358A integrally connected to and extending inwardly from the front end of the curved wall. Gripping arm 4350B includes a longitudinally extending curved wall and a drill bit attachment portion 4358B integrally connected to and extending inwardly from the front end of the curved wall. Gripping arm 4360A includes a longitudinally extending curved wall and a drill bit attachment portion 4358C integrally connected to and extending inwardly from the front end of the curved wall. Gripping arm 4360B includes a longitudinally extending curved wall and a drill bit attachment portion 4358D integrally connected to and extending inwardly from the front end of the curved wall. This alternative embodiment thus illustrates that the positions of the drill bit attachment portions may vary in accordance with the present disclosure.

It should be appreciated that in this example embodiment (as well as in other embodiments of the present disclosure) the quantity of gripping arms and the quantity of attachment portions that form the attachment ring may vary in accordance with the present disclosure. It should also be appreciated that the gripping arms may extend in other suitable manners—such as with other suitable curves, it other suitable diagonal directions (i.e., either clockwise or counter clockwise), or otherwise.

In this illustrated example embodiment, the anchor 4300A is made from Carbon steel, and plated and/or coated to resist corrosion. However, it should be appreciated that the anchor can be made from other suitable materials and in other suitable manners.

Figure 26:
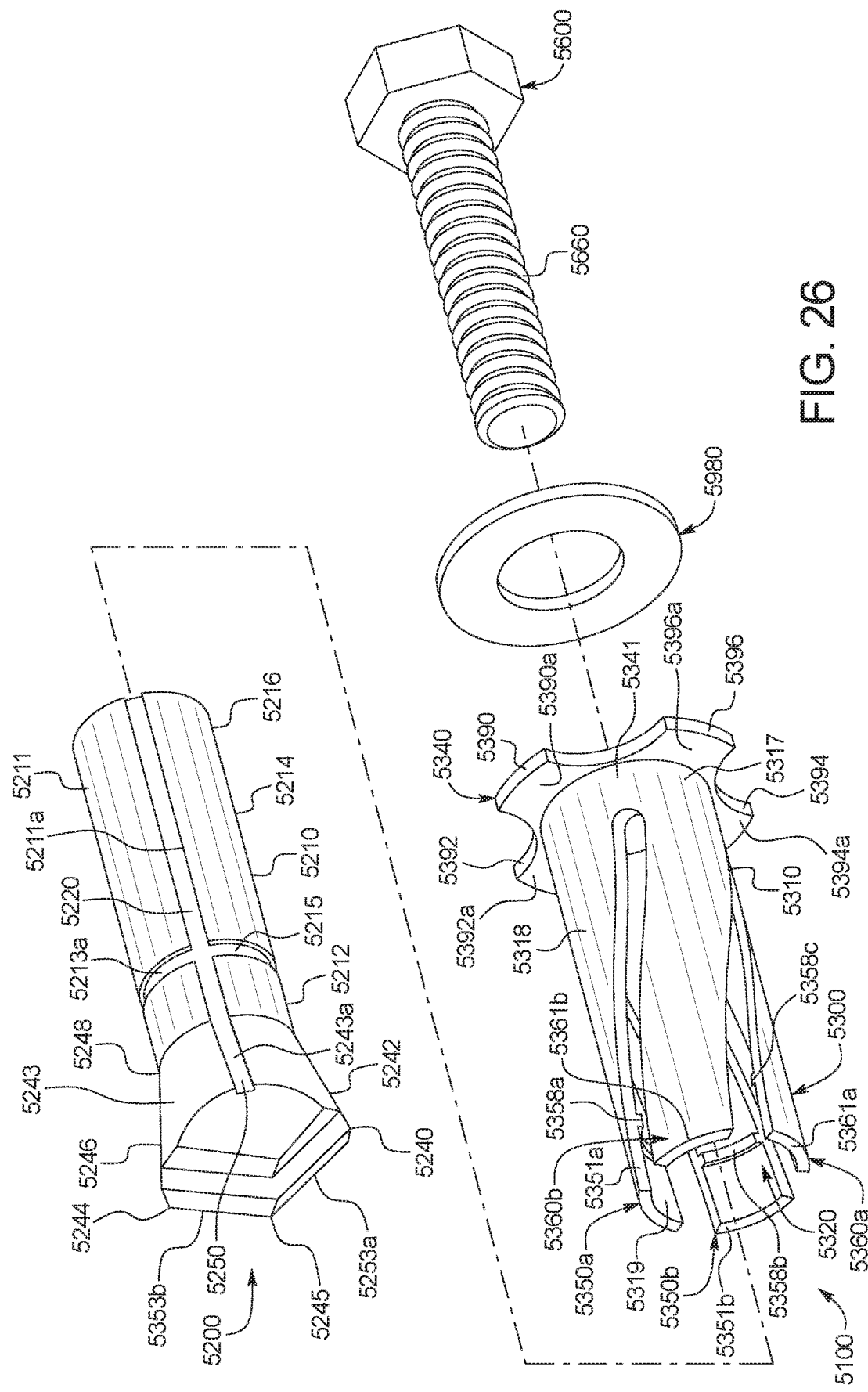
FIG. 26 is an exploded perspective view of a self-drilling anchor assembly of another example embodiment of the present disclosure, and illustrating the anchor and the drill bit of the self-drilling anchor assembly prior to assembly.
Figure 27:
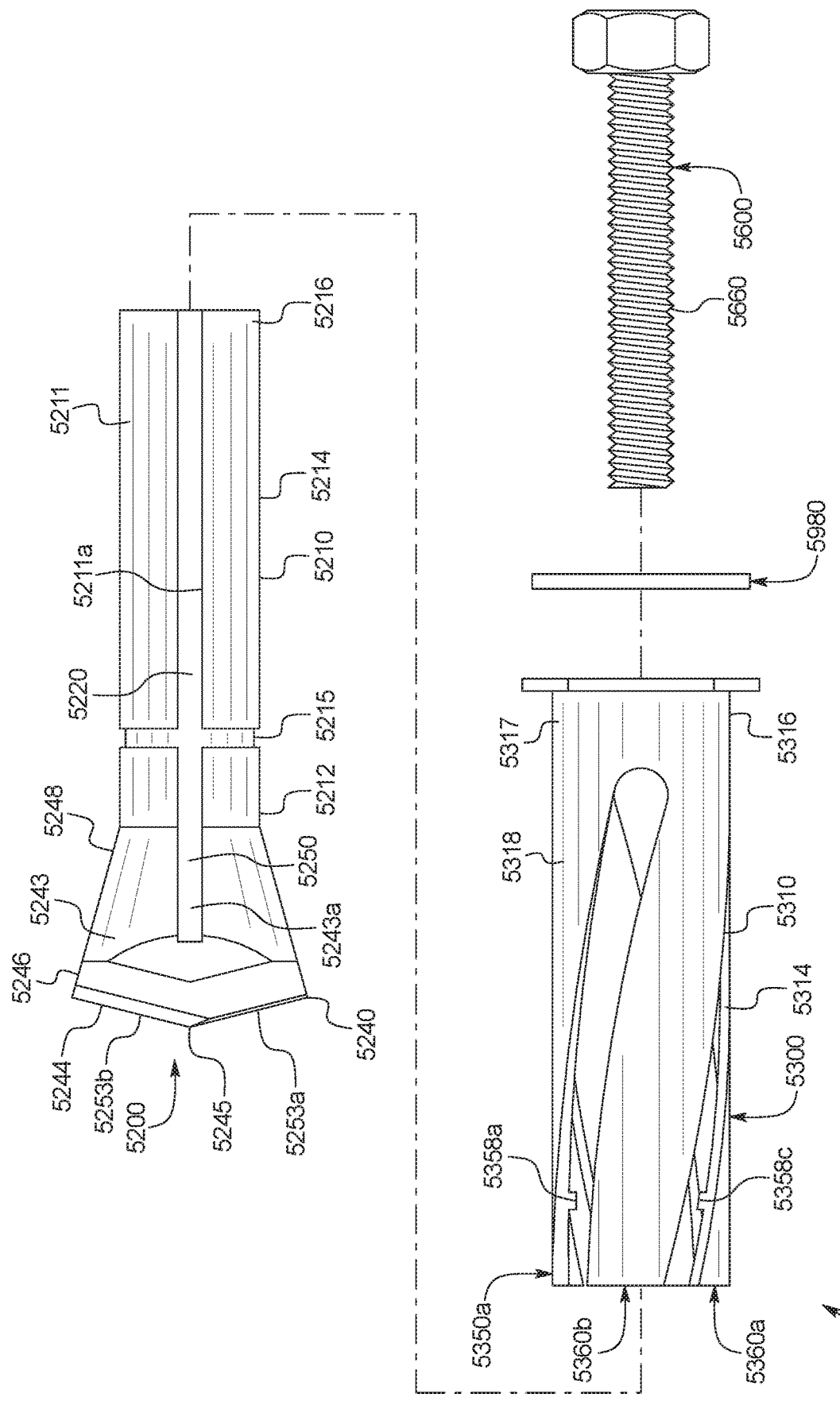
FIG. 27 is an exploded side view of the self-drilling anchor assembly of FIG. 26, and illustrating the anchor and the drill bit of the self-drilling anchor assembly prior to assembly.
Figure 28:
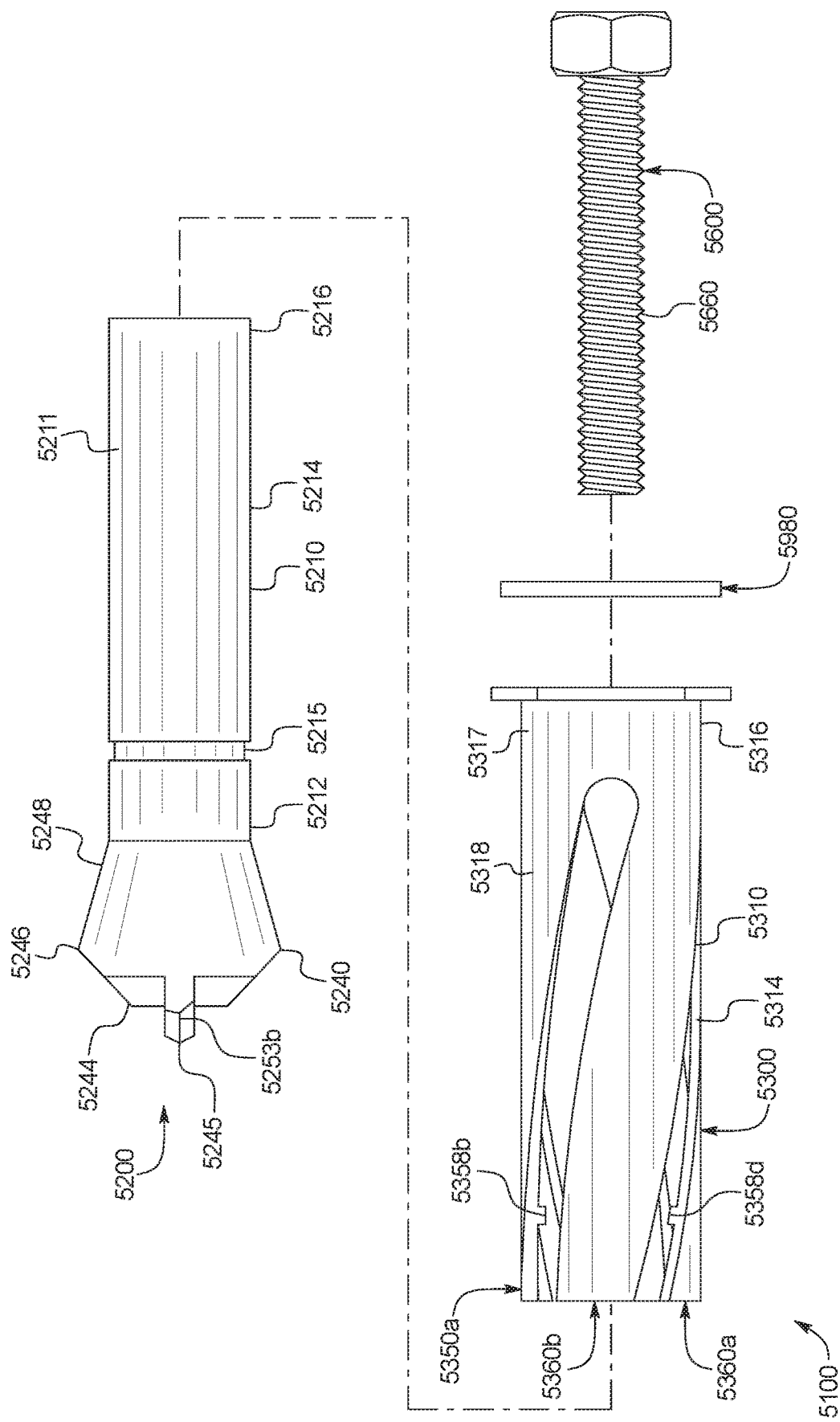
FIG. 28 is an exploded top view of the self-drilling anchor assembly of FIG. 26, and illustrating the anchor and the drill bit of the self-drilling anchor assembly prior to assembly.
Figure 29:
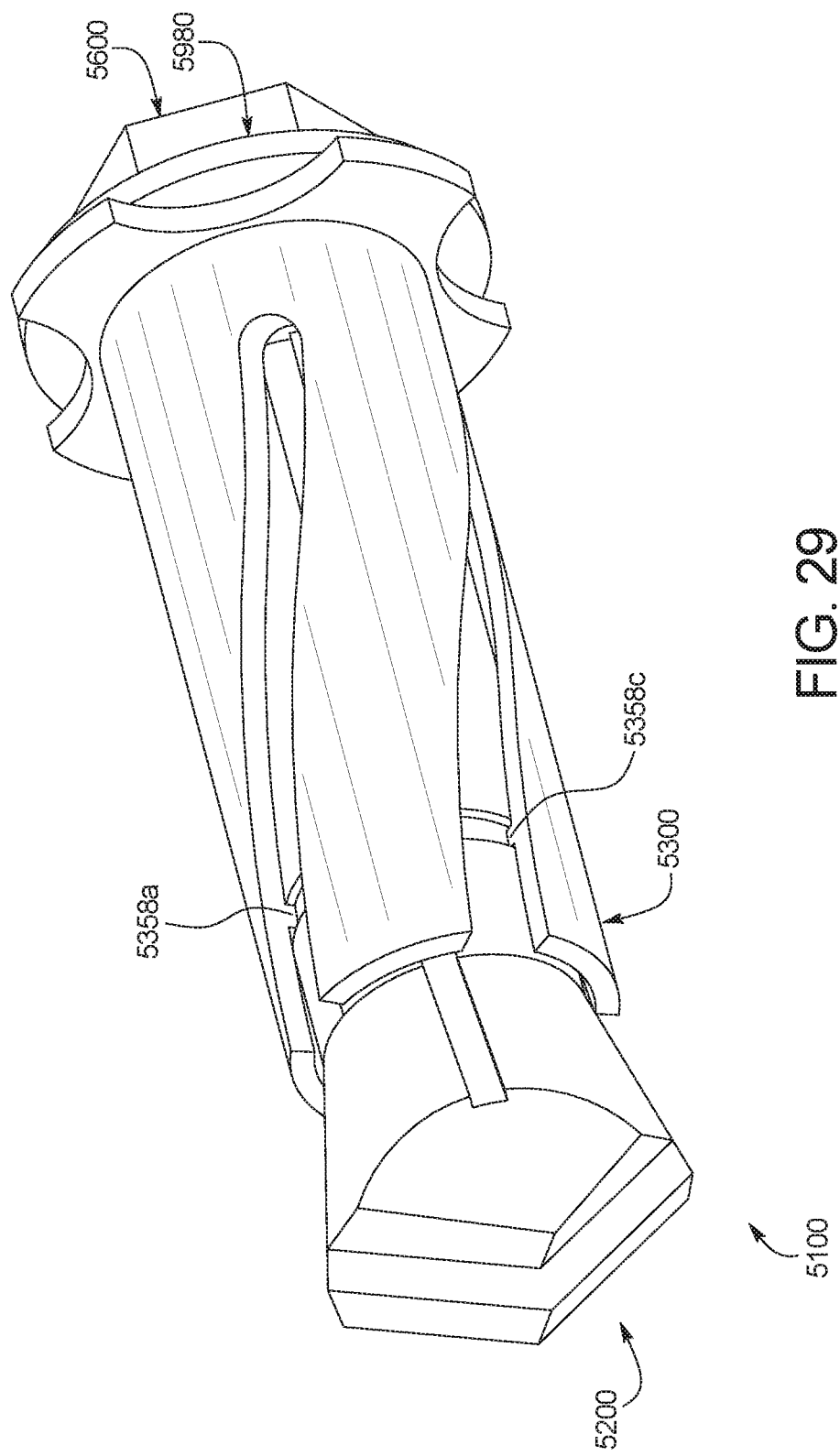
FIG. 29 is a perspective view of the self-drilling anchor assembly of FIG. 26, and illustrating the anchor and the drill bit of the self-drilling anchor assembly after assembly.
Figure 30:
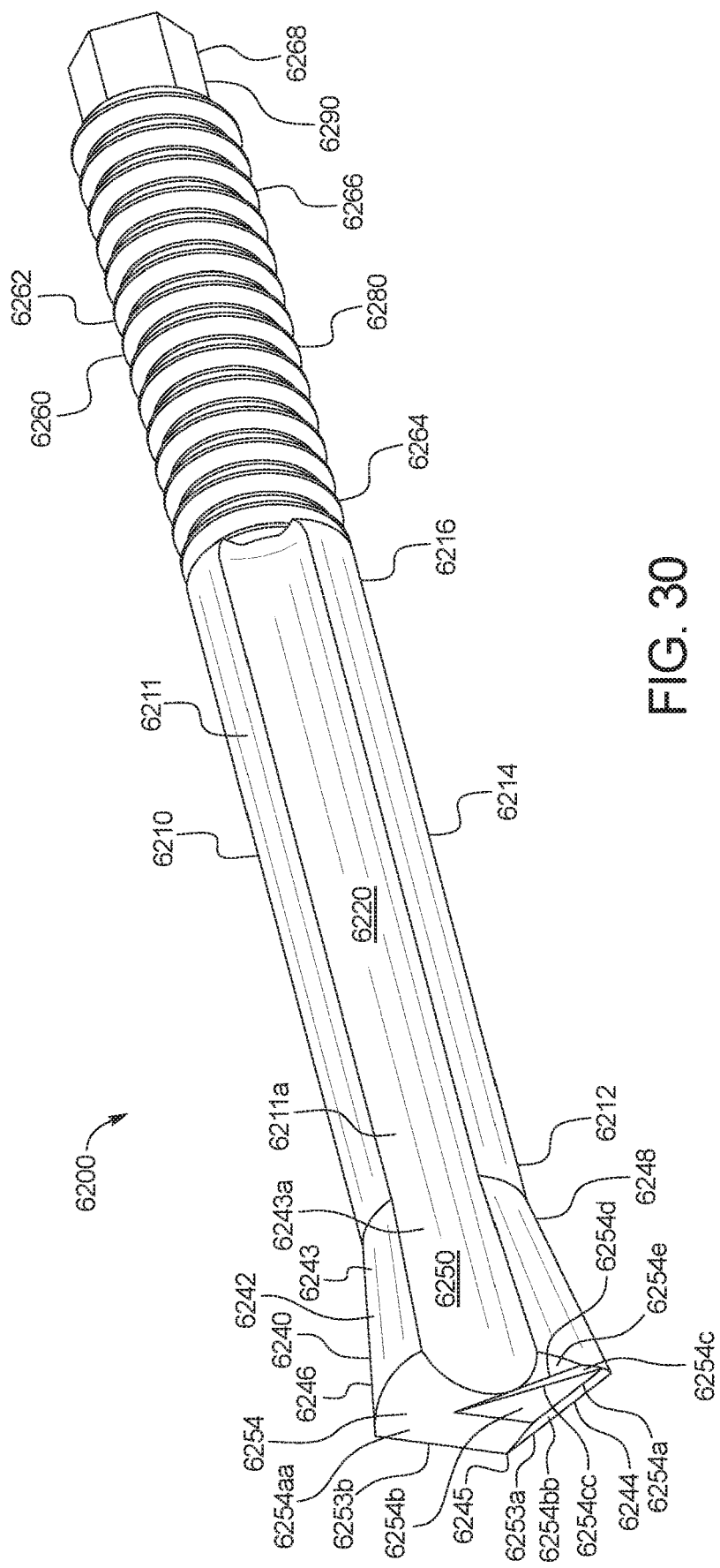
FIG. 30 is a first side perspective view of a drill bit of a self-drilling anchor assembly of another example embodiment of the present disclosure.
Figure 31:
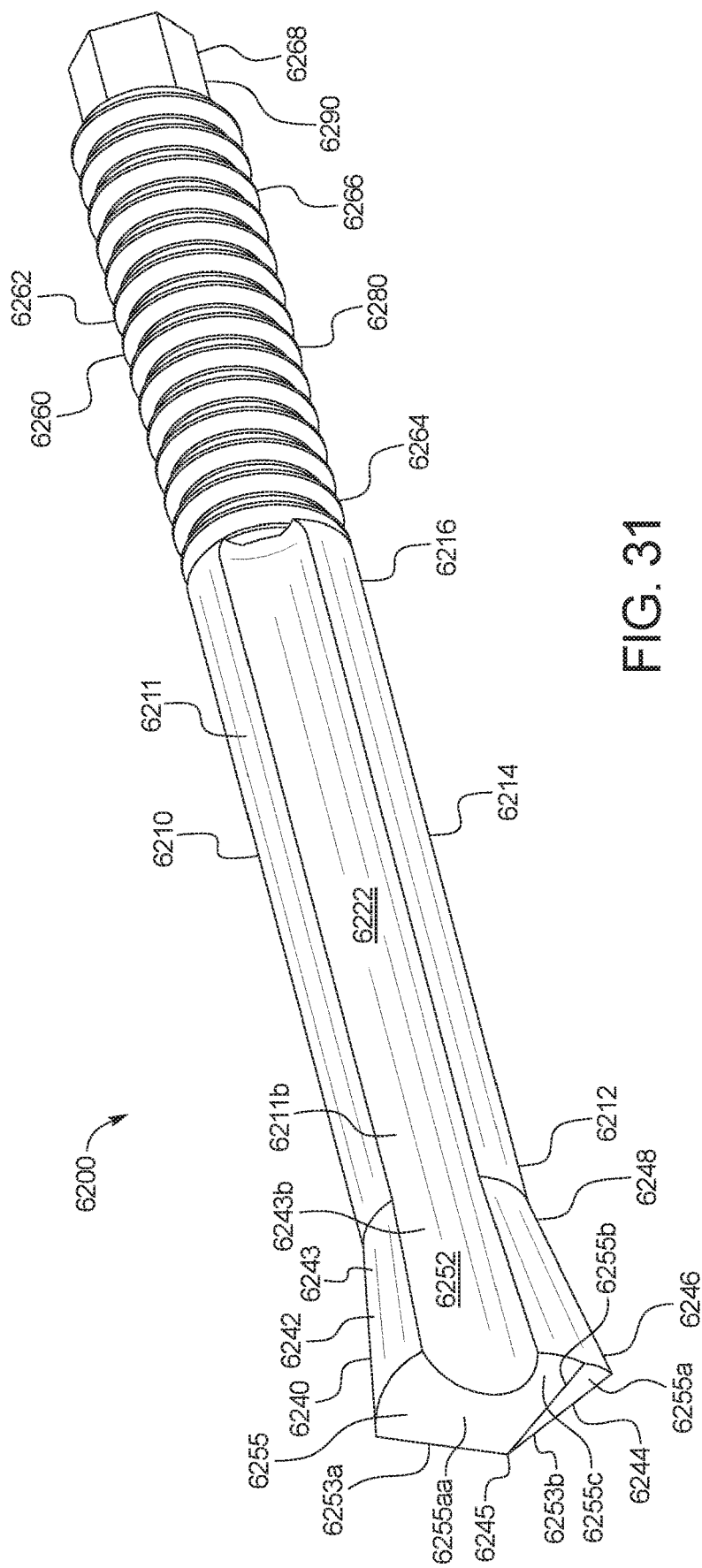
FIG. 31 is a second side perspective view of the drill bit of FIG. 30.
Figure 32:
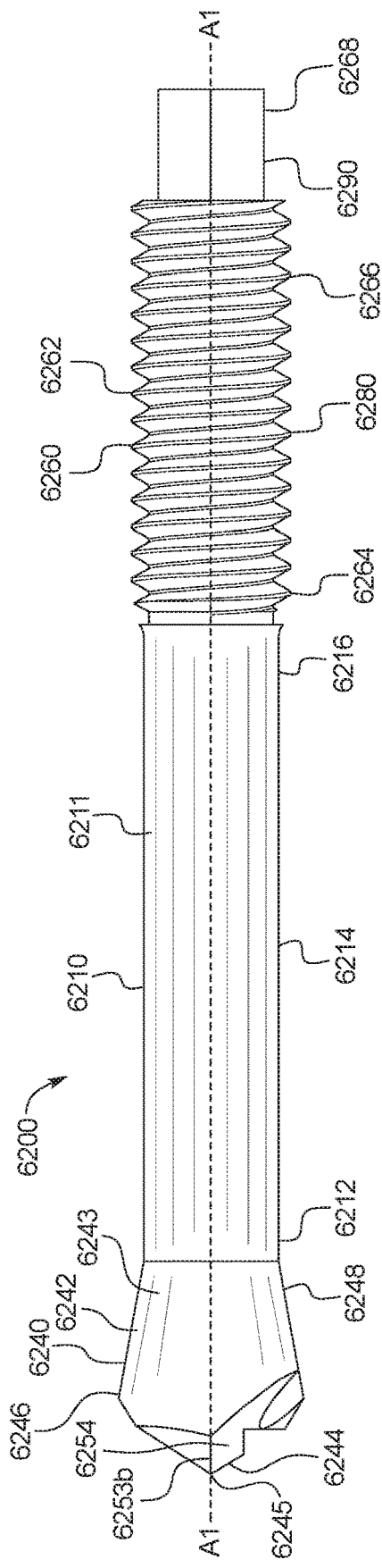
FIG. 32 is a top view of the drill bit of FIG. 30.
Figure 33:
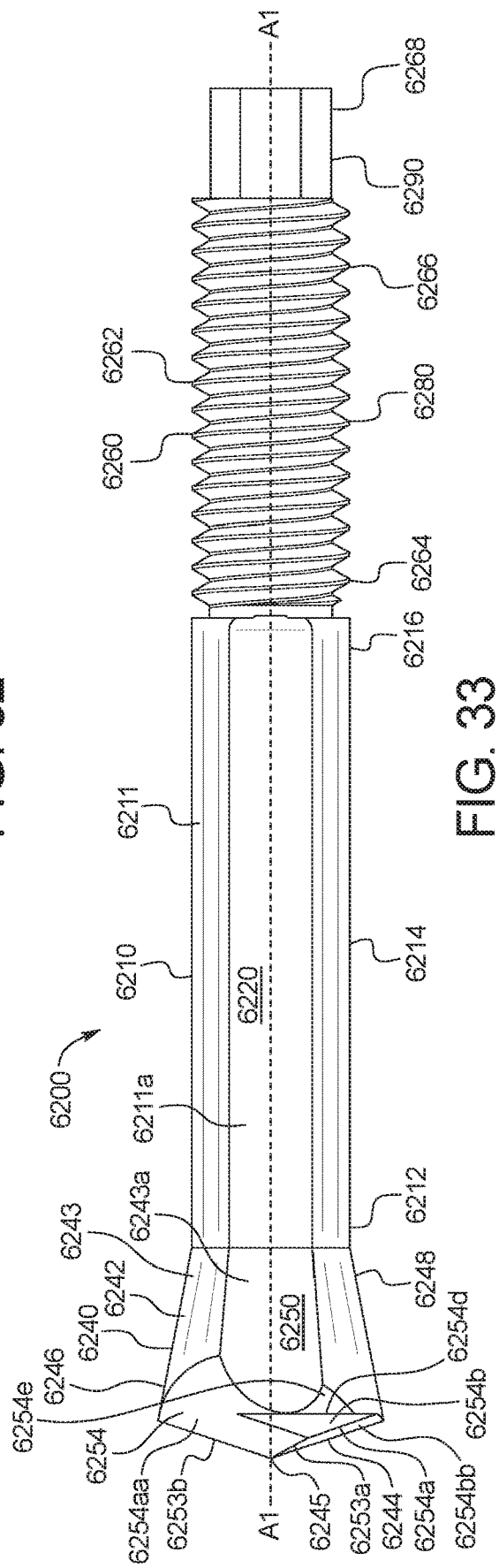
FIG. 33 is a first side view of the drill bit of FIG. 30.
Figure 36:
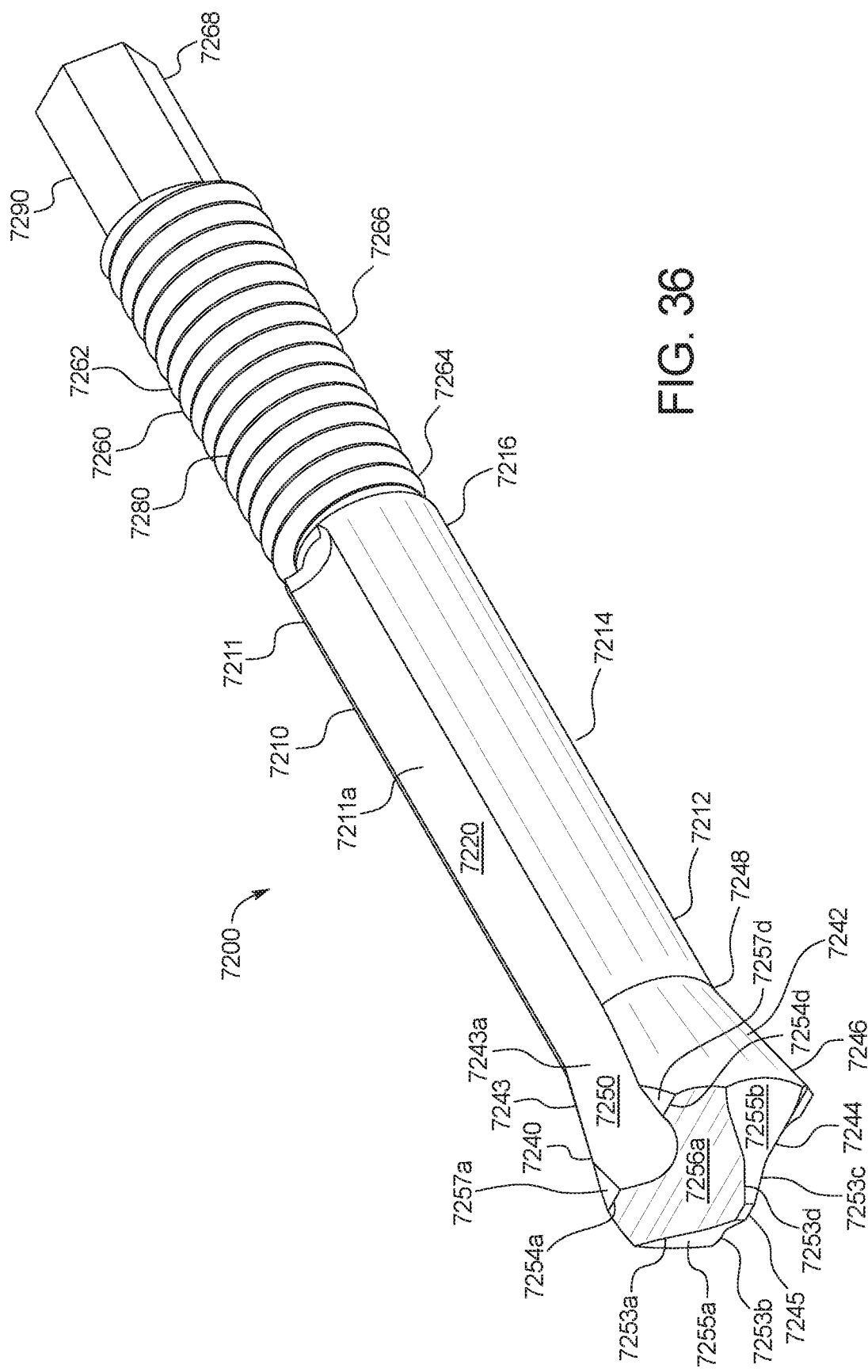
FIG. 36 is a first side perspective view of a drill bit of a self-drilling anchor assembly of another example embodiment of the present disclosure.
Figure 39:
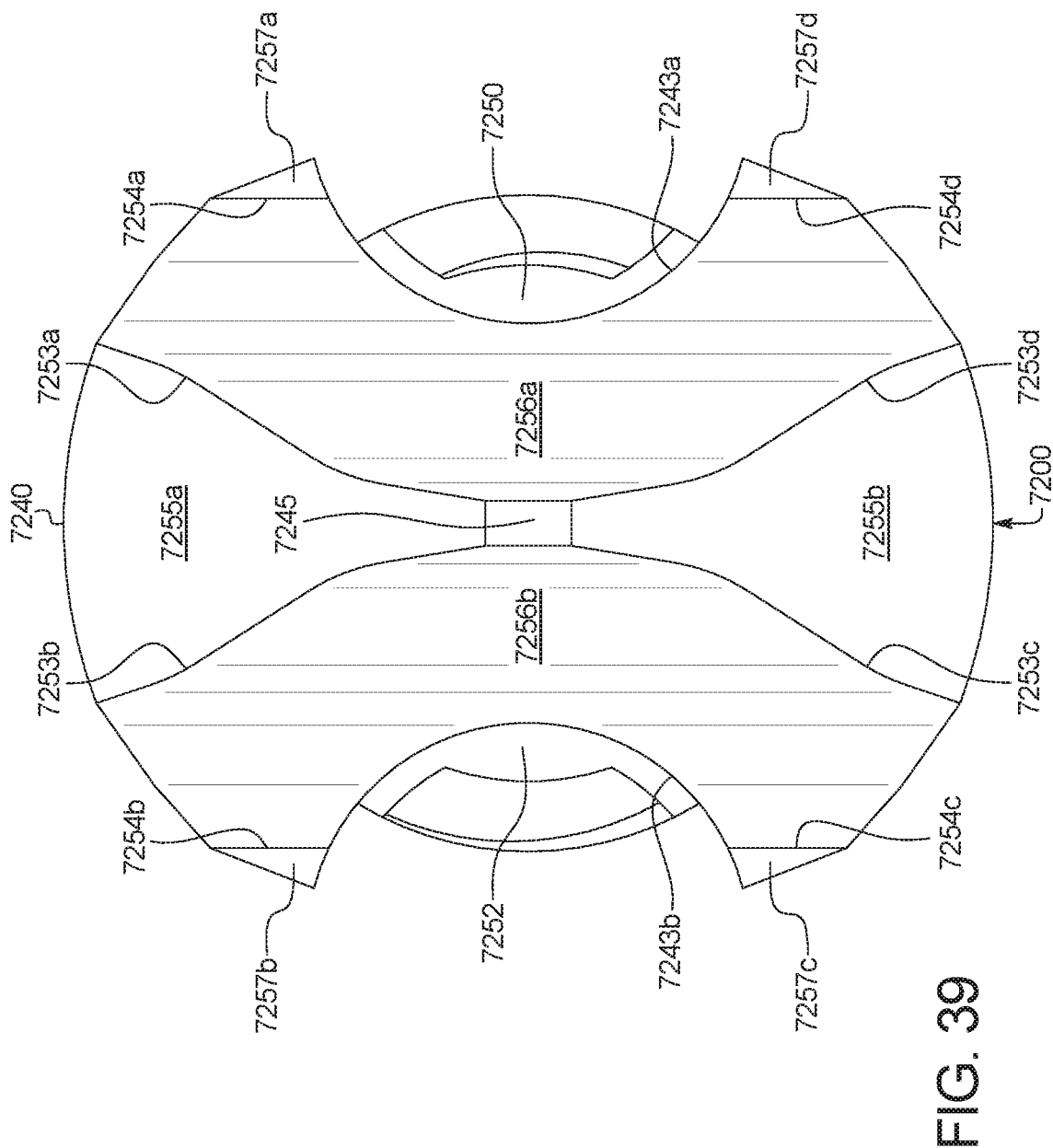
FIG. 39 is a front end view of the drill bit of FIG. 36.
Figure 40:
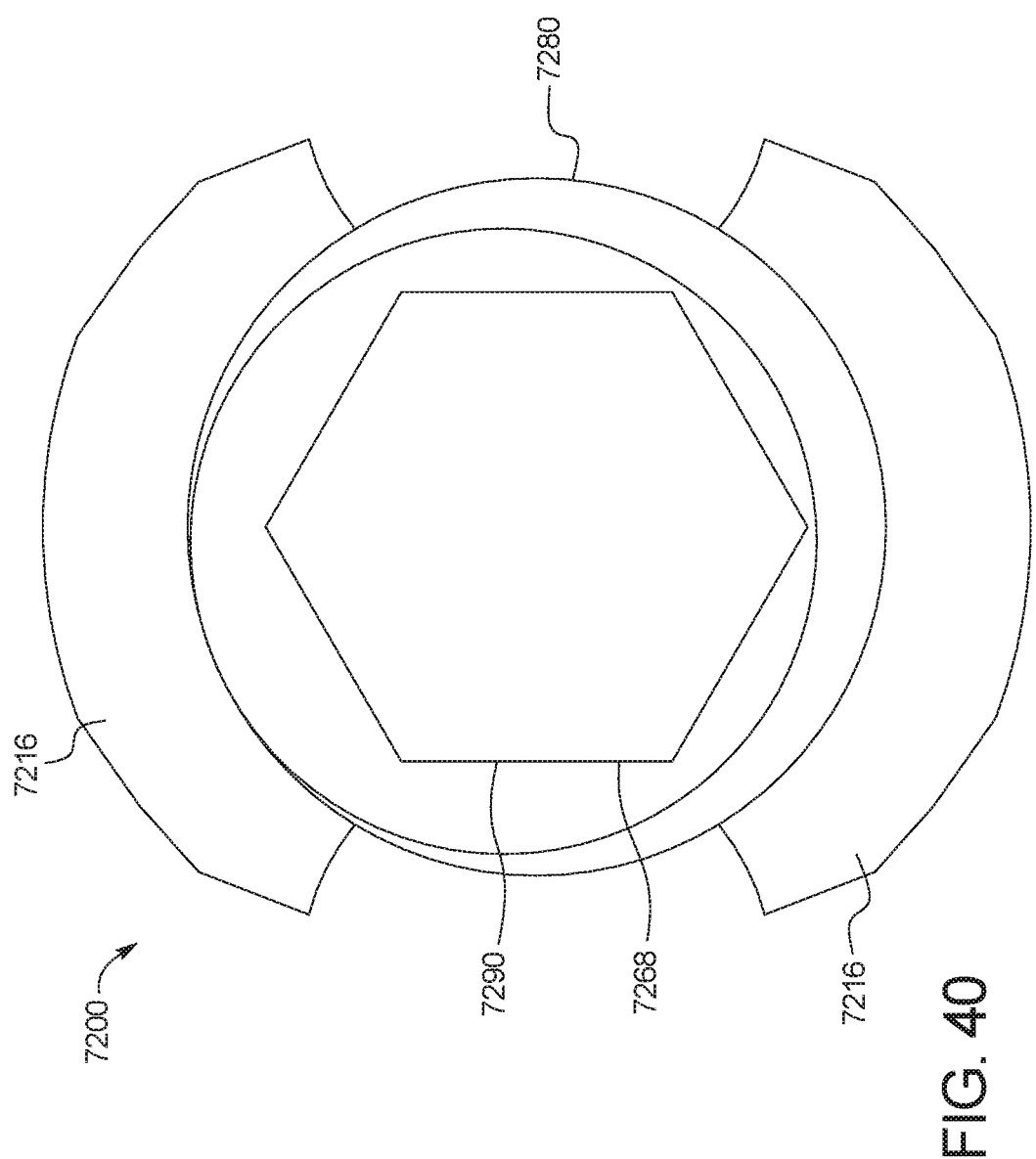
FIG. 40 is a rear end view of the drill bit of FIG. 36.
Figure 41:
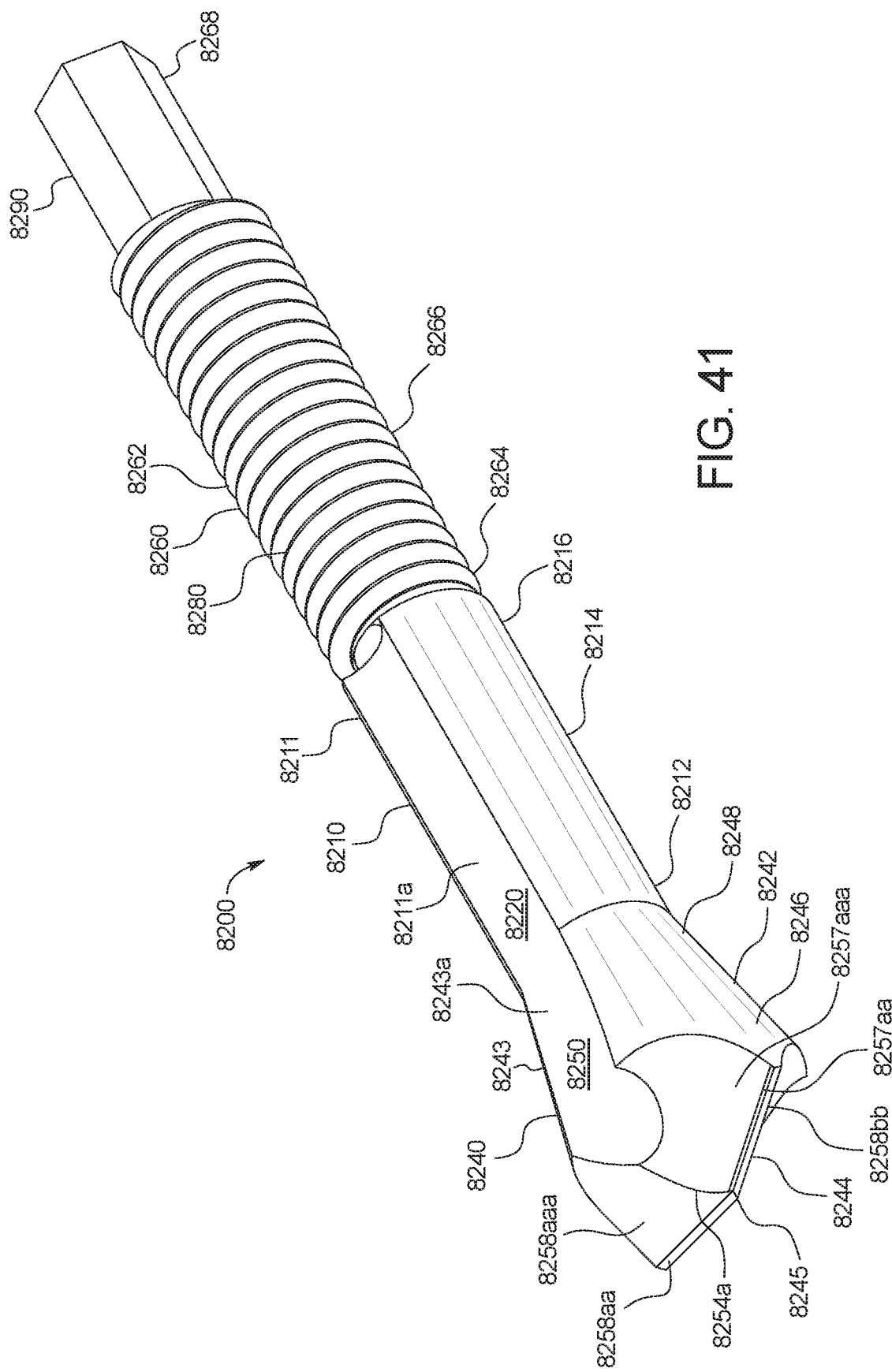
FIG. 41 is a first side perspective view of a drill bit of a self-drilling anchor assembly of another example embodiment of the present disclosure.
Figure 44:
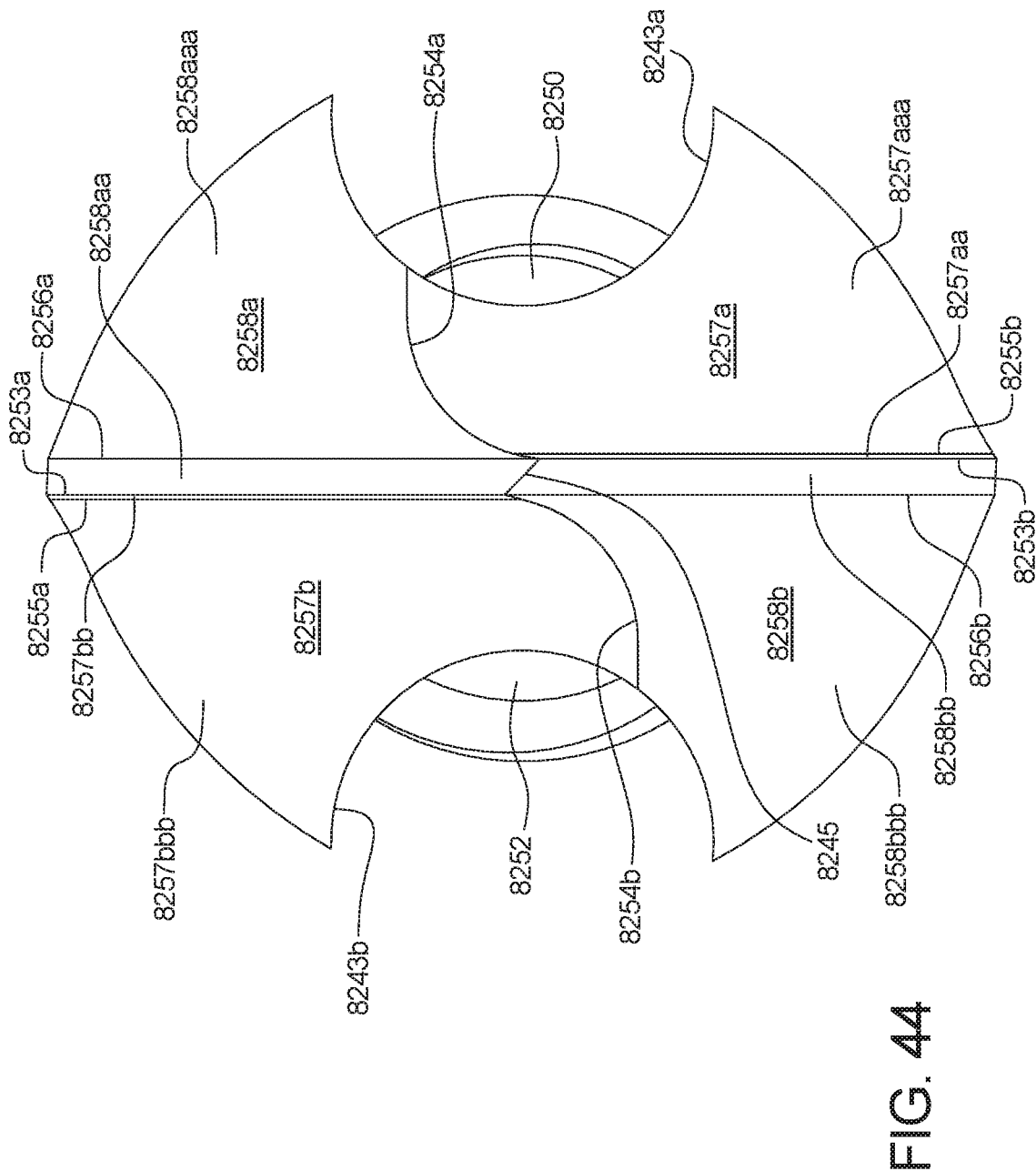
FIG. 44 is a front end view of the drill bit of FIG. 41.
Figure 45:
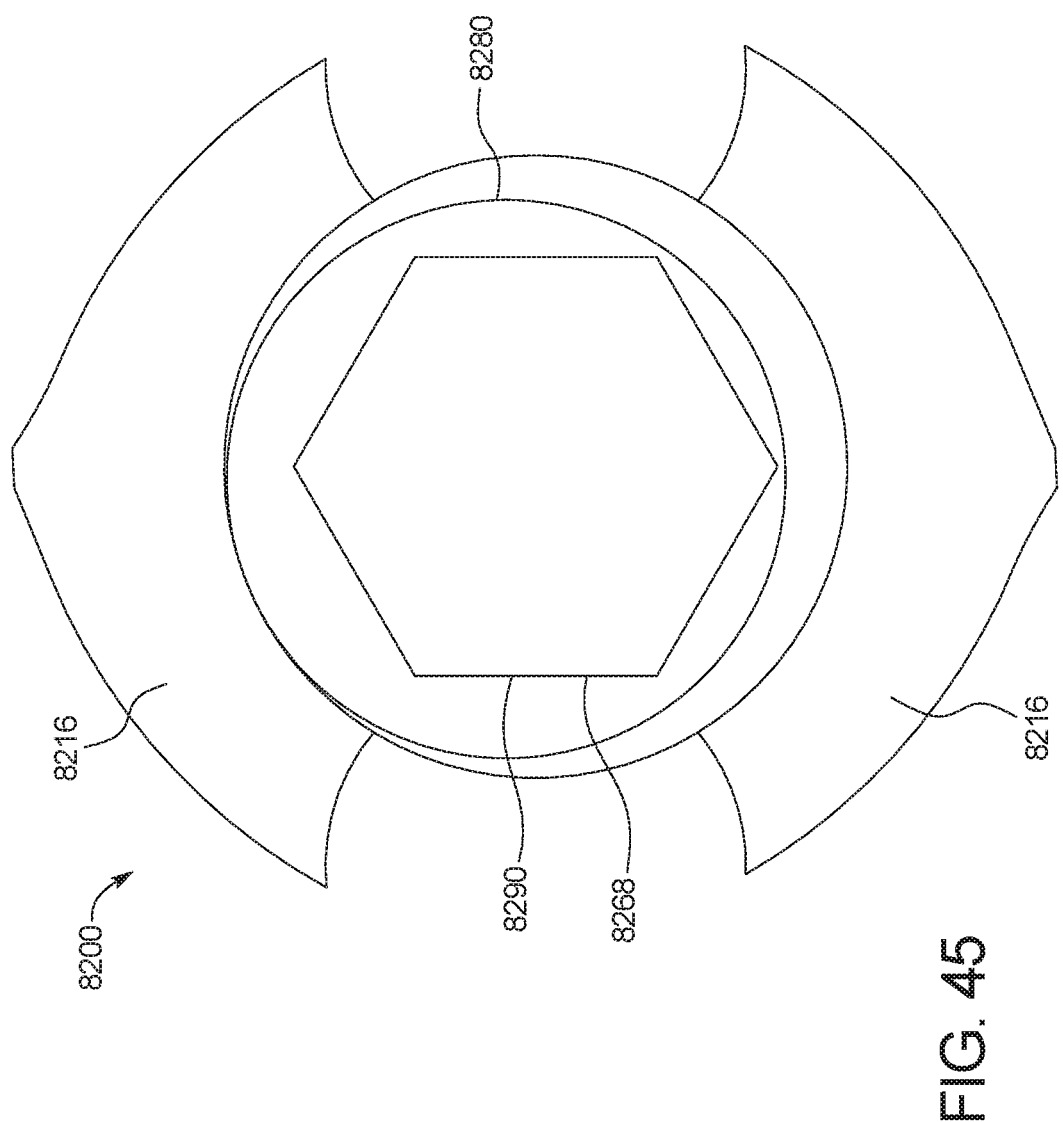
FIG. 45 is a rear end view of the drill bit of FIG. 41.
Figure 46:
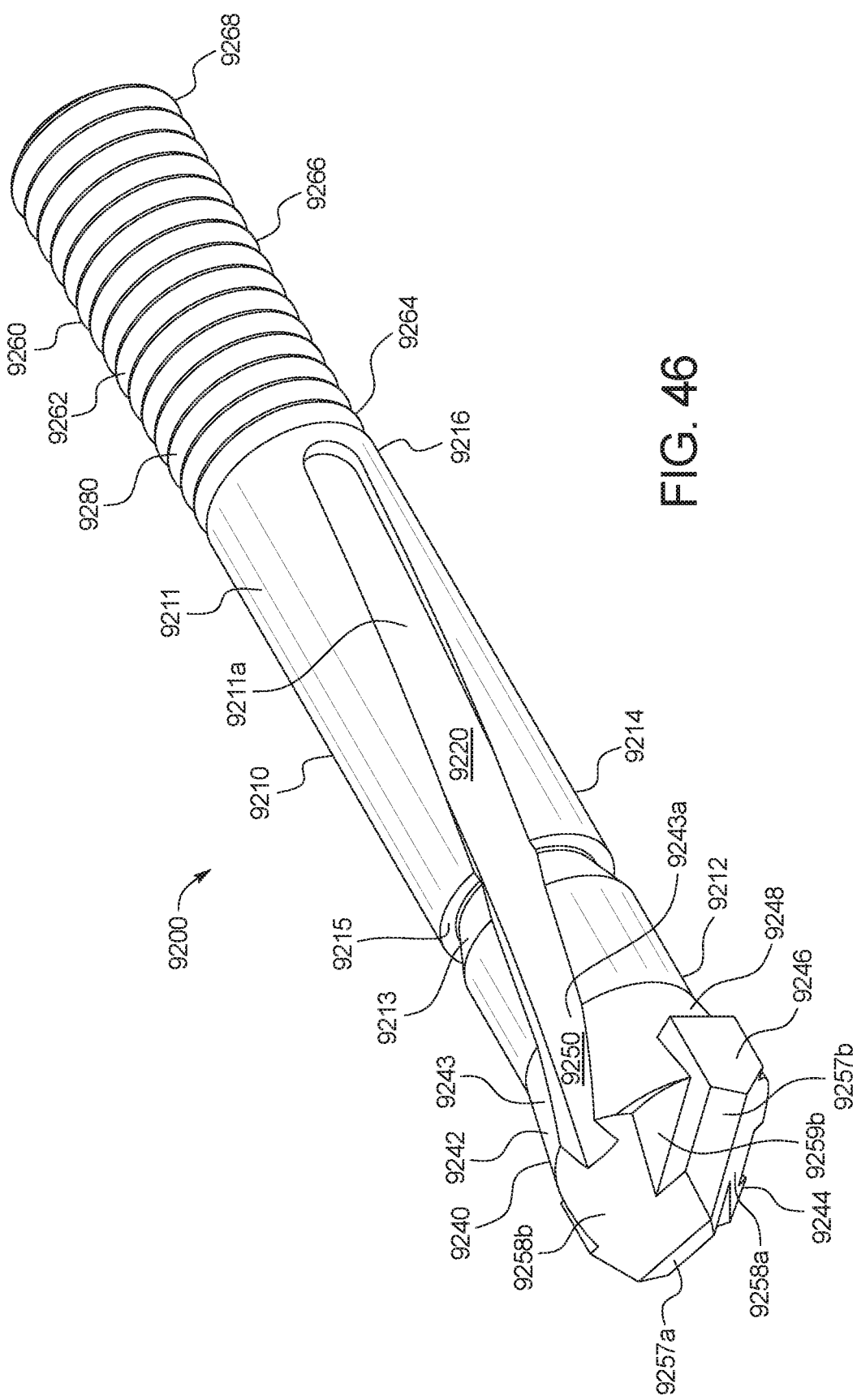
FIG. 46 is a first side perspective view of a drill bit of a self-drilling anchor assembly of another example embodiment of the present disclosure.
Figure 49:
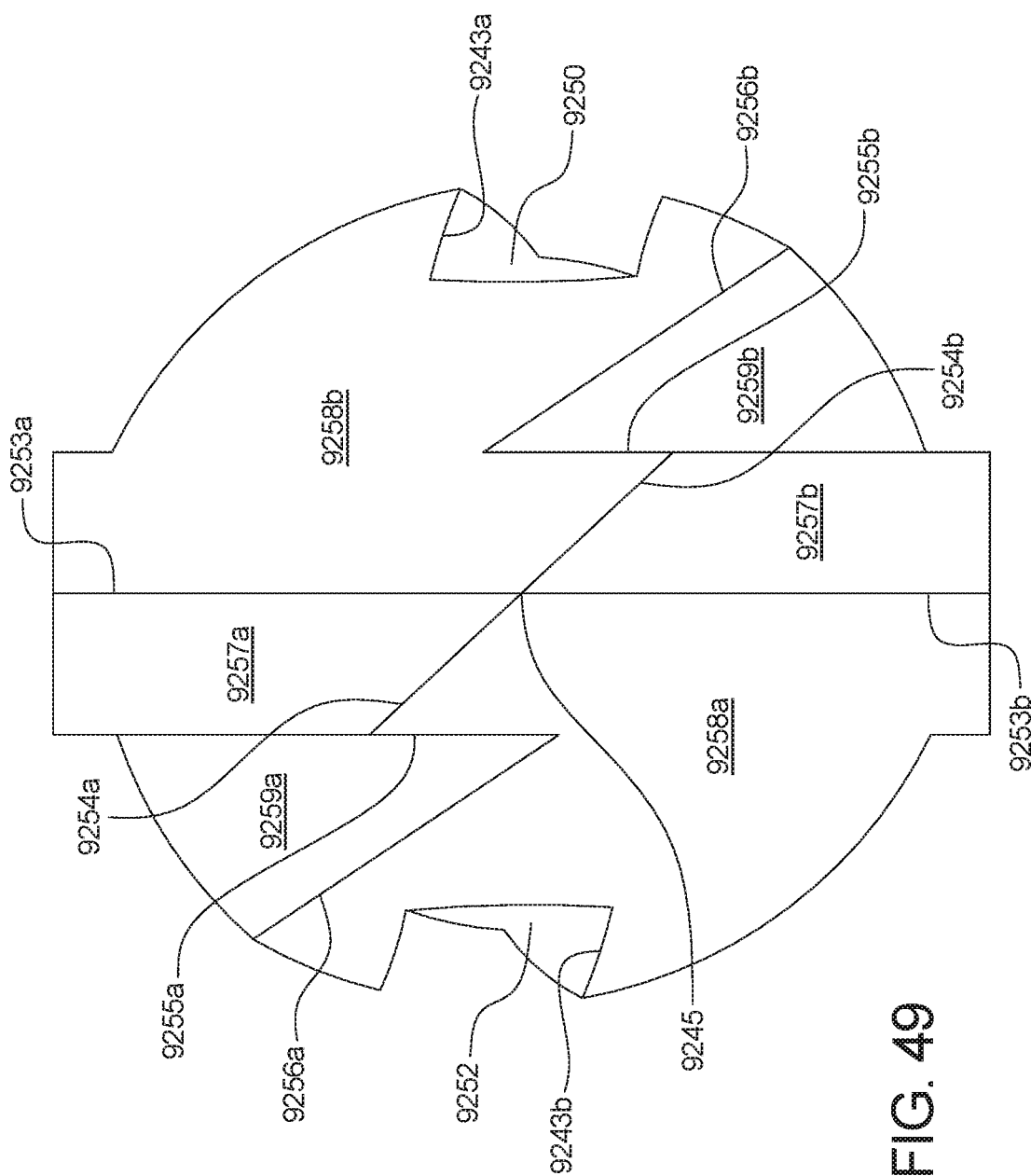
FIG. 49 is a front end view of the drill bit of FIG. 46.

Referring now to FIGS. 26, 27, 28, and 29, another example embodiment of a self-drilling anchor assembly of the present disclosure is generally illustrated. The self-drilling anchor assembly of this illustrated example embodiment is generally indicated by numeral 5100. The self-drilling anchor assembly 5100 generally includes: (a) a drill bit 5200; (b) an anchor 5300 positionable on or over and attached to the drill bit 5200; and (c) an attachment member such as bolt 5600 threadably receivable in the drill bit 5200. FIGS. 26, 27, and 28 show the self-drilling anchor assembly 5100 and specifically the drill bit 5200, the anchor 5300, and the bolt 5600 before assembly. FIG. 29 shows the self-drilling anchor assembly 5100 and specifically the drill bit 5200, the anchor 5300, and the bolt 5600 after assembly wherein: (a) the anchor 5300 is positioned on or over and attached to the drill bit 5200; (b) the drill bit 5200 is partially positioned in and extends at both front and rear ends from the anchor 5300; and (c) the bolt 5600 is attached to the drill bit 5200.

More specifically, this alternative example drill bit 5200 includes: (a) a generally cylindrical solid shank 5210 having a front end 5212, an intermediate or center portion 5214, and a rear end 5216; (b) a drill head 5240 integrally connected to and extending from the front end 5212 of the shank 5210. The drill bit 5200 and specifically the shank 5210 and the drill head 5240, have a generally central longitudinal axis. The drill bit 5200 is configured to remain in the substrate and assist in maintaining the anchor 5300 in the substrate.

The shank 5210 includes an outer surface 5211 that includes two recessed longitudinally extending sections (including section 5211*a*) that respectively define two opposing longitudinally extending flutes (including flute 5220) that each extend longitudinally along the entire length of the shank 5210. The flutes each have a generally rectangular cross section (at each point along the longitudinal length) and are configured to direct loose material of the substrate that is broken away by the drill head 5240 from the drill head 5240 toward the rear end 5216 of the shank 5210 and out of the hole being formed in the substrate. The shank 5210 further includes a recessed circumferentially extending section 5213*a* that defines an annular locking recess 5215 configured to receive inwardly extending drill bit attachment portions 5358*a*, 5358*b*, and 5358*c*, and 5358*d* that form an inwardly extending drill bit attachment ring 5358 of the anchor 5300. It should be appreciated that the shank 5210 may be alternatively configured (in shape and/or size) in accordance with the present disclosure.

The drill head 5240 includes a solid body 5242 having a tip end 5244, an intermediate or center portion 5246, and a rear end 5248. The rear end 5248 is integrally connected to and extends from the front end 5212 of the shank 5210. The intermediate or center portion 5246 has a generally wider outer diameter than the tip end 5244 and the rear end 5448.

The body 5242 includes an outer surface 5243 that includes two recessed sections (including section 5243*a*) that respectively define two opposing longitudinally extending flutes (including flute 5250) each extending longitudinally along a portion of the body 5242 toward the shank 5210. The flutes each have a rectangular cross section and are configured to direct loose material of the substrate (that is broken away by the tip end 5244) toward the front end 5212 of the shank 5210 and out of the hole being formed in the substrate. The flutes are respectively aligned with and are configured to communicate loose material to the flutes defined by the shank 5210. The flutes are each of the same or substantially the same cross-sectional area as the respective flutes defined by the shank 5210.

The tip end 5244 has a pointed drill tip 5245 that is positioned at or along the central longitudinal axis. The tip end 5244 includes two front outwardly and rearwardly extending angled cutting edges 5253*a* and 5253*b* that extend from the tip 5245. The tip end 5244 includes first side portions (not labeled) that each extends rearwardly and outwardly from the cutting edges 5253*a* and 5253*b*. The tip end 5244 also includes second side portions (not labeled) that each extends rearwardly and outwardly from the cutting edges 5253*a* and 5253*b*. The tip end 5244 further includes four rear outwardly and rearwardly extending angled additional cutting edges (not labeled). The tip end 5244 includes a first rear side portion (not labeled) that extends rearwardly and outwardly from the additional cutting edges. The tip end 5244 includes a second rear side portion (not labeled) that extends rearwardly and outwardly from the additional cutting edges. It should be appreciated from this example embodiment that the drill head may be alternatively configured (in shape and/or size) in accordance with the present disclosure.

Instead of an external threaded tail like the embodiments of FIGS. 1 to 25, the shank 5210 of the drill bit 5200 has an internal threaded portion (not shown) configured to threadably connect to the threaded portion of the bolt 5600.

In this illustrated example embodiment, the drill bit 5200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

The anchor 5300 includes: (i) an elongated generally tubular body 5310 having an a front end 5312, an intermediate or center portion 5314, and a rear end 5316, an outer surface 5318, and an inner surface 5319; and (ii) a head 5340 integrally connected to and extending from the rear end 5316 of the tubular body 5310.

The outer surface 5318 of the body 5310 has an outer diameter (not labeled); and (b) the inner surface 5319 of the body 5310 has an inner diameter (not labeled). The inner surface 5319 of the tubular body 5310 defines a longitudinally extending inner channel 5320 configured to receive the drill bit 5200, and thus has a larger inner diameter than the outer diameter of the shank 5210 of the drill bit 5200. The inner surface 5319 of the tubular body 5310 also has a larger inner diameter than the outer diameter of the tail 5260 of the drill bit 5200. The body 5310 has a generally central longitudinal axis that is aligned with or that extends along the same central longitudinal axis of the drill bit 5200 when the drill bit 5200 is positioned in the anchor 5300.

The front end 5312, the intermediate or center portion 5314, and the rear end 5316 of the body 5300 of the anchor 5300 define, form, or include four independently movable or pivotable longitudinally extending angled gripping arms 5350*a*, 5350*b*, 5360*a*, and 5360*b*. Gripping arm 5350*a* includes a longitudinally extending curved wall 5351*a* and a drill bit attachment portion 5358*a* integrally connected to and extending inwardly from the curved wall 5351*a*. Gripping arm 5350*b* includes a longitudinally extending curved wall 5351*b* and a drill bit attachment portion 5358*b* integrally connected to and extending inwardly from the curved wall 5351*b*. Gripping arm 5360*a* includes a longitudinally extending curved wall 5361*a* and a drill bit attachment portion 5368*a* integrally connected to and extending inwardly from the curved wall 5361*a*. Gripping arm 5360*b* includes a longitudinally extending curved wall 5361*b* and a drill bit attachment portion 5358*d* integrally connected to and extending inwardly from the curved wall 5361*b*. The gripping arms 5350*a*, 5350*b*, 5360*a*, and 5360*b* are curved or extend in a diagonal direction such that the openings or flutes formed between the gripping arms 5350*a*, 5350*b*, 5360*a*, and 5360*b* are curved or extend in a diagonal direction. The gripping arms in this illustrated example embodiment are identical or substantially identical. It should be appreciated that in other embodiments of the present disclosure, the gripping arms do not need to be identical or substantially identical and that the quantity of gripping arms may vary.

The rear end 5316 of the body 5310 of the anchor 5300 includes a cylindrical wall 5317 that defines a longitudinally extending inner cylindrical channel (not labeled) that is aligned with and in communication with the longitudinally extending inner channel 5320 of the body 5310.

The head 5340 of the anchor 5300 includes a cylindrical wall 5341 that includes an inner surface (not labeled) that defines a longitudinally extending inner channel (not labeled) that is aligned with and in communication with the longitudinally extending inner channel of the rear end 5316 of the body 5310 of the anchor 5300 and that is aligned with and in communication with the longitudinally extending inner channel 5320 of the body 5310. The head 5340 also includes flanges 5390, 5392, 5394, and 5396 that are integrally connected to and extend outwardly or transversely from the cylindrical wall 5341. The flanges 5390, 5392, 5394, and 5396 of the head 5340 of the anchor 5300 have flat or generally flat inner engagement surfaces 5390*a*, 5392*a*, 5394*a*, and 5396*a*. These engagement surfaces 5390*a*, 5392*a*, 5394*a*, and 5396*a* are configured to engage an outer surface of a substrate. It should be appreciated that the head of the anchor may be alternatively configured in accordance with the present disclosure.

In this illustrated example embodiment, the anchor 5300 is made from Carbon steel, and plated and/or coated to resist corrosion. However, it should be appreciated that the anchor can be made from other suitable materials and in other suitable manners.

To assemble the self-drilling anchor assembly 5100, the drill bit 5200 is inserted into the front end 5312 of the body 5310 of the anchor 5300 and moved through the anchor 5300 until the rear end 5248 of the head 5240 engages or is adjacent to the front end 5312 of the body 5310 of the anchor 5300. At this point in the assembly process, the drill bit attachment portions 5358*a*, 5358*b*, 5358*c*, and 5358*d* extend into the annular locking recess 5215 as shown in FIG. 29. The drill bit attachment portions 5358*a*, 5358*b*, 5358*c*, and 5358*d* co-act to maintain the anchor 5300 in the desired position around the drill bit 5200. The attachment portions 5358*a*, 5358*b*, 5358*c*, and 5358*d* co-act to allow the anchor 5300 to rotate with the drill bit 5200 when the drill bit 5200 is rotated. It should further be appreciated that the attachment portions 5358*a*, 5358*b*, 5358*c*, and 5358*d* tabs can be alternatively configured, alternatively positioned, and that quantity of attachments portions can vary in accordance with the present disclosure.

It should be appreciated from the above, that the drill bit 5200 remains as part of the anchor assembly 5100 in the substrate. It should further be appreciated as mentioned above, that the drill bit will thus be typically only used one time and can be made from a relatively inexpensive material because wearing or dulling of the cutting tip and edges of the drill bit will not be a problem.

Referring now to FIGS. 30, 31, 32, 33, 34, and 35, another example embodiment of a drill bit of a self-drilling anchor assembly of the present disclosure is generally illustrated. This drill bit 6200 can be employed with one or more of the anchors described herein to form a self-drilling anchor assembly in accordance with the present disclosure.

More specifically, the drill bit 6200 includes: (a) a generally cylindrical solid shank 6210 having a front end 6212, an intermediate or center portion 6214, and a rear end 6216; (b) a drill head 6240 integrally connected to and extending from the front end 6212 of the shank 6210; and (c) an exterior partially threaded tail 6260 integrally connected to and extending from the rear end 6216 of the shank 6210. The drill bit 6200 and specifically the shank 6210, the drill head 6240, and the tail 6260 have a generally central longitudinal axis labeled A1. The drill bit 6200 is configured to remain in the substrate and assist in maintaining the anchor in the substrate as described above.

The shank 6210 includes an outer surface 6211 that includes two recessed longitudinally extending sections 6211*a* and 6211*b* that respectively define two opposing longitudinally extending flutes 6220 and 6222 that each extend longitudinally along the entire length of the shank 6210. The flutes 6220 and 6222 each have a generally partially cylindrical cross section (at each point along the longitudinal length) and are configured to direct loose material of the substrate that is broken away by the drill head 6240 from the drill head 6240 toward the rear end 6216 of the shank 6210 and out of the hole being formed in the substrate. It should be appreciated that the shank 6210 (including the flutes) may be alternatively configured (in shape and/or size) in accordance with the present disclosure.

The drill head 6240 includes a solid body 6242 having a tip end 6244, an intermediate or center portion 6246, and a rear end 6248. The rear end 6248 is integrally connected to and extends from the front end 6212 of the shank 6210. The intermediate or center portion 6246 has a generally wider outer diameter than the tip end 6244 and the rear end 6248.

The body 6242 includes an outer surface 6243 that includes two recessed sections 6243*a* and 6243*b* that respectively define two opposing longitudinally extending flutes 6250 and 6252 that each extend longitudinally along a portion of the body 6242 toward the shank 6210. The flutes 6250 and 6252 each have a partially cylindrical cross section and are configured to direct loose material of the substrate (that is broken away by the tip end 6244) toward the front end 6212 of the shank 6210 and out of the hole being formed. The flutes 6250 and 6252 are respectively aligned with and are configured to communicate loose material to the flutes 6220 and 6222 defined by the shank 6210. Each of the flutes 6250 and 6252 are relatively wider toward the tip end 6244 and are narrower at or taper to the rear end 6248 of the body 6242. At the rear end 6248, each of the flutes 6250 and 6252 has the same or substantially the same cross-sectional area as the respective flutes 6220 and 6222 defined by the shank 6210.

The tip end 6244 has a pointed drill tip 6245 that is positioned at or along the central longitudinal axis A1. The tip end 6244 includes two front outwardly and rearwardly extending angled cutting edges 6253*a* and 6253*b* that extend from the tip 6245.

The tip end 6244 includes a first side portion (not labeled) that includes a multi-edge and multi-section cutting surface 6254 that extends rearwardly and outwardly from the cutting edges 6253*a* and 6253*b*. The cutting surface 6254 includes a first section 6254*aa* that extends from cutting edge 6253*b* rearwardly and outwardly to the section 6243*a* of the surface 6243 of the drill head 6240 that defines the flute 6250. The cutting surface 6254 also includes a second section 6254*bb* that extends from edge 6253*a* rearwardly and outwardly to edge 6254*a*. The cutting surface 6254 includes a third section 6254*b* that extends rearwardly from edge 6254*a* to edge 6254*cc*. The cutting surface 6254 includes fourth section 6254*c* that extends outwardly from edge 6254*cc* and from section 6254*b* to edge 6254*d*. The cutting surface 6254 includes a fifth section 6254*e* that extends rearwardly and outwardly from edge 6254*d*. This fifth section 6254*e* partially extends rearwardly and outwardly to section 6243*a* of the surface 6243 of the drill head 6240 that defines the flute 6250. This combination of sections partially provide for enhanced complex cutting surfaces.

The tip end 6244 also includes a second opposite side portion that includes a multi-edge and multi-section cutting surface 6255 that has a first section 6255*aa* that extends rearwardly and outwardly from the cutting edge 6253*a* to the section 6243*b* of the surface 6243 of the drill head 6240 that defines the flute 6252. The cutting surface 6255 also includes a second section 6255*a* that partially extends from cutting edge 6253*b* rearwardly and outwardly to edge 6255*b*. The cutting surface 6255 includes a third section 6255*c* that extends rearwardly from edge 6255*b* to the section 6243*b* of the surface 6243 of the drill head 6240 that defines the flute 6252. This combination of sections also partially provide for enhanced complex cutting surfaces.

It should be appreciated that the drill head of any of the various embodiments may be alternatively configured (in shape, surfaces, angles, and/or size) in accordance with the present disclosure.

The partially threaded tail 6260 includes a generally cylindrical body 6262 having a front end 6264, an intermediate or center portion 6266, and a rear end 6268. The front end 6264 is integrally connected to and extends from the rear end 6216 of the shank 6210. The threaded portion of the tail 6260 includes an outer outwardly extending helical thread formation 6280 to facilitate attachment of a securing device such as a nut (not shown) and a washer (not shown) to the tail 6260 of the drill bit 6200. The external helical thread formation 6280 of the tail has a plurality of spaced apart thread sections (not labeled) that have or form outer edges or crests (not labeled) and valleys (not labeled) between the crests. The outer diameter of the helical thread formation (sometimes called the crest diameter) is greater than the outer diameter of the shank body 6210 in this illustrated example embodiment to facilitate attachment of the anchor to the drill bit 6200.

The tail 6260 also includes an exterior mechanical engaging structure 6290 that is accessible from the rear end 6268 of the body 6262. The mechanical engaging structure 6290 is engageable by a suitable tool to rotate the drill bit 6200. In this illustrated example embodiment of the present disclosure, the mechanical engaging structure 6290 includes a plurality of (and specifically six) external walls (not labeled) having a plurality of first surfaces (not labeled) that define a hexagonal shaped member or formation configured to be received in a hex drive or attached to a rotating tool that has a hex receiving head can engage these respective first surfaces. It should be appreciated that in other embodiments of the present disclosure, other mechanical engaging structures may be employed as the mechanical engaging structure of the tail in accordance with the present disclosure.

It should be appreciated that in this embodiment and other embodiments disclosed herein the tail may be alternatively configured (in shape and/or size) in accordance with the present disclosure.

In this illustrated example embodiment, the drill bit 6200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

Referring now to FIGS. 36 to 40, another example embodiment of a drill bit of a self-drilling anchor assembly of the present disclosure is generally illustrated. This drill bit 7200 can be employed with one or more of the anchors described herein to form a self-drilling anchor assembly in accordance with the present disclosure.

More specifically, the drill bit 7200 includes: (a) a generally cylindrical solid shank 7210 having a front end 7212, an intermediate or center portion 7214, and a rear end 7216; (b) a drill head 7240 integrally connected to and extending from the front end 7212 of the shank 7210; and (c) an exterior partially threaded tail 7260 integrally connected to and extending from the rear end 7216 of the shank 7210. The drill bit 7200 and specifically the shank 7210, the drill head 7240, and the tail 7260 have a generally central longitudinal axis. The drill bit 7200 is configured to remain in the substrate and assist in maintaining the anchor in the substrate as described above.

The shank 7210 includes an outer surface 7211 that includes two recessed longitudinally extending sections 7211*a* and 7211*b* (not shown) that respectively define two opposing longitudinally extending flutes 7220 and 7222 (not shown) that each extend longitudinally along the entire length of the shank 7210. The flutes 7220 and 7222 each have a generally partially cylindrical cross section (at each point along the longitudinal length) and are configured to direct loose material of the substrate that is broken away by the drill head 7240 from the drill head 7240 toward the rear end 7216 of the shank 7210 and out of the hole being formed in the substrate. It should be appreciated that the shank 7210 (including the flutes) may be alternatively configured (in shape and/or size) in accordance with the present disclosure.

The drill head 7240 includes a solid body 7242 having a tip end 7244, an intermediate or center portion 7246, and a rear end 7248. The rear end 7248 is integrally connected to and extends from the front end 7212 of the shank 7210. The intermediate or center portion 7246 has a generally wider outer diameter than the tip end 7244 and the rear end 7248.

The body 7242 includes an outer surface 7243 that includes two recessed sections 7243*a* and 7243*b* that respectively define two opposing longitudinally extending flutes 7250 and 7252 that each extend longitudinally along a portion of the body 7242 toward the shank 7210. The flutes 7250 and 7252 each have a partially cylindrical cross section and are configured to direct loose material of the substrate (that is broken away by the tip end 7244) toward the front end 7212 of the shank 7210 and out of the hole being formed. The flutes 7250 and 7252 are respectively aligned with and are configured to communicate loose material to the flutes 7220 and 7222 defined by the shank 7210. Each of the flutes 7250 and 7252 are relatively wider toward the tip end 7244 and are narrower at or taper to the rear end 7248 of the body 7242. At the rear end 7248, each of the flutes 7250 and 7252 has the same or substantially the same cross-sectional area as the respective flutes 7220 and 7222 defined by the shank 7210.

The tip end 7244 has a flat drill tip 7245 that is positioned/centered at or along the central longitudinal axis. The tip end 7244 includes four front outwardly and rearwardly extending angled cutting edges 7253*a*, 7253*b*, 7253*c*, and 7253*d* that extend from the tip 7245. The tip end 7244 includes four side cutting edges 7254*a*, 7254*b*, 7254*c*, and 7254*d* that extend from the section 7243*a* of the surface 7243 of the drill head 7240 that defines the flute 7250. The tip end 7244 includes a first cutting surface 7255*a* that extends rearwardly and outwardly from the flat drill tip 7245 between cutting edge 7253*a* and cutting edge 7253*b*. The tip end 7244 includes a second cutting surface 7255*b* that extends rearwardly and outwardly from the flat drill tip 7245 between cutting edge 7253*c* and cutting edge 7253*d*. The tip end 7244 includes a third cutting surface 7256*a* that extends rearwardly and outwardly from the flat drill tip 7245 to side cutting edge 7254*a*, to side cutting edge 7254*d*, and to the section 7243*a* of the surface 7243 of the drill head 7240 that defines the flute 7250. The tip end 7244 includes a fourth cutting surface 7256*b* that extends rearwardly and outwardly from the flat drill tip 7245 to side cutting edge 7254*b*, to side cutting edge 7254*c*, and to the section 7243*b* of the surface 7243 of the drill head 7240 that defines the flute 7252. The tip end 7244 also includes a fifth cutting surface 7257*a* that extends rearwardly and inwardly from the cutting edge 7254*a* to the section 7243*a* of the surface 7243 of the drill head 7240 that defines the flute 7250. The tip end 7244 also includes a sixth cutting surface 7257*b* that extends rearwardly and inwardly from the cutting edge 7254*b* to the section 7243*b* of the surface 7243 of the drill head 7240 that defines the flute 7252. The tip end 7244 also includes a seventh cutting surface 7257*c* that extends rearwardly and inwardly from the cutting edge 7254*c* to the section 7243*b* of the surface 7243 of the drill head 7240 that defines the flute 7252. The tip end 7244 also includes an eighth cutting surface 7257*d* that extends rearwardly and inwardly from the cutting edge 7254*d* to the section 7243*a* of the surface 7243 of the drill head 7240 that defines the flute 7250. This combination of sections also partially provide for enhanced complex cutting surfaces.

It should be appreciated that the drill head of any of the various embodiments may be alternatively configured (in shape, surfaces, angles, and/or size) in accordance with the present disclosure.

The partially threaded tail 7260 includes a generally cylindrical body 7262 having a front end 7264, an intermediate or center portion 7266, and a rear end 7268. The front end 7264 is integrally connected to and extends from the rear end 7216 of the shank 7210. The threaded portion of the tail 7260 includes an outer outwardly extending helical thread formation 7280 to facilitate attachment of a securing device such as a nut (not shown) and a washer (not shown) to the tail 7260 of the drill bit 7200. The external helical thread formation 7280 of the tail has a plurality of spaced apart thread sections (not labeled) that have or form outer edges or crests (not labeled) and valleys (not labeled) between the crests. The outer diameter of the helical thread formation (sometimes called the crest diameter) is greater than the outer diameter of the shank body 7210 in this illustrated example embodiment to facilitate attachment of the anchor to the drill bit 7200.

The tail 7260 also includes an exterior mechanical engaging structure 7290 that is accessible from the rear end 7268 of the body 7262. The mechanical engaging structure 7290 is engageable by a suitable tool to rotate the drill bit 7200. In this illustrated example embodiment of the present disclosure, the mechanical engaging structure 7290 includes a plurality of (and specifically six) external walls (not labeled) having a plurality of first surfaces (not labeled) that define a hexagonal shaped member or formation configured to be received in a hex drive or attached to a rotating tool that has a hex receiving head can engage these respective first surfaces. It should be appreciated that in other embodiments of the present disclosure, other mechanical engaging structures may be employed as the mechanical engaging structure of the tail in accordance with the present disclosure.

It should be appreciated that in this embodiment and other embodiments disclosed herein the tail may be alternatively configured (in shape and/or size) in accordance with the present disclosure.

In this illustrated example embodiment, the drill bit 7200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

Referring now to FIGS. 41 to 45, another example embodiment of a drill bit of a self-drilling anchor assembly of the present disclosure is generally illustrated. This drill bit 8200 can be employed with one or more of the anchors described herein to form a self-drilling anchor assembly in accordance with the present disclosure.

More specifically, the drill bit 8200 includes: (a) a generally cylindrical solid shank 8210 having a front end 8212, an intermediate or center portion 8214, and a rear end 8216; (b) a drill head 8240 integrally connected to and extending from the front end 8212 of the shank 8210; and (c) an exterior partially threaded tail 8260 integrally connected to and extending from the rear end 8216 of the shank 8210. The drill bit 8200 and specifically the shank 8210, the drill head 8240, and the tail 8260 have a generally central longitudinal axis. The drill bit 8200 is configured to remain in the substrate and assist in maintaining the anchor in the substrate as described above.

The shank 8210 includes an outer surface 8211 that includes two recessed longitudinally extending sections 8211a and 8211b (not shown) that respectively define two opposing longitudinally extending flutes 8220 and 8222 (not shown) that each extend longitudinally along the entire length of the shank 8210. The flutes 8220 and 8222 each have a generally partially cylindrical cross section (at each point along the longitudinal length) and are configured to direct loose material of the substrate that is broken away by the drill head 8240 from the drill head 8240 toward the rear end 8216 of the shank 8210 and out of the hole being formed in the substrate. It should be appreciated that the shank 8210 (including the flutes) may be alternatively configured (in shape and/or size) in accordance with the present disclosure.

The drill head 8240 includes a solid body 8242 having a tip end 8244, an intermediate or center portion 8246, and a rear end 8248. The rear end 8248 is integrally connected to and extends from the front end 8212 of the shank 8210. The intermediate or center portion 8246 has a generally wider outer diameter than the tip end 8244 and the rear end 8248.

The body 8242 includes an outer surface 8243 that includes two recessed sections 8243a and 8243b that respectively define two opposing longitudinally extending flutes 8250 and 8252 that each extend longitudinally along a portion of the body 8242 toward the shank 8210. The flutes 8250 and 8252 each have a partially cylindrical cross section and are configured to direct loose material of the substrate (that is broken away by the tip end 8244) toward the front end 8212 of the shank 8210 and out of the hole being formed. The flutes 8250 and 8252 are respectively aligned with and are configured to communicate loose material to the flutes 8220 and 8222 defined by the shank 8210. Each of the flutes 8250 and 8252 are relatively wider toward the tip end 8244 and are narrower at or taper to the rear end 8248 of the body 8242. At the rear end 8248, each of the flutes 8250 and 8252 has the same or substantially the same cross-sectional area as the respective flutes 8220 and 8222 defined by the shank 8210.

The tip end 8244 has a pointed drill tip edge 8245 that is positioned/centered at or along the central longitudinal axis. The tip end 8244 includes eight cutting edges: two front outwardly and rearwardly extending cutting edges 8253a and 8253b that extend from the tip edge 8245, two outwardly and rearwardly extending curved cutting edges 8254a and 8254b that extend from the tip edge 8245, two outwardly and rearwardly extending cutting edges 8255a and 8255b that extend from the curved cutting edges 8254a and 8254b respectively, and two outwardly and rearwardly extending cutting edges 8256a and 8256 extending from the tip edge 8245. The tip end 8244 includes a first side portion (not labeled) that includes a multi-edge and multi-section cutting surface 8257a that extends rearwardly and outwardly from the cutting edge 8253b. The cutting surface 8257a includes a first section 8257aa that extends from cutting edge 8253b and curved cutting edge 8254a rearwardly and outwardly to cutting edge 8255b. The cutting surface 8257a includes a second section 8257aaa that extends from cutting edge 8255b and curved cutting edge 8254a to the section 8243a of the surface 8243 of the drill head 8240 that defines the flute 8250. The tip end 8244 includes a second side portion (not labeled) that includes a multi-edge and multi-section cutting surface 8257b that extends rearwardly and outwardly from the cutting edge 8253a. The cutting surface 8257b includes a first section 8257bb that extends from cutting edge 8253a and curved cutting edge 8254b rearwardly and outwardly to cutting edge 8255a. The cutting surface 8257b includes a second section 8257bbb that extends from cutting edge 8255a and curved cutting edge 8254b to the section 8243b of the surface 8243 of the drill head 8240 that defines the flute 8252. The tip end 8244 includes a third side portion (not labeled) that includes a multi-edge and multi-section cutting surface 8258a that extends rearwardly and outwardly from cutting edge 8253a. The cutting surface 8258a includes a first section 8258aa that extends from tip edge 8245 and between cutting edge 8253a and cutting edge 8256a. The cutting surface 8258a includes a second section 8258aaa that extends from cutting edge 8256a to curved cutting edge 8254a and to the section 8243a of the surface 8243 of the drill head 8240 that defines the flute 8250. The tip end 8244 includes a fourth side portion (not labeled) that includes a multi-edge and multi-section cutting surface 8258b that extends rearwardly and outwardly from cutting edge 8253b. The cutting surface 8258b includes a first section 8258bb that extends from tip edge 8245 and between cutting edge 8253b and cutting edge 8256b. The cutting surface 8258b includes a second section 8258bbb that extends from cutting edge 8256b to curved cutting edge 8254b and to the section 8243b of the surface 8243 of the drill head 8240 that defines the flute 8252. This combination of sections also partially provide for enhanced complex cutting surfaces.

It should be appreciated that the drill head of any of the various embodiments may be alternatively configured (in shape, surfaces, angles, and/or size) in accordance with the present disclosure.

The partially threaded tail 8260 includes a generally cylindrical body 8262 having a front end 8264, an intermediate or center portion 8266, and a rear end 8268. The front end 8264 is integrally connected to and extends from the rear end 8216 of the shank 8210. The threaded portion of the tail 8260 includes an outer outwardly extending helical thread formation 8280 to facilitate attachment of a securing device such as a nut (not shown) and a washer (not shown) to the tail 8260 of the drill bit 8200. The external helical thread formation 8280 of the tail has a plurality of spaced apart thread sections (not labeled) that have or form outer edges or crests (not labeled) and valleys (not labeled) between the crests. The outer diameter of the helical thread formation (sometimes called the crest diameter) is greater than the outer diameter of the shank body 8210 in this illustrated example embodiment to facilitate attachment of the anchor to the drill bit 8200.

The tail 8260 also includes an exterior mechanical engaging structure 8290 that is accessible from the rear end 8268 of the body 8262. The mechanical engaging structure 8290 is engageable by a suitable tool to rotate the drill bit 8200. In this illustrated example embodiment of the present disclosure, the mechanical engaging structure 8290 includes a plurality of (and specifically six) external walls (not labeled) having a plurality of first surfaces (not labeled) that define a hexagonal shaped member or formation configured to be received in a hex drive or attached to a rotating tool that has a hex receiving head can engage these respective first surfaces. It should be appreciated that in other embodiments of the present disclosure, other mechanical engaging structures may be employed as the mechanical engaging structure of the tail in accordance with the present disclosure.

It should be appreciated that in this embodiment and other embodiments disclosed herein the tail may be alternatively configured (in shape and/or size) in accordance with the present disclosure.

In this illustrated example embodiment, the drill bit 8200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

Referring now to FIGS. 46 to 50, another example embodiment of a drill bit of a self-drilling anchor assembly of the present disclosure is generally illustrated. This drill bit 9200 can be employed with one or more of the anchors described herein to form a self-drilling anchor assembly in accordance with the present disclosure.

More specifically, the drill bit 9200 includes: (a) a generally cylindrical solid shank 9210 having a front end 9212, an intermediate or center portion 9214, and a rear end 9216; (b) a drill head 9240 integrally connected to and extending from the front end 9212 of the shank 9210; and (c) an exterior partially threaded tail 9260 integrally connected to and extending from the rear end 9216 of the shank 9210. The drill bit 9200 and specifically the shank 9210, the drill head 9240, and the tail 9260 have a generally central longitudinal axis. The drill bit 9200 is configured to remain in the substrate and assist in maintaining the anchor in the substrate as described above.

The shank 9210 includes an outer surface 9211 that includes two recessed longitudinally extending sections 9211*a* and 9211*b* (not shown) that respectively define two opposing longitudinally extending flutes 9220 and 9222 (not shown) that each extend longitudinally and diagonally along the entire length of the shank 9210. The flutes 9220 and 9222 each have a generally partially rectangular cross section (at each point along the longitudinal length) and are configured to direct loose material of the substrate that is broken away by the drill head 9240 from the drill head 9240 toward the rear end 9216 of the shank 9210 and out of the hole being formed in the substrate. It should be appreciated that the shank 9210 (including the flutes) may be alternatively configured (in shape and/or size) in accordance with the present disclosure.

The shank 9210 includes a tapered segment 9213 and a front facing circumferential surface 9215 between the front end 9212 and the center portion 9214. The tapered segment 9213 has a larger circumference near the front end 9212 than near the center portion 9214. The tapered segment 9213 extends toward the center portion 9214 and extends up to the front facing circumferential surface 9215. The front facing circumferential surface 9215 is perpendicular to the outer surface 9211 of the shank 9210.

The drill head 9240 includes a solid body 9242 having a tip end 9244, an intermediate or center portion 9246, and a rear end 9248. The rear end 9248 is integrally connected to and extends from the front end 9212 of the shank 9210. The intermediate or center portion 9246 has a generally wider outer diameter than the tip end 9244 and the rear end 9248.

The body 9242 includes an outer surface 9243 that includes two recessed sections 9243*a* and 9243*b* that respectively define two opposing longitudinally extending flutes 9250 and 9252 that each extend longitudinally and diagonally along a portion of the body 9242 toward the shank 9210. The flutes 9250 and 9252 each have a partially rectangular cross section and are configured to direct loose material of the substrate (that is broken away by the tip end 9244) toward the front end 9212 of the shank 9210 and out of the hole being formed. The flutes 9250 and 9252 are respectively aligned with and are configured to communicate loose material to the flutes 9220 and 9222 defined by the shank 9210. At the rear end 9248, each of the flutes 9250 and 9252 has the same or substantially the same cross-sectional area as the respective flutes 9220 and 9222 defined by the shank 9210.

The tip end 9244 has a pointed drill tip 9245 that is positioned at or along the central longitudinal axis. The tip end 9244 includes four outwardly and rearwardly extending cutting edges 9253*a*, 9253*b*, 9254*a*, and 9254*b* that each extend from the tip 9245. The tip end 9244 includes two additional cutting edges 9255*a* and 9255*b* that extend respectively from the end of cutting edges 9254*a* and 9254*b* and parallel to cutting edges 9253*a* and 9253*b*. The tip end 9244 includes two further cutting edges 9256*a* and 9256*b* that extend outwardly and rearwardly from the end of cutting edges 9255*a* and 9255*b* respectively. The tip end 9244 includes a first cutting surface 9257*a* that extends rearwardly and outwardly from the cutting edges 9253*a* and 9254*a*. The tip end includes a second cutting surface 9257*b* that extends rearwardly and outwardly from the cutting edges 9253*b* and 9254*b*. The tip end 9244 includes a third cutting surface 9258*a* that extends rearwardly and outwardly from cutting edges 9253*b*, 9254*a*, and 9256*a* to section 9243*b* of the surface 9243 of the drill head 9240 that defines the flute 9252. The tip end 9244 includes a fourth cutting surface 9258*b* that extends rearwardly and outwardly from cutting edges 9253*a*, 9254*b*, and 9256*b* to section 9243*a* of the surface 9243 of the drill head 9240 that defines the flute 9250. The tip end 9244 includes a fifth cutting surface 9259*a* that extends rearwardly and outwardly from cutting edge 9256*a*. The tip end 9244 includes a sixth cutting surface 9259*b* that extends rearwardly and outwardly from cutting edge 9256*b*. This combination of sections also partially provide for enhanced complex cutting surfaces.

It should be appreciated that the drill head of any of the various embodiments may be alternatively configured (in shape, surfaces, angles, and/or size) in accordance with the present disclosure.

The partially threaded tail 9260 includes a generally cylindrical body 9262 having a front end 9264, an intermediate or center portion 9266, and a rear end 9268. The front end 9264 is integrally connected to and extends from the rear end 9216 of the shank 9210. The threaded portion of the tail 9260 includes an outer outwardly extending helical thread formation 9280 to facilitate attachment of a securing device such as a nut (not shown) and a washer (not shown) to the tail 9260 of the drill bit 9200. The external helical thread formation 9280 of the tail has a plurality of spaced apart thread sections (not labeled) that have or form outer edges or crests (not labeled) and valleys (not labeled) between the crests. The outer diameter of the helical thread formation (sometimes called the crest diameter) is greater than the outer diameter of the shank body 9210 in this illustrated example embodiment to facilitate attachment of the anchor to the drill bit 9200.

The tail 9260 also includes an exterior mechanical engaging structure 9290 that is accessible from the rear end 9268 of the body 9262. The mechanical engaging structure 9290 is engageable by a suitable tool to rotate the drill bit 9200. In this illustrated example embodiment of the present disclosure, the mechanical engaging structure 9290 includes a plurality of (and specifically six) external walls (not labeled) having a plurality of first surfaces (not labeled) that define a hexagonal shaped member or formation configured to be received in a hex drive or attached to a rotating tool that has a hex receiving head can engage these respective first surfaces. It should be appreciated that in other embodiments of the present disclosure, other mechanical engaging structures may be employed as the mechanical engaging structure of the tail in accordance with the present disclosure.

It should be appreciated that in this embodiment and other embodiments disclosed herein the tail may be alternatively configured (in shape and/or size) in accordance with the present disclosure.

In this illustrated example embodiment, the drill bit 9200 is manufactured and specifically milled from a suitable steel material, such as Carbon steel material that is hardened and tempered, and plated and/or coated to resist corrosion. However, it should be appreciated that the drill bit can be made from other suitable materials and in other suitable manners. It should further be appreciated that the drill bit does not need to be made from a relatively hard (or relatively expensive material) since the drill bit is configured to be used one time and to remain in the substrate as further described below.

It should be appreciated that in various embodiments of the present disclosure, one or more portions of the anchor can be formed by one or more crimping or pinching processes. For example, one or more of the tabs or the attachment portions can be formed by one or more crimping or pinching processes.

It should further be appreciated that in various embodiments of the present disclosure, one or more attachment portions of the anchor can be positioned at the front or rear ends or end portions of the anchor. For example, one or more attachment portions may include inwardly extending sections at the front end of the anchor.

It will be understood that modifications and variations may be effected without departing from the scope of the novel concepts of the present invention, and it is understood that this application is to be limited only by the scope of the claims.

We claim:

1. A self-drilling anchor assembly comprising:
a drill bit including
a shank defining spaced apart longitudinally extending first flutes,
a drill head integrally connected to a front end of the shank, the drill head including a solid body having a tip end, an intermediate portion, and a rear end integrally connected to the shank, the intermediate portion having a wider outer diameter than the tip end and the rear end, the body including an outer surface that includes recessed sections that respectively define longitudinally extending spaced apart second flutes that each extend longitudinally along a portion of the body toward the shank and that are respectively aligned with the spaced apart longitudinally extending first flutes defined by the shank, and
a tail integrally connected to a rear end of the shank, the tail including a mechanical engaging structure that is engageable by a tool to rotate the drill bit, the tail including a thread formation to facilitate attachment of a securing device to the tail; and
an anchor including an elongated body including an inner surface defining a longitudinally extending inner channel, spaced apart inwardly extendable tabs connected to the elongated body and configured to extend into the spaced apart first flutes defined by the shank, and a head integrally connected to and extending outwardly transversely from a rear end of the elongated body.

2. The self-drilling anchor assembly of claim 1, wherein the second flutes each have a partially cylindrical cross section and are configured to direct loose material of a substrate that is broken away by the tip end.

3. The self-drilling anchor assembly of claim 1, wherein the second flutes include two opposing second flutes that are respectively aligned with and are configured to communicate loose material to additional two opposing first flutes of the first flutes defined by the shank.

4. The self-drilling anchor assembly of claim 1, wherein the tip end of the drill head has a pointed drill tip positioned along a central longitudinal axis.

5. The self-drilling anchor assembly of claim 4, wherein the tip end of the drill head includes a front outwardly extending angled cutting edge and a rearwardly extending angled cutting edges that extend from the drill tip.

6. The self-drilling anchor assembly of claim 5, wherein the drill head includes a first side portion that includes a multi-edge and multi-section cutting surface that extends rearwardly and outwardly from the angled cutting edges.

7. The self-drilling anchor assembly of claim 6, wherein the drill head includes a second side portion that includes a multi-edge and multi-section cutting surface that extends rearwardly and outwardly from the angled cutting edges.

8. A self-drilling anchor assembly comprising:
a drill bit including:
a shank defining a longitudinally extending first flute,
a drill head integrally connected to a front end of the shank, and
a tail integrally connected to a rear end of the shank, the tail including a mechanical engaging structure that is engageable by a tool to rotate the drill bit, the tail including a thread formation to facilitate attachment of a securing device to the tail; and
an anchor including
an elongated body including an inner surface defining a longitudinally extending inner channel, the elongated body further defining spaced apart longitudinally extending openings,
an inwardly extendable tab connected to the elongated body and configured to extend into the first flute defined by the shank, and
a head integrally connected to and partially extending outwardly transversely from a rear end of the elongated body.

9. The self-drilling anchor assembly of claim 8, wherein the anchor is coupled to the drill bit by the inwardly extendable tab such that rotation of the drill bit causes rotation of the anchor.

10. The self-drilling anchor assembly of claim 9, wherein the anchor includes a plurality of inwardly extendable tabs connected to the elongated body and configured to extend into the first flute defined by the shank such that the anchor is coupled to the drill bit by the inwardly extendable tabs.

11. The self-drilling anchor assembly of claim 9, wherein the inwardly extending tabs is configured to extend longitudinally into the first flute.

12. The self-drilling anchor assembly of claim 9, wherein the drill bit defines a plurality of longitudinally extending second flutes.

13. The self-drilling anchor assembly of claim 12, wherein the second flutes defined by the drill bit each have a partially cylindrical cross section and are configured to direct loose material of a substrate that is broken away by a tip end of the drill bit.

14. The self-drilling anchor assembly of claim 12, wherein the shank defines two longitudinally extending first flutes that are respectively aligned with and are configured to communicate loose material to two second flutes defined by the drill head of the drill bit.

15. The self-drilling anchor assembly of claim 8, wherein the shank defines a plurality of longitudinally extending first flutes and the spaced apart longitudinally extending openings of the anchor are configured to respectively align with the plurality of first flutes.

* * * * *